United States Patent [19]
Bagchi et al.

[11] Patent Number: 5,916,358
[45] Date of Patent: Jun. 29, 1999

[54] INK COMPOSITIONS CONTAINING SURFACTANT SOLS COMPRISING MIXTURES OF SOLID SURFACTANTS

[75] Inventors: Pranab Bagchi, Webster; Ravi Sharma, Fairport; Constance N. Anagnostopoulos; Gilbert A. Hawkins, both of Mendon; John A. Lebens, Rush; Thierry Vachette; James M. Chwalek, both of Pittsford; David S. Ross, Fairport, all of N.Y.

[73] Assignee: Eastman Kodak Company, Rochester, N.Y.

[21] Appl. No.: 08/777,133

[22] Filed: Dec. 30, 1996

[51] Int. Cl.$^6$ .................................................. C09D 11/02
[52] U.S. Cl. ............................ 106/31.59; 106/31.33; 106/31.35; 106/31.65; 106/31.67; 106/31.89
[58] Field of Search ........................ 106/31.59, 31.89, 106/31.35, 31.67, 31.33, 31.65

[56] References Cited

U.S. PATENT DOCUMENTS

| | | | |
|---|---|---|---|
| 1,941,001 | 12/1933 | Hansell | 173/33 |
| 3,373,437 | 3/1968 | Sweet et al. | 346/75 |
| 3,416,153 | 12/1968 | Hertz et al. | 346/75 |
| 3,946,398 | 3/1976 | Kyser et al. | 346/1 |
| 4,275,290 | 6/1981 | Cielo et al. | 219/216 |
| 4,369,065 | 1/1983 | Brixius | 106/31.35 |
| 4,490,728 | 12/1984 | Vaught et al. | 346/1.1 |
| 4,580,158 | 4/1986 | Macheboeuf | 358/22 |
| 4,659,383 | 4/1987 | Lin et al. | 106/31.35 |
| 4,737,803 | 4/1988 | Fujimura et al. | 346/140 |
| 4,748,458 | 5/1988 | Inoue et al. | 346/140 |
| 4,758,276 | 7/1988 | Lin et al. | 106/31.67 |
| 5,000,786 | 3/1991 | Matsuzaki | 106/31.35 |
| 5,047,084 | 9/1991 | Miller et al. | 106/31.67 |
| 5,102,460 | 4/1992 | You et al. | 106/31.35 |
| 5,350,446 | 9/1994 | Lin et al. | 106/31.67 |
| 5,371,527 | 12/1994 | Miller et al. | 347/46 |
| 5,637,140 | 6/1997 | Fujioka | 106/31.35 |

FOREIGN PATENT DOCUMENTS 2007162  5/1979  United Kingdom .

*Primary Examiner*—Helene Klemanski
*Attorney, Agent, or Firm*—Paul A. Leipold

[57] ABSTRACT

The invention is related to an aqueous ink composition comprising water, a coloring agent, and solid surfactant particles wherein said solid particles comprise a mixture of at least two surfactants with very low water solubility and with melting points between 40° C. and 90° C.

20 Claims, 44 Drawing Sheets

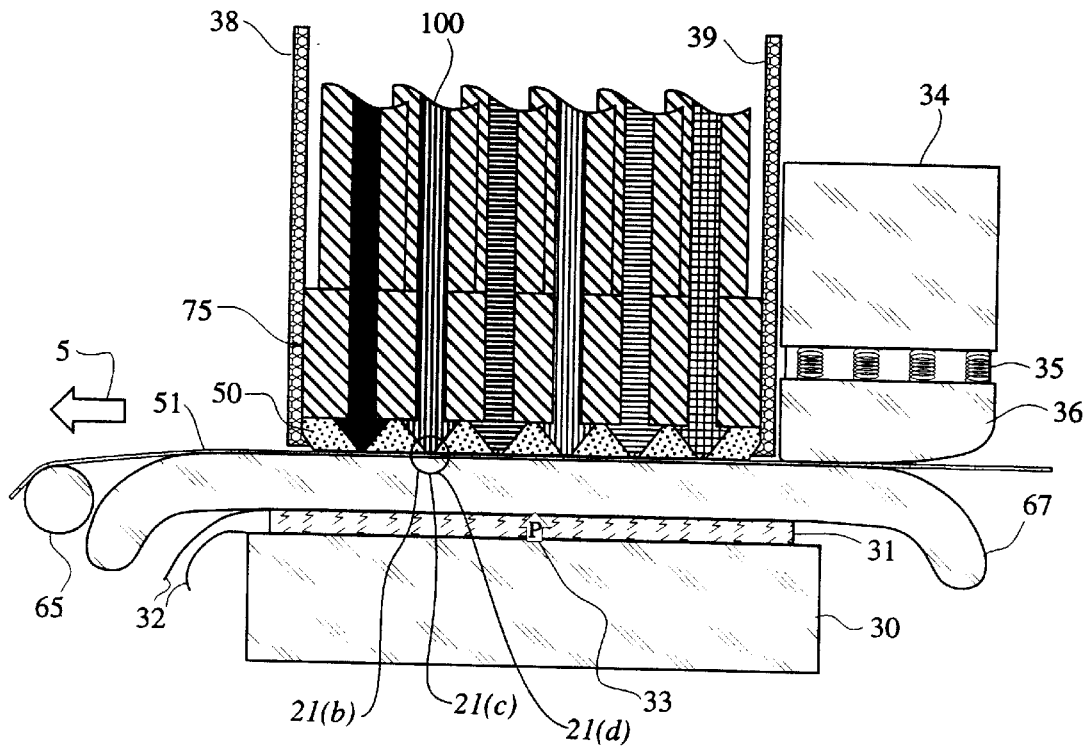
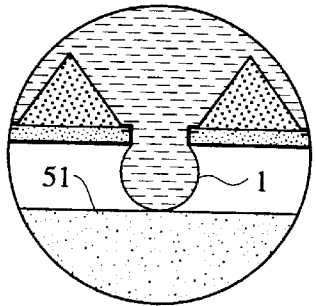 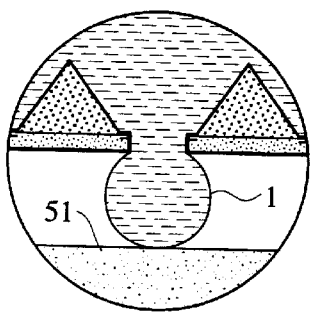 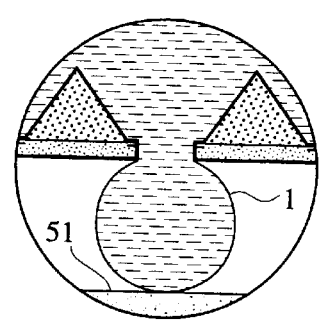
*Fig. 21(b)*   *Fig. 21(c)*   *Fig. 21(d)*
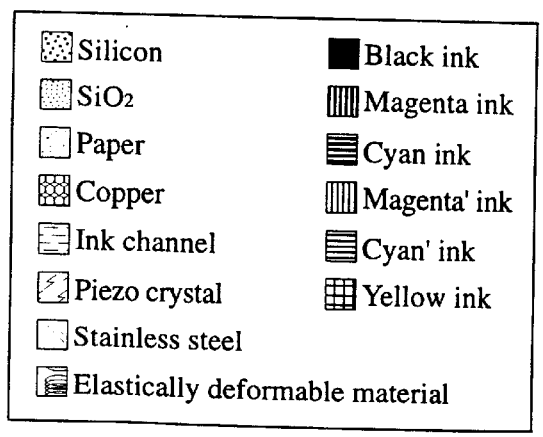

INK COMPOSITIONS CONTAINING SURFACTANT SOLS COMPRISING MIXTURES OF SOLID SURFACTANTS

CROSS REFERENCE TO RELATED APPLICATIONS

Reference is made to commonly assigned U.S. patent application Ser. No. 08/621,754 filed in the name of Kia Silverbrook on Mar. 22, 1996.

FIELD OF THE INVENTION

This invention relates to the formulation of inks for digitally controlled printing devices, and in particular to liquid ink drop-on-demand (DOD) ink jet printing devices with printheads which integrate multiple nozzles on a single substrate and in which a liquid drop is selected for printing primarily by surface tension reduction phenomenon.

BACKGROUND OF THE INVENTION

Many different types of digitally controlled printing systems have been invented, and many types are currently in production. These printing systems use a variety of actuation mechanisms, a variety of marking materials, and a variety of recording media. Examples of digital printing systems in current use include: laser electrophotographic printers; LED electrophotographic printers; dot matrix impact printers; thermal paper printers; film recorders; thermal wax printers; dye diffusion thermal transfer printers; and ink jet printers. However, at present, such electronic printing systems have not significantly replaced mechanical printing presses, even though this conventional method requires very expensive setup and is seldom commercially viable unless a few thousand copies of a particular page are to be printed. Thus, there is a need for improved digitally controlled printing systems, for example, being able to produce high quality color images at a high-speed and low cost, using standard paper.

Inkjet printing has become recognized as a prominent contender in the digitally controlled, electronic printing arena because, e.g., of its non-impact, low-noise characteristics, its use of plain paper and its avoidance of toner transfers and fixing.

Many types of ink jet printing mechanisms have been invented. These can be categorized as either continuous ink jet (CIJ) or drop on demand (DOD) ink jet. Continuous ink jet printing dates back to at least 1929: Hansell, U.S. Pat. No. 1,941,001.

Sweet et al U.S. Pat. No. 3,373,437, 1967, discloses an array of continuous ink jet nozzles where ink drops to be printed are selectively charged and deflected towards the recording medium. This technique is known as binary deflection CIJ, and is used by several manufacturers, including Elmjet and Scitex.

Hertz et al U.S. Pat. No. 3,416,153, 1966, discloses a method of achieving variable optical density of printed spots in CIJ printing using the electrostatic dispersion of a charged drop stream to modulate the number of droplets which pass through a small aperture. This technique is used in ink jet printers manufactured by Iris Graphics.

Kyser et al U.S. Pat. No. 3,946,398, 1970, discloses a DOD ink jet printer which applies a high voltage to a piezoelectric crystal, causing the crystal to bend, applying pressure on an ink reservoir and jetting drops on demand. Many types of piezoelectric drop on demand printers have subsequently been invented, which utilize piezoelectric crystals in bend mode, push mode, shear mode, and squeeze mode. Piezoelectric DOD printers have achieved commercial success using hot melt inks (for example, Tektronix and Dataproducts printers), and at image resolutions up to 720 dpi for home and office printers (Seiko Epson). Piezoelectric DOD printers have an advantage in being able to use a wide range of inks. However, piezoelectric printing mechanisms usually require complex high voltage drive circuitry and bulky piezoelectric crystal arrays, which are disadvantageous in regard to manufacturability and performance.

Endo et al GB Pat. No. 2,007,162, 1979, discloses an electrothermal DOD ink jet printer which applies a power pulse to an electrothermal transducer (heater) which is in thermal contact with ink in a nozzle. The heater rapidly heats water based ink to a high temperature, whereupon a small quantity of ink rapidly evaporates, forming a bubble. The formation of these bubbles results in a pressure wave which cause drops of ink to be ejected from small apertures along the edge of the heater substrate. This technology is known as Bubblejet™ (trademark of Canon K.K. of Japan), and is used in a wide range of printing systems from Canon, Xerox, and other manufacturers.

Vaught et al U.S. Pat. No. 4,490,728, 1982, discloses an electrothermal drop ejection system which also operates by bubble formation. In this system, drops are ejected in a direction normal to the plane of the heater substrate, through nozzles formed in an aperture plate positioned above the heater. This system is known as Thermal Ink Jet, and is manufactured by Hewlett-Packard. In this document, the term Thermal Ink Jet is used to refer to both the Hewlett-Packard system and systems commonly known as Bubblejet™.

Thermal Ink Jet printing typically requires approximately 20 mJ over a period of approximately 2 ms to eject each drop. The 10 Watt active power consumption of each heater is disadvantageous in itself and also necessitates special inks, complicates the driver electronics and precipitates deterioration of heater elements.

Other ink jet printing systems have also been described in technical literature, but are not currently used on a commercial basis. For example, U.S. Pat. No. 4,275,290 discloses a system wherein the coincident address of predetermined print head nozzles with heat pulses and hydrostatic pressure, allows ink to flow freely to spacer-separated paper, passing beneath the print head. U.S. Pat. Nos. 4,737,803 and 4,748,458 disclose ink jet recording systems wherein the coincident address of ink in print head nozzles with heat pulses and an electrostatically attractive field cause ejection of ink drops to a print sheet.

Each of the above-described inkjet printing systems has advantages and disadvantages. Recently an jet printing approach has been disclosed, that provides advantages for example, as to cost, speed, quality, reliability, power usage, simplicity of construction and operation, durability and consumables (cf. K. Silverbrook's commonly assigned U.S. Patent Applications). Said system comprises drop selection by surface tension reduction is a drop-on-demand printing mechanism in which ink in a liquid state is retained in a printing nozzle at a pressure greater than atmospheric pressure, but insufficient to overcome the quiescent temperature surface tension of the ink and expel the ink from the nozzle. The surface tension of the ink decreases with increasing temperature, and the nozzle Includes an electrically activated means of heating the ink to a temperature less than the boiling point of the ink. The surface tension reduces to a value insufficient to retain the ink in the nozzle, whereby a drop of the ink emerges from the nozzle.

PROBLEM TO BE SOLVED BY THE INVENTION

It is extremely desirable that these inks comprising sols of solid surfactants be colloidally stable over long periods of time, i.e., stable from Ostwald ripening and from eventual flocculation. Therefore, there exists a need to formulate sols of solid surfactants that have extended colloid stability.

SUMMARY OF THE INVENTION

An object of the invention is to overcome disadvantages of prior printing inks.

It is a further object of the invention to form a low-cost ink.

Another object is to provide an ink with a large drop in surface tension upon heating.

These and other objects of the invention are generally accomplished by an aqueous ink composition comprising water, a coloring agent, and solid surfactant particles wherein said particles comprise a mixture of at least two surfactants with very low water solubility and with melting points between 40° C. and 90° C.

Another embodiment of the invention provides a method of preparing an aqueous ink composition comprising water, a coloring agent in water, and dispersed solid surfactant particles comprising a mixture of at least two surfactants with very low water solubility and with melting points between 40° C. and 90° C. comprising the following steps:

a. heating an aqueous liquid and a mixture of the carboxylic acids to an elevated temperature below the boiling point of the aqueous liquid, b. homogenizing the said mixture in a single or multiple steps at the said elevated temperature, to form a small particle dispersion of the mixed carboxylic acids in the aqueous liquid, c. quickly cooling the formed dispersion to room temperature.

BRIEF DESCRIPTION OF THE DRAWINGS

FIG. 21A is a cross section of an embodiment print head and platen and

FIGS. 21B, 21C and 21D are cross sections of a single nozzle showing an adjustment for different drop sizes.

DETAILED DESCRIPTION OF THE INVENTION

Figure 1A:
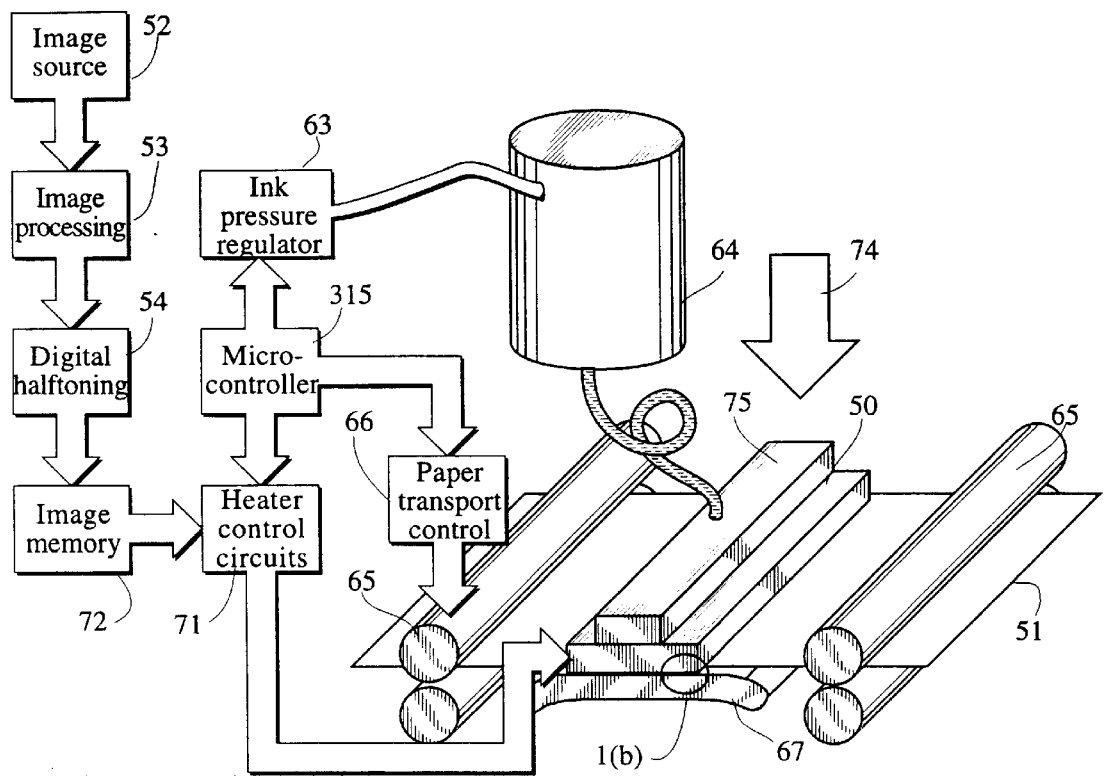
FIG. 1A shows a simplified block schematic diagram of one exemplary printing apparatus according to the present invention.

The invention provides aqueous ink compositions for ink jet printers where drop selection and drop release are actuated by nozzle heaters. As opposed to bubble jet printing systems, the temperature of the addressed ink drop is raised to temperatures just below the boiling point of the ink fluid, making such a printing system to have a substantially smaller drop ejection energy. Inks with a large reduction in surface tension at the required operating temperature, with enhanced colloidal stability, for drop selection can be prepared as a sol of small particles comprising a mixture of solid surfactants that melt in the desired operating temperature range. Examples of such surfactants include carboxylic acids (or their metal salts) with between 14 and 30 carbon atoms, such as eicosanoic acid, $CH_3(CH_2)_{18}COOH$, m.p. 77° C. (common name: arachidic acid). Any combination of such surfactants at any proportions may be used to obtain enhanced colloidal stability of the formed sol. However, preferred proportion in a combination of two surfactants range between 2% and 98% of any one of the components. Such ink sols, prepared using more than one solid surfactant, are generally colloidally more stable than sols prepared using a single surfactant component. In a small colloidal particle one component seems to act as crystal growth modifier for the other causing hindrance of Ostwald ripening and eventual flocculation of the dispersed sol.

Thus, the invention provides an aqueous ink composition comprising at least water, a coloring agent dispersed or dissolved in water, and dispersed solid particles comprising a mixture of at least two solid surfactants with melting points ranging between 40° C. and 90° C.

A preferred feature is that the mixed surfactant sol particles are particles comprise a mixture of at least two carboxylic acids.

An alternative preferred feature is that the mixed surfactant sol particles are particles comprise a mixture of metal salts of at least two carboxylic acids.

An alternative preferred feature is that the mixed surfactant particles comprise of at least two carboxylic acids, the surface of which comprise the anions of said carboxylic acids.

A further preferred feature is that the surfactants in the mixed surfactant particles are carboxylic acids of the formula $CH_3(CH_2)_nCOOH$, where n is between 12 and 28. In a preferred embodiment the difference in n in a particle of mixed surfactant is between 1 and 4.

A further preferred feature is that molecules at the surface of said mixed surfactant particles have the formula $CH_3(CH_2)COO^-M^+(H_2O)_m$, where n is the same as specified in earlier, and M is a metal cation selected from the group consisting of cations of sodium, potassium or lithium.

A further preferred feature is that at least one of the surfactants in the particles is a carboxylic acid of the formula $CH_3(CH_2)_nCOOH$, where n is between 14 and 20.

A further preferred feature is that the mixed surfactant particles are particles where at least one of the carboxylic acids is stearic acid, arachidic acid or behenic acid.

An alternative further preferred feature is that the mixed surfactant particles are particles comprising at least one of sodium stearate, sodium arachidate or sodium behenate.

A preferred feature is that the mixed surfactant particles have an average radius between 100 Å and 5,000 Å.

A further preferred feature is that the mixed surfactant particles have an average radius between 500 Å and 2000 Å for best ink transfer during imaging.

A preferred feature is that the said ink composition of this invention is used in printing devices operating on the principle of large difference of air/water interfacial tension between resting and activated states.

A further preferred feature is that the said ink composition of this invention is used in printing devices operating on the Thermal Proximity and principle of nozzle activation dependent on surface tension reduction of the ink upon heating.

These carboxylic acids are also available in large quantities at low cost.

Drop selection by surface tension reduction is a drop-on-demand printing mechanism in which ink in a liquid state is retained in a printing nozzle at a pressure greater than atmospheric pressure, but insufficient to overcome the quiescent temperature surface tension of the ink and expel the ink from the nozzle. The surface tension of the ink decreases with increasing temperature, and the nozzle includes an electrically activated means of heating the ink to a temperature less than the boiling point of the ink. The surface tension reduces to a value insufficient to retain the ink in the nozzle, whereby a drop of the ink emerges from the nozzle.

Inks with a large reduction in surface tension at the required operating temperature for drop selection can be prepared as a sol of small particles of a surfactant which melts in the desired operating temperature range. Examples of such surfactants include carboxylic acids with between 14 and 30 carbon atoms, such as eicosanoic acid, $CH_3(CH_2)_{18}COOH$, m.p. 77° C. (common name: arachidic acid).

The inks of the invention comprising mixed surfactants have a very large drop in surface tension upon heating. It is preferred that this drop in surface tension be accomplished with a relatively small change in temperature in order to conserve power required to print. The mixed solid particle surfactants provide a more stable ink that will not flocculate under normal conditions but retains the large drop in surface tension upon heating.

It has surprisingly been found that the preferred surfactants for forming the solid particles that are a mixture of surfactants are relatively close in composition. Surprisingly for best prevention of flocculation, the surfactants are within 1 to 4 carbon atoms of each other in composition.

These carboxylic acids are available in high purity and at low cost. The amount of surfactant required is very small, so the cost of adding them to the ink is insignificant. A mixture of carboxylic acids with slightly varying chain lengths can be used to spread the melting points over a range of temperatures. Such mixtures will typically cost less than the pure acid.

It is not necessary to restrict the choice of surfactant to simple unbranched carboxylic acids. Surfactants with branched chains or phenyl groups, or other hydrophobic moieties can be used. It is also not necessary to use a carboxylic acid. Many highly polar moieties are suitable for the hydrophilic end of the surfactant. It is desirable that the polar end be ionisable in water, so that the surface of the surfactant particles can be charged to aid dispersion and prevent flocculation. In the case of carboxylic acids, this can be achieved by adding an alkali such as sodium hydroxide or potassium hydroxide.

In general aspect of this invention, the mixed insoluble surfactant sols are prepared by adding the required amounts of the two or more insoluble surfactants to the required volume of water and then heating the mixture to a temperature greater than the melting temperature of the highest melting component of the surfactants. The insoluble liquid/liquid mixture is then mechanically pre-homogenized at the same temperature or higher temperatures to form a coarsely dispersed premix. The premix is then finely homogenized using a proper mechanical homogenizer at about the same elevated temperature such that the oily surfactant phase still remains liquid. The formed fine sol is then rapidly cooled to room temperature. Such a fluid then can be added to a conventional high air/water interfacial tension conventional ink jet ink comprising either a colored dye or a dispersed colored pigment. The conventional ink may contain all standard additives such as alcohols, humactants other known conventional additives.

In one general aspect, the invention constitutes a drop-on-demand (DOD) printing mechanism wherein the means of selecting drops to be printed produces a difference in position between selected drops and drops which are not selected, but which is insufficient to cause the ink drops to overcome the ink surface tension and separate from the body of ink, and wherein an alternative means is provided to cause separation of the selected drops from the body of ink.

The separation of drop selection means from drop separation means significantly reduces the energy required to select which ink drops are to be printed. Only the drop selection means must be driven by individual signals to each nozzle. The drop separation means can be a field or condition applied simultaneously to all nozzles.

The drop selection means may be chosen from, but is not limited to, the following list:

1) Electrothermal reduction of surface tension of pressurized ink
2) Electrothermal bubble generation, with insufficient bubble volume to cause drop ejection
3) Electrothermal reduction of surface tension with Piezoelectric assistance too cause drop ejection
4) Electrothermal reduction of surface tension assisted by electrostatic attraction with one electrode per nozzle to cause drop ejection The drop separation means may be chosen from, but is not limited to, the following list:

1) Proximity (recording medium in close proximity to print head)
2) Proximity with oscillating ink pressure
3) Electrostatic attraction
4) Magnetic attraction These generalized mechanisms of the ink jet printing process, as defined earlier has been termed "LIFT," for the purpose of brevity in this disclosure.

The table "DOD printing technology targets" shows some desirable characteristics of drop on demand printing technology. The table also lists some methods by which some embodiments described herein, or in other of my related applications, provide improvements over the prior art.

DOD printing technology targets

| Target | Method of achieving improvement over prior art |
| --- | --- |
| High speed operation | Practical, low cost, page width printing heads with more than 10,000 nozzles. Monolithic A4 page width print heads can be manufactured using standard 300 mm (12") silicon wafers |
| High image quality | High resolution (800 dpi is sufficient for most applications), six color process to reduce image noise |
| Full color operation | Halftoned process color at 800 dpi using stochastic screening |
| Ink flexibility | Low operating ink temperature and no requirement for bubble formation |
| Low power requirements | Low power operation results from drop selection means not being required to fully eject drop |
| Low cost | Monolithic print head without aperture plate, high manufacturing yield, small number of electrical connections, use of modified existing CMOS manufacturing facilities |
| High manufacturing yield | Integrated fault tolerance in printing head |
| High reliability | Integrated fault tolerance in printing head. Elimination of cavitation and kogation. Reduction of thermal shock. |
| Small number of electrical connections | Shift registers, control logic, and drive circuitry can be integrated on a monolithic print head using standard CMOS processes |
| Use of existing VLSI manufacturing facilities | CMOS compatibility. This can be achieved because the heater drive power is less is than 1% of Thermal Ink Jet heater drive power |

DOD printing technology targets -continued

| Target | Method of achieving improvement over prior art |
| --- | --- |
| Electronic collation | A new page compression system which can achieve 100:1 compression with insignificant image degradation, resulting in a compressed data rate low enough to allow real-time printing of any combination of thousands of pages stored on a low cost magnetic disk drive. |

In thermal ink jet (TIJ) and piezoelectric ink jet systems, a drop velocity of approximately 10 meters per second is preferred to ensure that the selected ink drops overcome ink surface tension, separate from the body of the ink, and strike the recording medium. These systems have a very low efficiency of conversion of electrical energy into drop kinetic energy. The efficiency of TIJ systems is approximately 0.02%). This means that the drive circuits for TIJ print heads must switch high currents. The drive circuits for piezoelectric ink jet heads must either switch high voltages, or drive highly capacitive loads. The total power consumption of page width TIJ printheads is also very high. An 800 dpi A4 full color page width TIJ print head printing a four color black image in one second would consume approximately 6 kW of electrical power, most of which is converted to waste heat. The difficulties of removal of this amount of heat precludes the production of low cost, high speed, high resolution compact page width TIJ systems.

One important feature of embodiments of the invention is a means of significantly reducing the energy required to select which ink drops are to be printed. This is achieved by separating the means for selecting ink drops from the means for ensuring that selected drops separate from the body of ink and form dots on the recording medium. Only the drop selection means must be driven by individual signals to each nozzle. The drop separation means can be a field or condition applied simultaneously to all nozzles.

The table "Drop selection means" shows some of the possible means for selecting drops in accordance with the invention. The drop selection means is only required to create sufficient change in the position of selected drops that the drop separation means can discriminate between selected and unselected drops.

Drop selection means

| Method | Advantage | Limitation |
| --- | --- | --- |
| 1. Electrothermal reduction of surface tension of pressurized ink | Low temperature increase and low drop selection energy. Can be used with many ink types. Simple fabrication. CMOS drive circuits can be fabricated on same substrate | Requires ink pressure regulating mechanism. Ink surface tension must reduce substantially as temperature increases |
| 2. Electrothermal reduction of ink viscosity, combined with oscillating ink pressure | Medium drop selection energy, suitable for hot melt and oil based inks. Simple fabrication. CMOS drive circuits can be fabricated on same substrate | Requires ink pressure oscillation mechanism. Ink must have a large decrease in viscosity as temperature increases |
| 3. Electrothermal bubble generation, with insufficient bubble volume to cause drop ejection | Well known technology, simple fabrication, bi-polar drive circuits can be fabricated on same substrate | High drop selection energy, requires water based ink, problems with kogation, cavitation, thermal stress |
| 4. Piezoelectric, with | Many types of ink base | High manufacturing |

| Drop selection means | | |
|---|---|---|
| Method | Advantage | Limitation |
| insufficient volume change to cause drop ejection | can be used | cost, incompatible with integrated circuit processes, high drive voltage, mechanical complexity, bulky |
| 5. Electrostatic attraction with one electrode per nozzle | Simple electrode fabrication | Nozzle pitch must be relatively large. Crosstalk between adjacent electric fields. Requires high voltage drive circuits |

Other drop selection means may also be used.

The preferred drop selection means for water based inks is method 1: "Electrothermal reduction of surface tension of pressurized ink". This drop selection means provides many advantages over other systems, including; low power operation (approximately 1% of TIJ), compatibility with CMOS VLSI chip fabrication, low voltage operation (approx. 10 V), high nozzle density, low temperature operation, and wide range of suitable ink formulations. The ink must exhibit a reduction in surface tension with increasing temperature.

The preferred drop selection means for hot melt or oil based inks is method 2: "Electrothermal reduction of ink viscosity, combined with oscillating ink pressure". This drop selection means is particularly suited for use with inks which exhibit a large reduction of viscosity with increasing temperature, but only a small reduction in surface tension. This occurs particularly with non-polar ink carriers with relatively high molecular weight. This is especially applicable to hot melt and oil based inks.

The table "Drop separation means" shows some of the possible methods for separating selected drops from the body of ink, and ensuring that the selected drops form dots on the printing medium. The drop separation means discriminates between selected drops and unselected drops to ensure that unselected drops do not form dots on the printing medium.

| Drop separation means | | |
|---|---|---|
| Means | Advantage | Limitation |
| 1. Electrostatic attraction | Can print on rough surfaces, simple implementation | Requires high voltage power supply |
| 2. AC electric field | Higher field strength is possible than electrostatic, operating margins can be increased, ink pressure reduced, and dust accumulation is reduced | Requires high voltage AC power supply synchronized to drop ejection phase. Multiple drop phase operation is difficult |
| 3. Proximity (print head in close proximity to, but not touching, recording medium) | Very small spot sizes can be achieved. Very low power dissipation. High drop position accuracy | Requires print medium to be very close to print head surface, not suitable for rough print media, usually requires transfer roller or belt |
| 4. Transfer Proximity (print head is in close proximity to a transfer roller or belt | Very small spot sizes can be achieved, very low power dissipation, high accuracy, can print on rough paper | Not compact due to size of transfer roller or transfer belt. |
| 5. Proximity with oscillating | Useful for hot melt inks using viscosity reduction | Requires print medium to be very close to print head |
| ink pressure | drop selection method, reduces possibility of nozzle clogging, can use pigments instead of dyes | surface, not suitable for rough print media. Requires ink pressure oscillation apparatus |
| 6. Magnetic attraction | Can print on rough surfaces. Low power if permanent magnets are used | Requires uniform high magnetic field strength, requires magnetic ink |

Other drop separation means may also be used.

The preferred drop separation means depends upon the intended use. For most applications, method 1: "Electrostatic attraction", or method 2: "AC electric field" are most appropriate. For applications where smooth coated paper or film is used, and very high speed is not essential, method 3: "Proximity" may be appropriate. For high speed, high quality systems, method 4: "Transfer proximity" can be used. Method 6: "Magnetic attraction" is appropriate for portable printing systems where the print medium is too rough for proximity printing, and the high voltages required for electrostatic drop separation are undesirable. There is no clear 'best' drop separation means which is applicable to all circumstances.

Further details of various types of printing systems according to the present invention are described in the following Australian patent specifications filed on Apr. 12, 1995, the disclosure of which are hereby incorporated by reference:

'A Fault Tolerant LIFT printing mechanism' (Filing no.: PN2308);

'Electrothermal drop selection in LIFT printing' (Filing no.: PN2309);

'Drop separation in LIFT printing by print media proximity' (Filing no.: PN2310);

'Drop size adjustment in Proximity LIFT printing by varying head to media distance' (Filing no.: PN2311);

'Augmenting Proximity LIFT printing with acoustic ink waves' (Filing no.: PN2312);

'Electrostatic drop separation in LIFT printing' (Filing no.: PN2313);

'Multiple simultaneous drop sizes in Proximity LIFT printing' (Filing no.: PN2321);

'Self cooling operation in thermally activated print heads' (Filing no.: PN2322); and 'Thermal Viscosity Reduction L printing' (Filing no.: PN2323).

A simplified schematic diagram of one preferred printing system according to the invention appears in FIG. 1A.

An image source 52 may be raster image data from a scanner or computer, or outline image data in the form of a page description language (PDL), or other forms of digital image representation. This image data is converted to a pixel-mapped page image by the image processing system 53. This may be a raster image processor (RIP) in the case of PDL image data, or may be pixel image manipulation in the case of raster image data. Continuous tone data produced by the image processing unit 53 is halftoned. Halftoning is performed by the Digital Halftoning unit 54. Halftoned bitmap image data is stored in the image memory 72. Depending upon the printer and system configuration, the image memory 72 may be a full page memory, or a band memory. Heater control circuits 71 read data from the image memory 72 and apply time-varying electrical pulses to the nozzle heaters (103 in FIG. 1B) that are part of the print head 50. These pulses are applied at an appropriate time, and to the appropriate nozzle, so that selected drops will form spots on the recording medium 51 in the appropriate position designated by the data in the image memory 72.

The recording medium 51 is moved relative to the head 50 by a paper transport system 65, which is electronically controlled by a paper transport control system 66, which in turn is controlled by a microcontroller 315. The paper transport system shown in FIG. 1A is schematic only, and many different mechanical configurations are possible. In the case of page width print heads, it is most convenient to move the recording medium 51 past a stationary head 50. However, in the case of scanning print systems, it is usually most convenient to move the head 50 along one axis (the sub-scanning direction) and the recording medium 51 along the orthogonal axis (the main scanning direction), in a relative raster motion. The microcontroller 315 may also control the ink pressure regulator 63 and the heater control circuits 71.

For printing using surface tension reduction, ink is contained in an ink reservoir 64 under pressure. In the quiescent state (with no ink drop ejected), the ink pressure is insufficient to overcome the ink surface tension and eject a drop. A constant ink pressure can be achieved by applying pressure to the ink reservoir 64 under the control of an ink pressure regulator 63. Alternatively, for larger printing systems, the ink pressure can be very accurately generated and controlled by situating the top surface of the ink in the reservoir 64 an appropriate distance above the head 50. This ink level can be regulated by a simple float valve (not shown).

For printing using viscosity reduction, ink is contained in an ink reservoir 64 under pressure, and the ink pressure is caused to oscillate. The means of producing this oscillation may be a piezoelectric actuator mounted in the ink channels (not shown).

When properly arranged with the drop separation means, selected drops proceed to form spots on the recording medium 51, while unselected drops remain part of the body of ink.

The ink is distributed to the back surface of the head 50 by an ink channel device 75. The ink preferably flows through slots and/or holes etched through the silicon substrate of the head 50 to the front surface, where the nozzles and actuators are situated. In the case of thermal selection, the nozzle actuators are electrothermal heaters.

In some types of printers according to the invention, an external field 74 is required to ensure that the selected drop separates from the body of the ink and moves towards the recording medium 51. A convenient external field 74 is a constant electric field, as the ink is easily made to be electrically conductive. In this case, the paper guide or platen 67 can be made of electrically conductive material and used as one electrode generating the electric field. The other electrode can be the head 50 itself. Another embodiment uses proximity of the print medium as a means of discriminating between selected drops and unselected drops.

For small drop sizes gravitational force on the ink drop is very small; approximately $10^{-4}$ of the surface tension forces, so gravity can be ignored in most cases. This allows the print head 50 and recording medium 51 to be oriented in any direction in relation to the local gravitational field. This is an important requirement for portable printers.

Figure 1B:
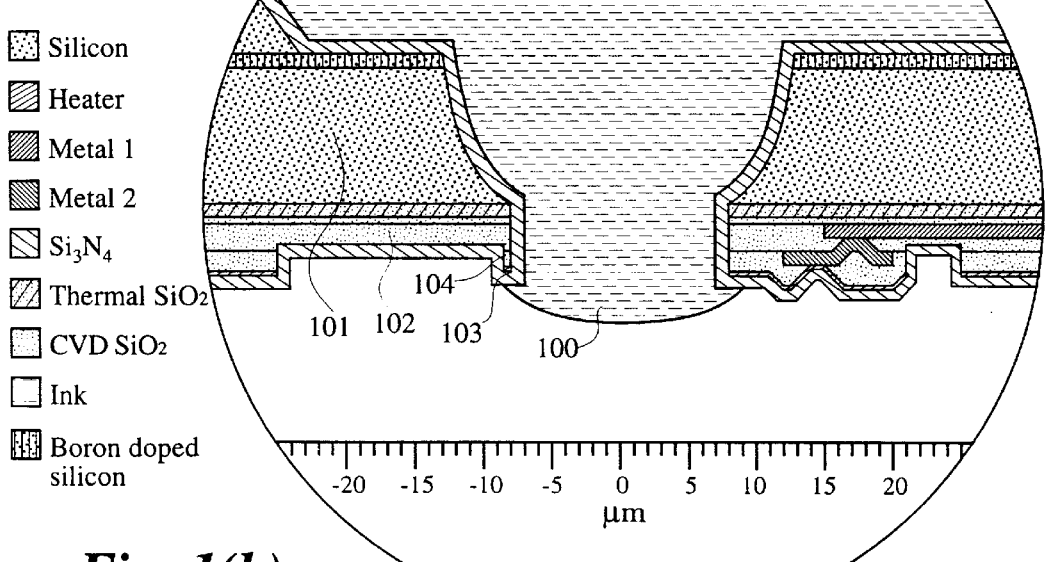
FIG. 1B shows a cross section of one variety of nozzle tip in accordance with the invention.

FIG. 1B is a detail enlargement of a cross section of a single microscopic nozzle tip embodiment of the invention, fabricated using a modified CMOS process. The nozzle is etched in a substrate 101, which may be silicon, glass, metal, or any other suitable material. If substrates which are not semiconductor materials are used, a semiconducting material (such as amorphous silicon) may be deposited on the substrate, and integrated drive transistors and data distribution circuitry may be formed in the surface semiconducting layer. Single crystal silicon (SCS) substrates have several advantages, including:

1) High performance drive transistors and other circuitry can be fabricated in SCS;
2) Print heads can be fabricated in existing facilities (fabs) using standard VLSI processing equipment;
3) SCS has high mechanical strength and rigidity; and
4) SCS has a high thermal conductivity.

In this example, the nozzle is of cylindrical form, with the heater 103 forming an annulus. The nozzle tip 104 is formed from silicon dioxide layers 102 deposited during the fabrication of the CMOS drive circuitry. The nozzle tip is passivated with silicon nitride. The protruding nozzle tip controls the contact point of the pressurized ink 100 on the print head surface. The print head surface is also hydrophobized to prevent accidental spread of ink across the front of the print head.

Many other configurations of nozzles are possible, and nozzle embodiments of the invention may vary in shape, dimensions, and materials used. Monolithic nozzles etched from the substrate upon which the heater and drive electronics are formed have the advantage of not requiring an orifice plate. The elimination of the orifice plate has significant cost savings in manufacture and assembly. Recent methods for eliminating orifice plates include the use of 'vortex' actuators such as those described in Domoto et al U.S. Pat. No. 4,580,158, 1986 assigned to Xerox, and Miller et al U.S. Pat. No. 5,371,527, 1994 assigned to Hewlett-Packard. These, however are complex to actuate, and difficult to fabricate. The preferred method for elimination of orifice plates for print heads of the invention is incorporation of the orifice into the actuator substrate.

This type of nozzle may be used for print heads sing various techniques for drop separation.

Operation with Electrostatic Drop Separation

As a first example, operation using thermal reduction of surface tension and electrostatic drop separation is shown in FIG. 2.

FIG. 2 shows the results of energy transport and fluid dynamic simulations performed using FIDAP, a commercial fluid dynamic simulation software package available from Fluid Dynamics Inc., of Illinois, USA. This simulation is of a thermal drop selection nozzle embodiment with a diameter of 8 mm, at an ambient temperature of 30° C. The total energy applied to the heater is 276 nJ, applied as 69 pulses of 4 nJ each. The ink pressure is 10 kPa above ambient air pressure, and the ink viscosity at 30° C. is 1.84 cPs. The ink is water based, and includes a sol of 0.1% palmitic acid to achieve an enhanced decrease in surface tension with increasing temperature. A cross section of the nozzle tip from the central axis of the nozzle to a radial distance of 40 mm is shown. Heat flow in the various materials of the nozzle, including silicon, silicon nitride, amorphous silicon dioxide, crystalline silicon dioxide, and water based ink are simulated using the respective densities, heat capacities, and thermal conductivities of the materials. The time step of the simulation is 0.1 ms.

Figure 2A:
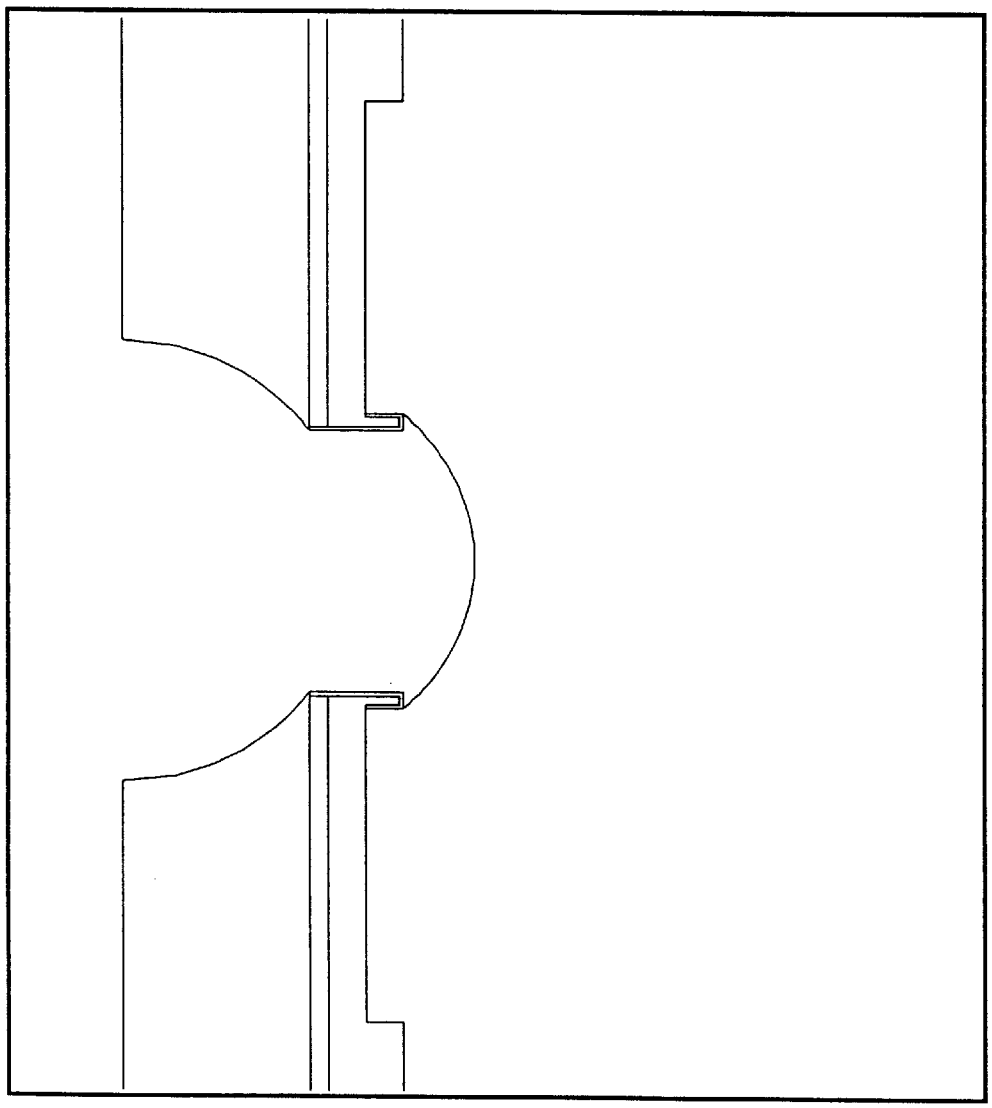
FIGS. 2A, 2B, 2C, 2D, 2E and 2F show fluid dynamic simulations of drop selection.

FIG. 2A shows a quiescent state, just before the heater is actuated. An equilibrium is created whereby no ink escapes the nozzle in the quiescent state by ensuring that the ink pressure plus external electrostatic field is insufficient to overcome the surface tension of the ink at the ambient temperature. In the quiescent state, the meniscus of the ink does not protrude significantly from the print head surface, so the electrostatic field is not significantly concentrated at the meniscus.

Figure 2B:
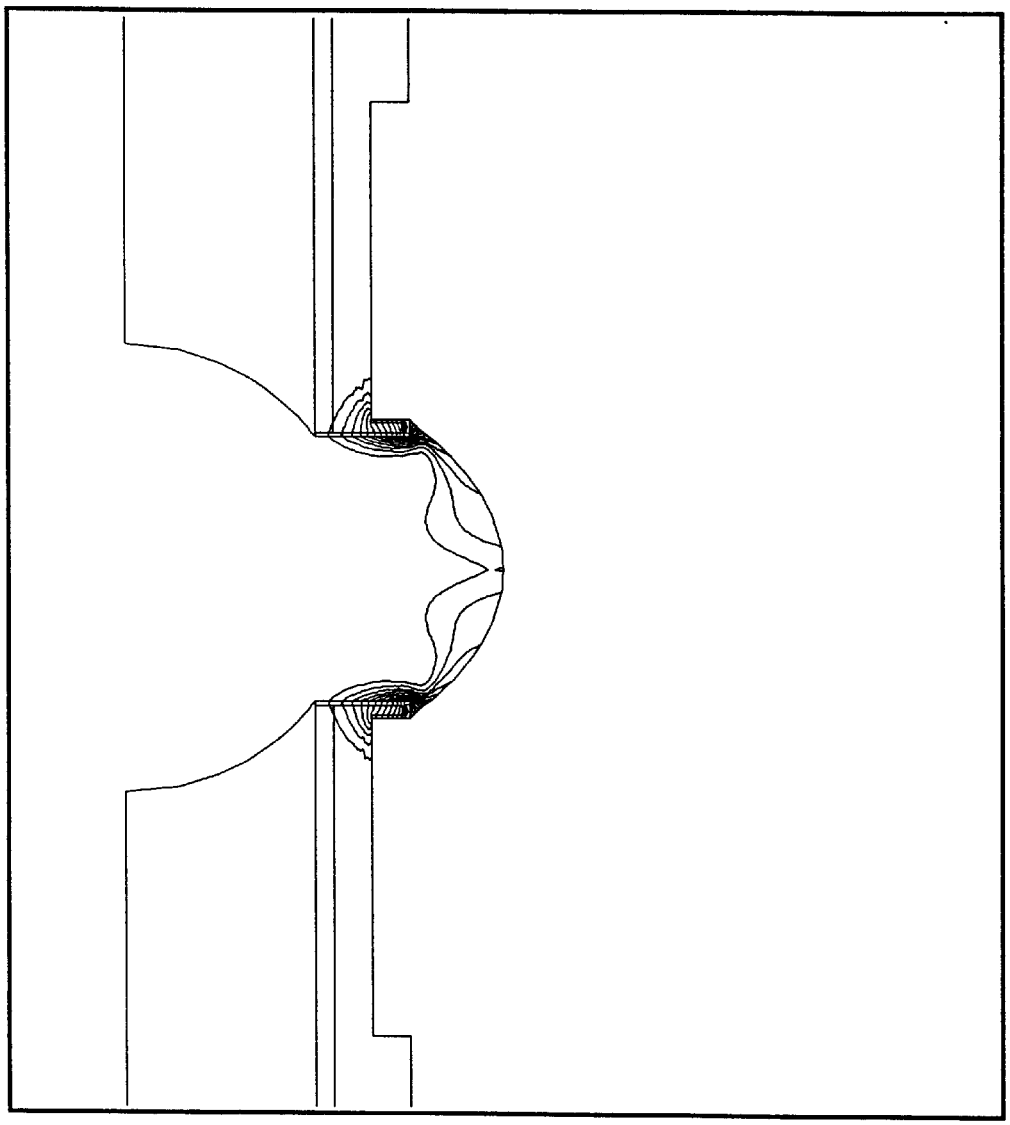

FIG. 2B shows thermal contours at 5° C. intervals 5 ms after the start of the heater energizing pulse. When the heater is energized, the ink in contact with the nozzle tip is rapidly heated. The reduction in surface tension causes the heated portion of the meniscus to rapidly expand relative to the cool ink meniscus. This drives a convective flow which rapidly transports this heat over part of the free surface of the ink at the nozzle tip. It is necessary for the heat to be distributed over the ink surface, and not just where the ink is in contact with the heater. This is because viscous drag against the solid heater prevents the ink directly in contact with the heater from moving.

Figure 2C:
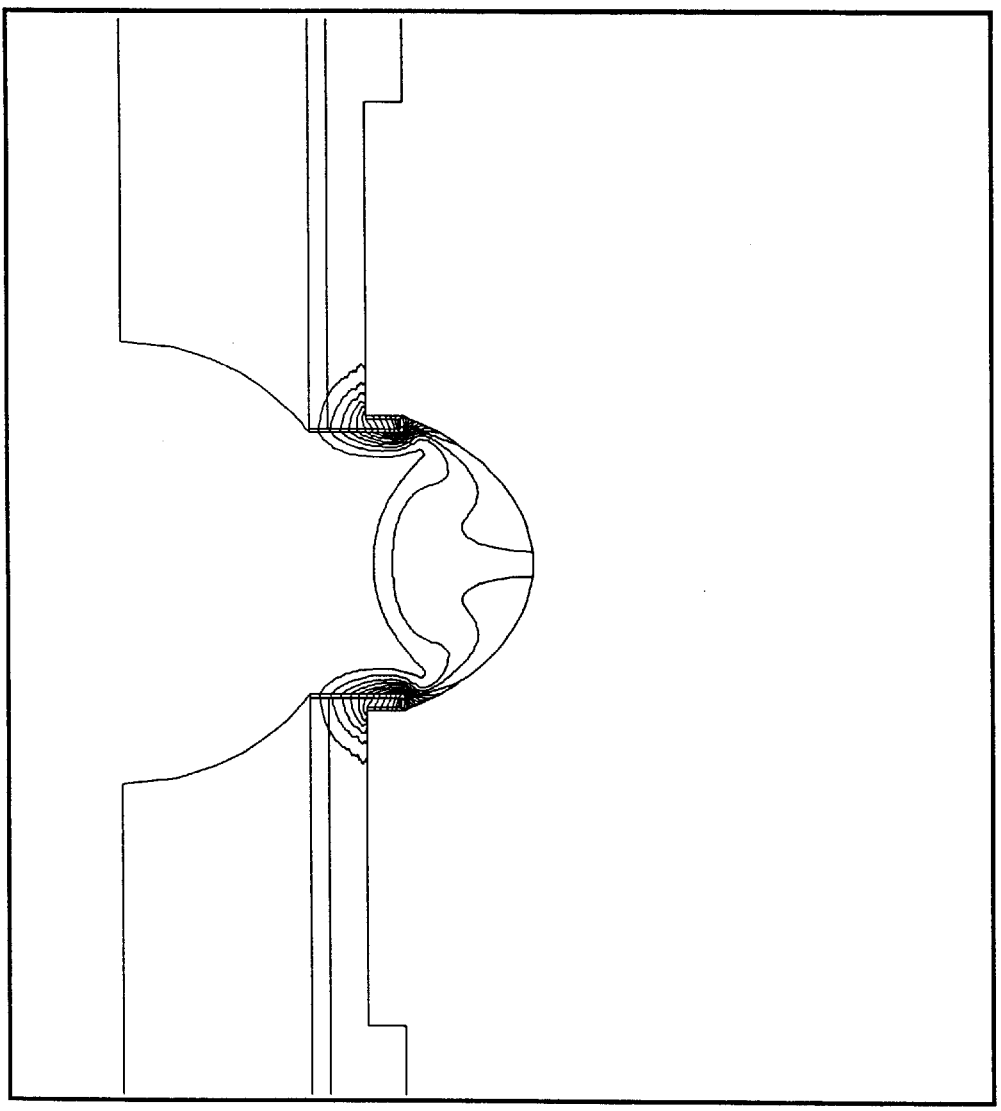

FIG. 2C shows thermal contours at 5° C. intervals 10 ms after the start of the heater energizing pulse. The increase in temperature causes a decrease in surface tension, disturbing the equilibrium of forces. As the entire meniscus has been heated, the ink begins to flow.

Figure 2D:
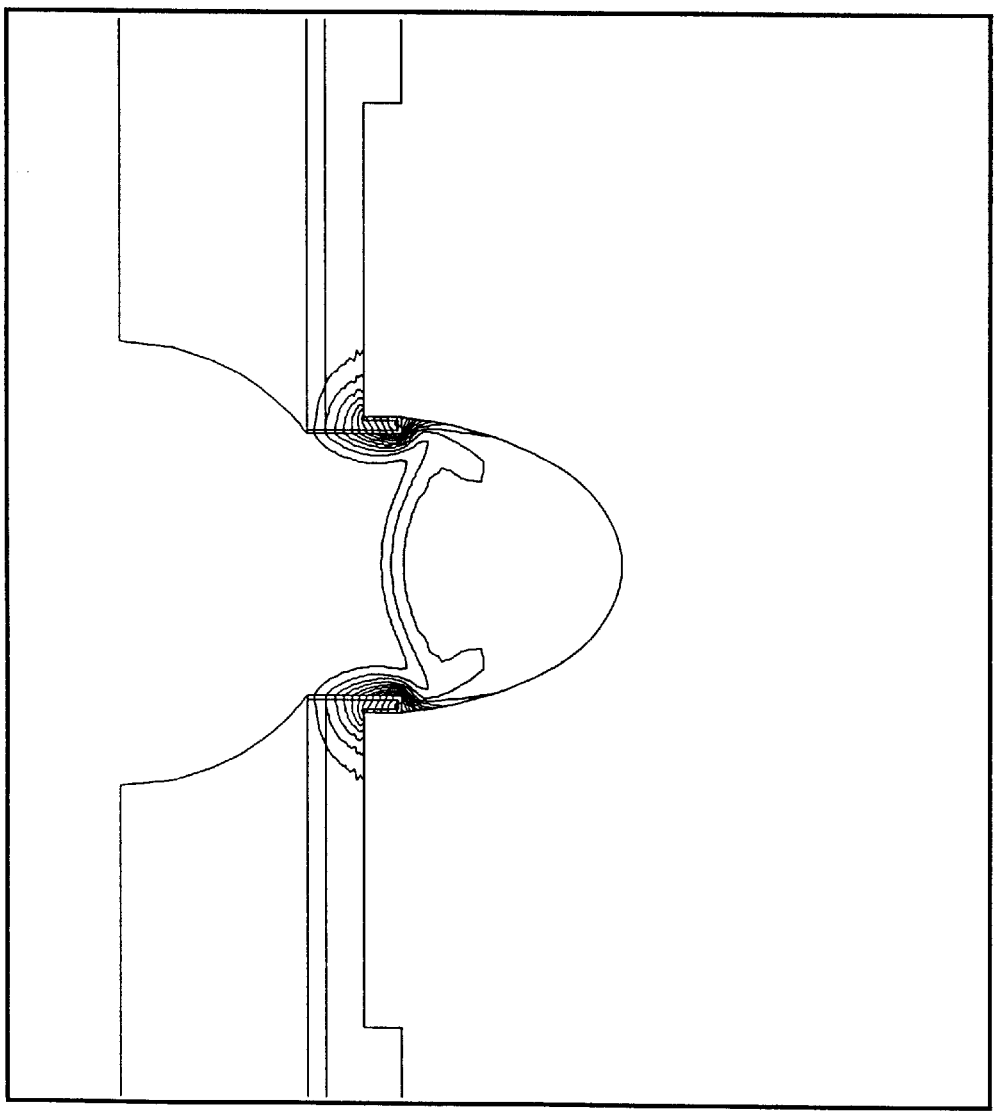

FIG. 2D shows thermal contours at 5° C. intervals 20 ms after the start of the heater energizing pulse. The ink pressure has caused the ink to flow to a new meniscus position, which protrudes from the print head. The electrostatic field becomes concentrated by the protruding conductive ink drop.

Figure 2E:
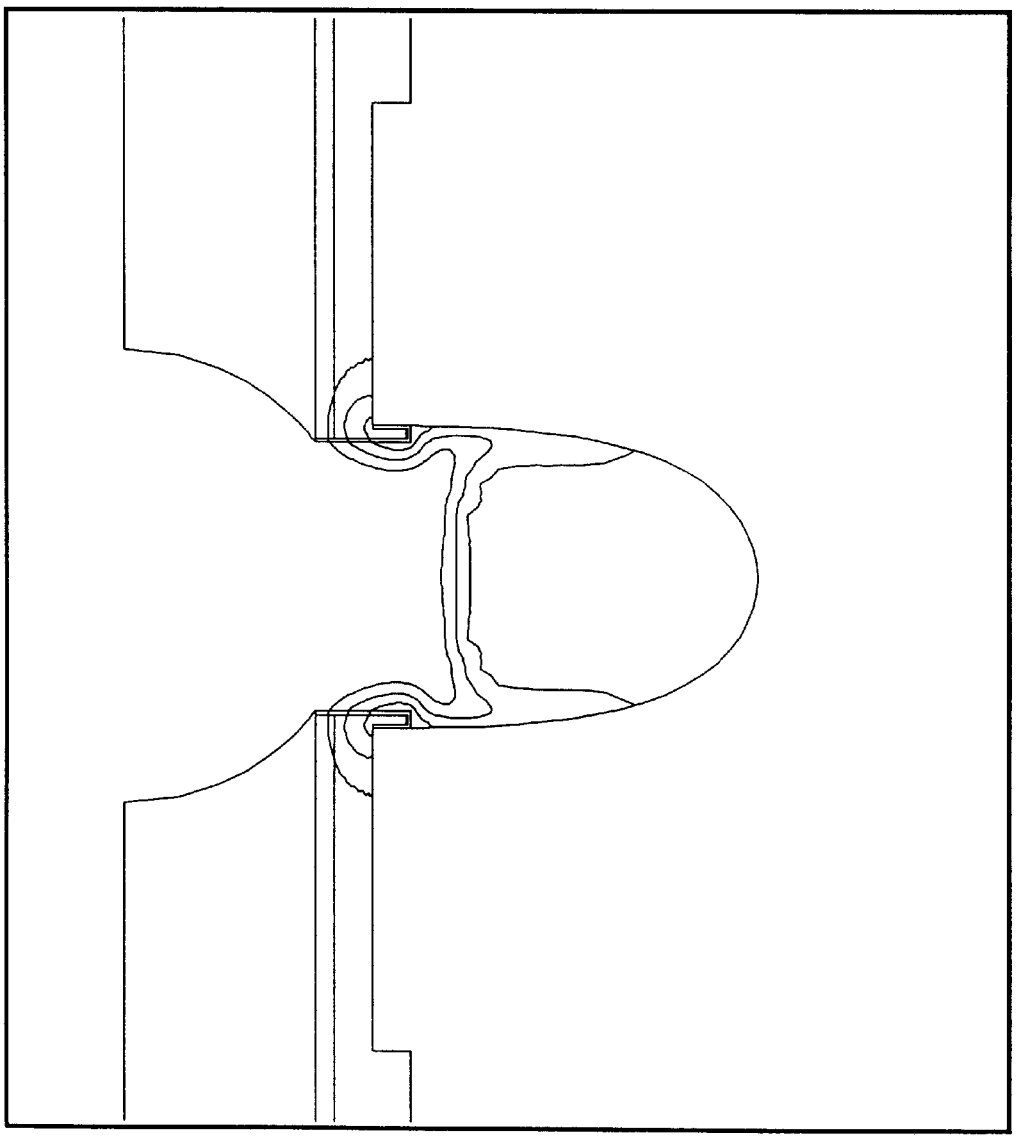

FIG. 2E shows thermal contours at 5° C. intervals 30 ms after the start of the heater energizing pulse, which is also 6 ms after the end of the heater pulse, as the heater pulse duration is 24 ms. The nozzle tip has rapidly cooled due to conduction through the oxide layers, and conduction into the flowing ink. The nozzle tip is effectively 'water cooled' by the ink. Electrostatic attraction causes the ink drop to begin to accelerate towards the recording medium. Were the heater pulse significantly shorter (less than 16 ms in this case) the ink would not accelerate towards the print medium, but would instead return to the nozzle.

Figure 2F:
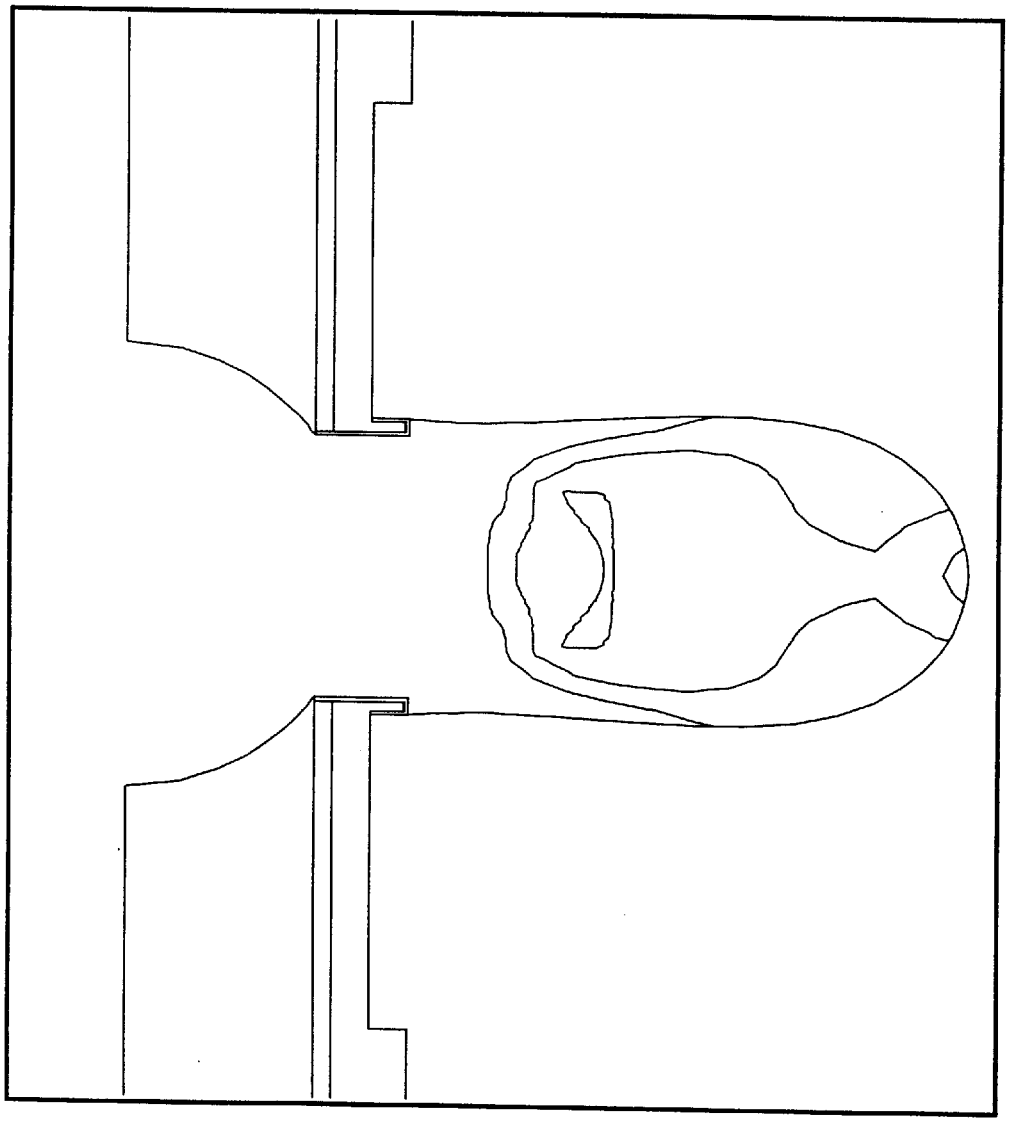

FIG. 2F shows thermal contours at 5° C. intervals 26 ms after the end of the heater pulse. The temperature at the nozzle tip is now less than 5° C. above ambient temperature. This causes an increase in surface tension around the nozzle tip. When the rate at which the ink is drawn from the nozzle exceeds the viscosity limited rate of ink flow through the nozzle, the ink in the region of the nozzle tip 'necks', and the selected drop separates from the body of ink. The selected drop then travels to the recording medium under the influence of the external electrostatic field. The meniscus of the ink at the nozzle tip then returns to its quiescent position, ready for the next heat pulse to select the next ink drop. One ink drop is selected, separated and forms a spot on the recording medium for each heat pulse. As the heat pulses are electrically controlled, drop on demand ink jet operation can be achieved.

Figure 3A:
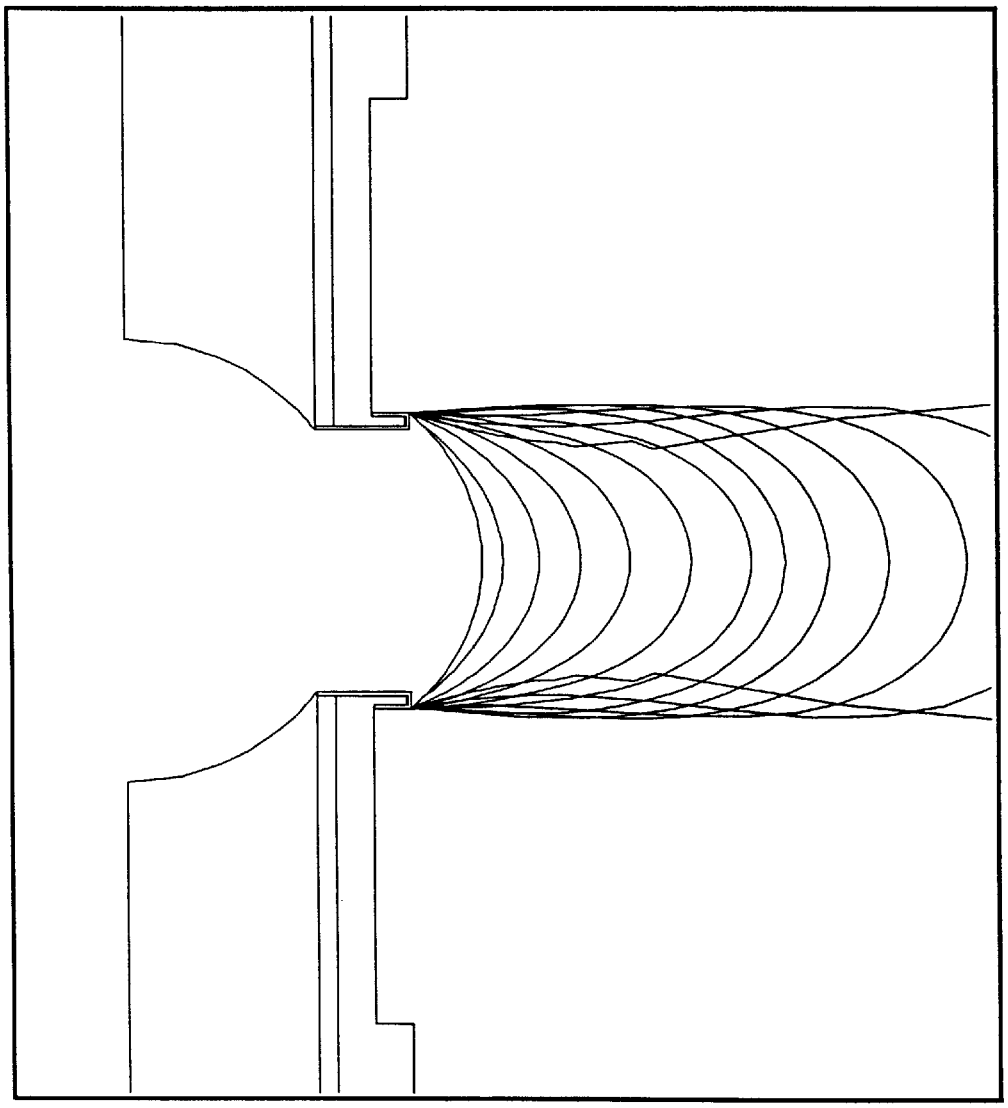
FIG. 3A shows a finite element fluid dynamic simulation of a nozzle in operation according to an embodiment of the invention.

FIG. 3A shows successive meniscus positions during the drop selection cycle at 5 ms intervals, starting at the beginning of the heater energizing pulse.

Figure 3B:
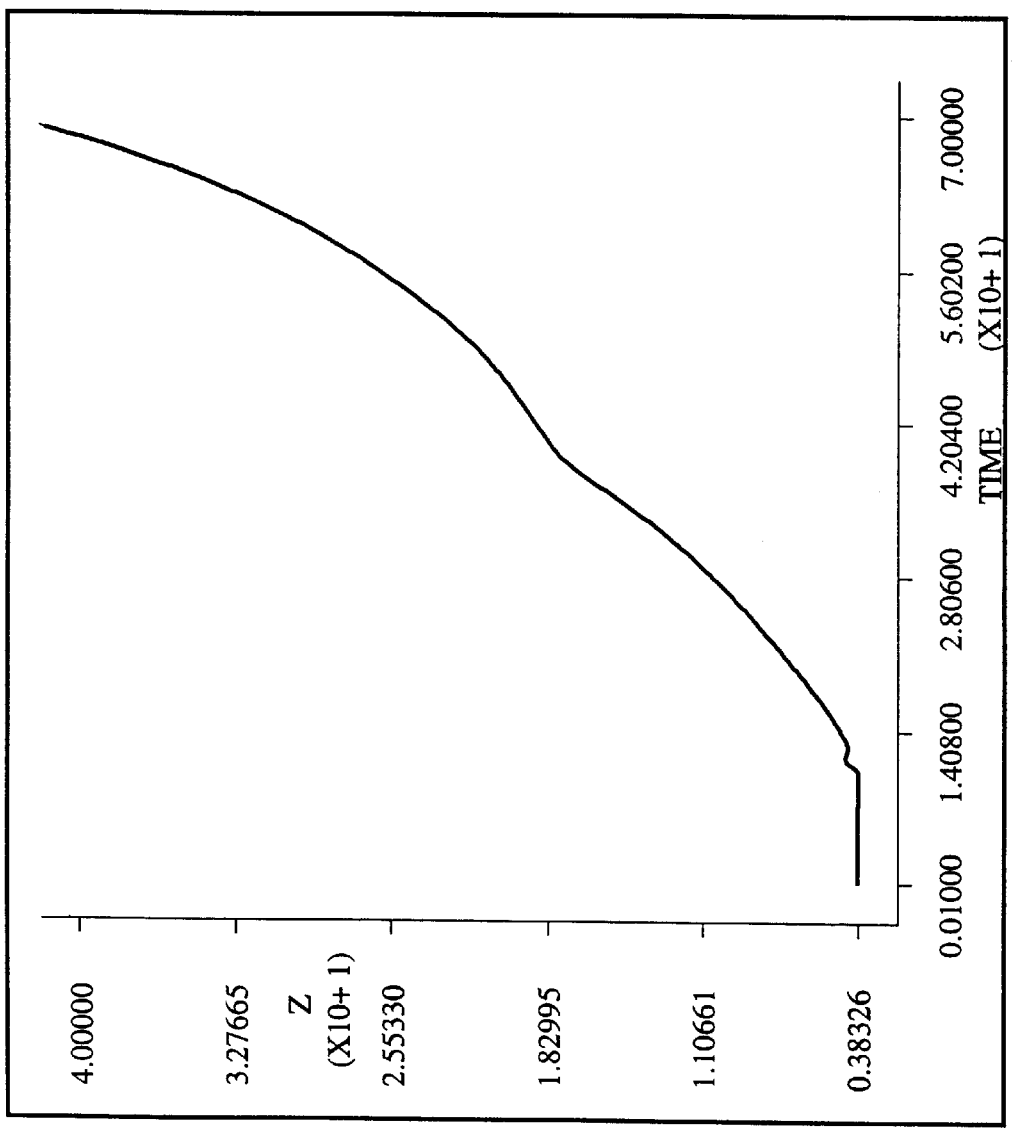
FIG. 3B shows successive meniscus positions during drop selection and separation.

FIG. 3B is a graph of meniscus position versus time, showing the movement of the point at the centre of the meniscus. The heater pulse starts 10 ms into the simulation.

Figure 3C:
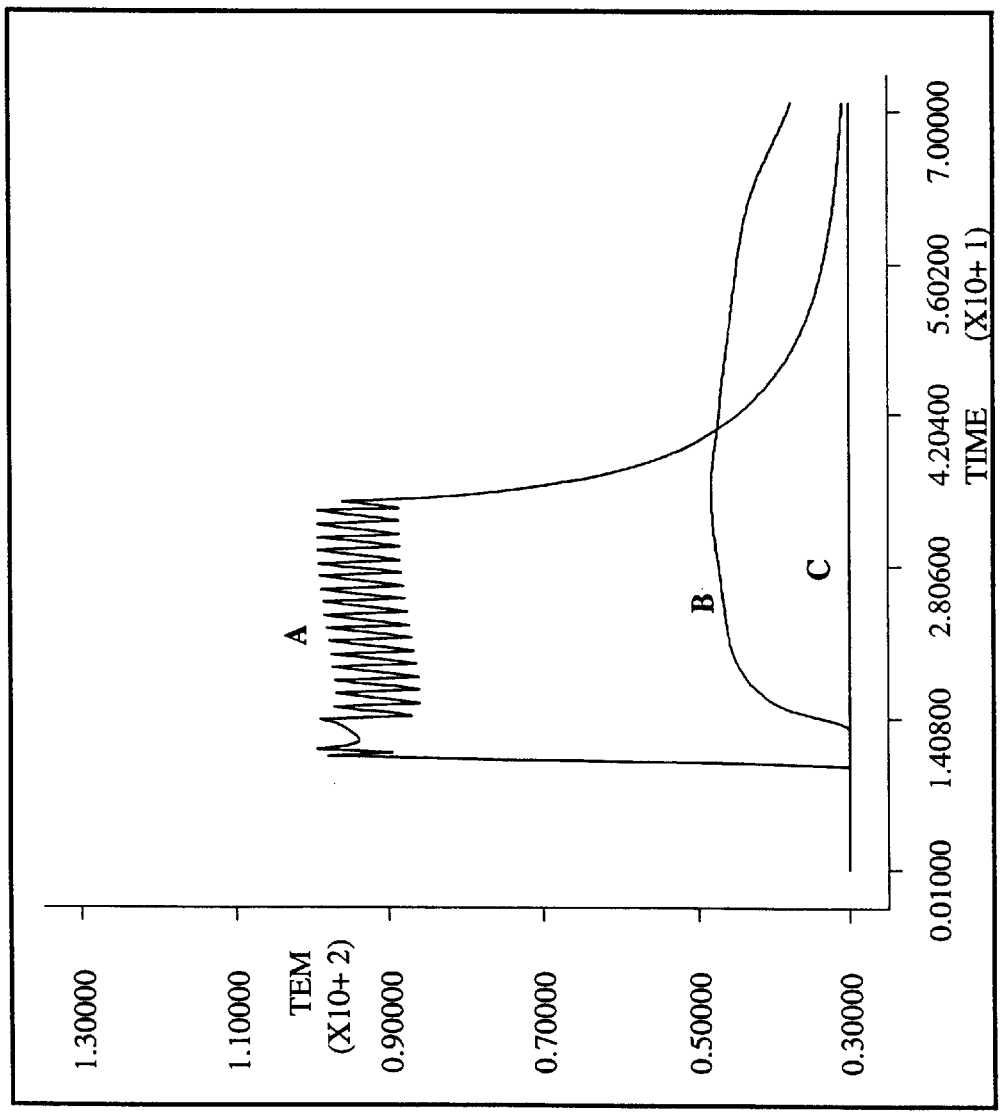
FIG. 3C shows the temperatures at various points during a drop selection cycle.

FIG. 3C shows the resultant curve of temperature with respect to time at various points in the nozzle. The vertical axis of the graph is temperature, in units of 100° C. The horizontal axis of the graph is time, in units of 10 ms. The temperature curve shown in FIG. 3B was calculated by FIDAP, using 0.1 ms time steps. The local ambient temperature is 30° C. Temperature histories at three points are shown:

A—Nozzle tip: This shows the temperature history at the circle of contact between the passivation layer, the ink, and air.

B—Meniscus midpoint: This is at a circle on the ink meniscus midway between the nozzle tip and the centre of the meniscus.

C—Chip surface: This is at a point on the print head surface 20 $\mu$m from the centre of the nozzle. The temperature only rises a few degrees. This indicates that active circuitry can be located very close to the nozzles without experiencing performance or lifetime degradation due to elevated temperatures.

Figure 3D:
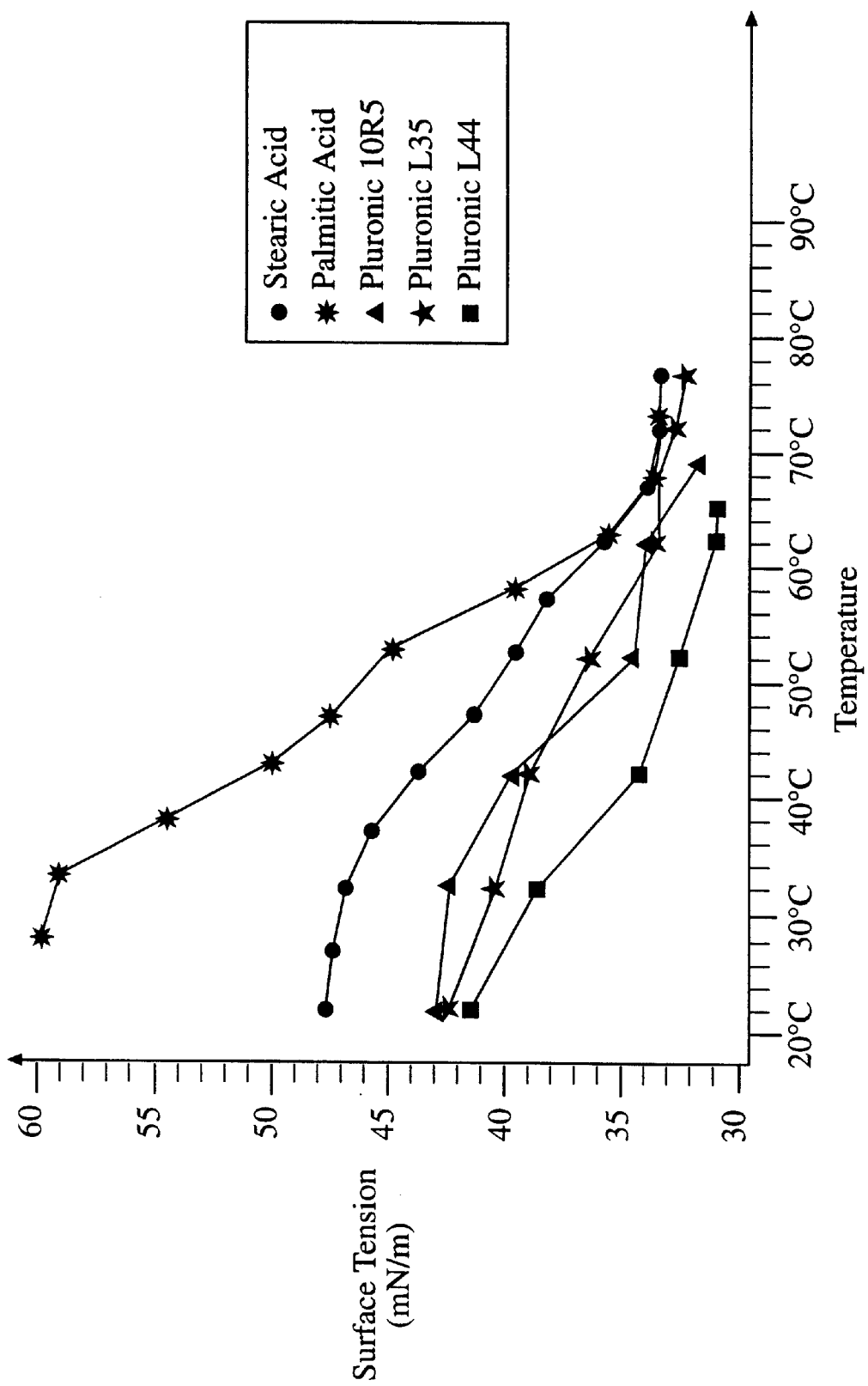
FIG. 3D shows measured surface tension versus temperature curves for various ink additives.
Figure 3E:
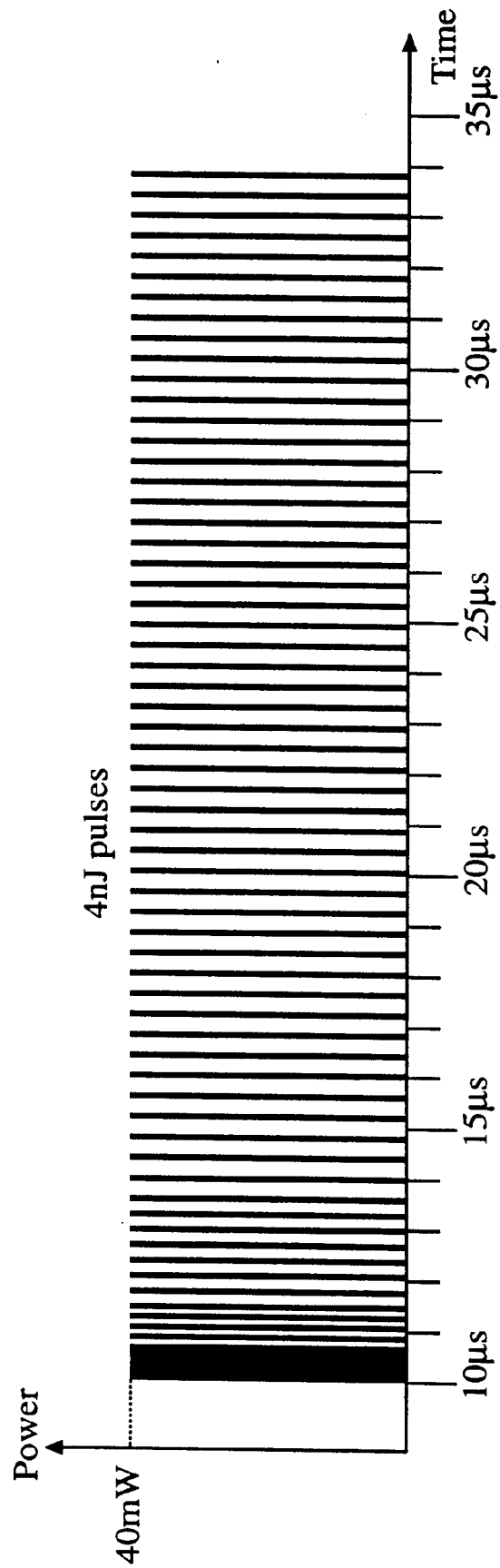
FIG. 3E shows the power pulses which are applied to the nozzle heater to generate the temperature curves of FIG. 3C.

FIG. 3E shows the power applied to the heater. Optimum operation requires a sharp rise in temperature at the start of the heater pulse, a maintenance of the temperature a little below the boiling point of the ink for the duration of the pulse, and a rapid fall in temperature at the end of the pulse. To achieve this, the average energy applied to the heater is varied over the duration of the pulse. In this case, the variation is achieved by pulse frequency modulation of 0.1 ms sub-pulses, each with an energy of 4 nJ. The peak power applied to the heater is 40 mW, and the average power over the duration of the heater pulse is 11.5 mW. The sub-pulse frequency in this case is 5 Mhz. This can readily be varied without significantly affecting the operation of the print head. A higher sub-pulse frequency allows finer control over the power applied to the heater. A sub-pulse frequency of 13.5 Mhz is suitable, as this frequency is also suitable for minimizing the effect of radio frequency interference (RFI).

Inks with a negative temperature coefficient of surface tension

The requirement for the surface tension of the ink to decrease with increasing temperature is not a major restriction, as most pure liquids and many mixtures have this property. Exact equations relating surface tension to temperature for arbitrary liquids are not available. However, the following empirical equation derived by Ramsay and Shields is satisfactory for many liquids:

$$\gamma_T = k \frac{(T_c - T - 6)}{\sqrt[3]{\left(\frac{Mx}{\rho}\right)^2}}$$

Where $g_T$ is the surface tension at temperature T, k is a constant, $T_c$ is the critical temperature of the liquid, M is the molar mass of the liquid, x is the degree of association of the liquid, and r is the density of the liquid. This equation indicates that the surface tension of most liquids falls to zero as the temperature reaches the critical temperature of the liquid. For most liquids, the critical temperature is substantially above the boiling point at atmospheric pressure, so to achieve an ink with a large change in surface tension with a small change in temperature around a practical ejection temperature, the admixture of surfactants is recommended.

The choice of surfactant is important. For example, water based ink for thermal ink jet printers often contains isopropyl alcohol (2-propanol) to reduce the surface tension and promote rapid drying. Isopropyl alcohol has a boiling point of 82.4° C., lower than that of water. As the temperature rises, the alcohol evaporates faster than the water, decreasing the alcohol concentration and causing an increase in surface tension. A surfactant such as 1-Hexanol (b.p. 158° C.) can be used to reverse this effect, and achieve a surface tension which decreases slightly with temperature. However, a relatively large decrease in surface tension with temperature is desirable to maximize operating latitude. A surface tension decrease of 20 mN/m over a 30° C. temperature range is preferred to achieve large operating margins, while as little as 10 mN/m can be used to achieve operation of the print head according to the present invention.

Inks With Large $-Dg_T$

Several methods may be used to achieve a large negative change in surface tension with increasing temperature. Two such methods are:
1) The ink may contain a low concentration sol of a surfactant or mixture of surfactants which is solid at ambient temperatures, but melts at a threshold temperature. Particle sizes less than 1,000 Å are desirable. Suitable surfactant melting points for a water based ink are between 50° C. and 90° C., and preferably between 60° C. and 80° C.
2) The ink may contain an oil/water microemulsion with a phase inversion temperature (PIT) which is above the maximum ambient temperature, but below the boiling point of the ink. For stability, the PIT of the microemulsion is preferably 20° C. or more above the maximum non-operating temperature encountered by the ink. A PIT of approximately 80° C. is suitable.

Inks with Surfactant Sols

Inks can be prepared as a sol of small articles comprising a mixture of at least two surfactants which melts in the desired operating temperature range. Examples of such surfactants include carboxylic acids with between 14 and 30 carbon atoms, such as:

| Name | Formula | m.p. | Synonym |
|---|---|---|---|
| Tetradecanoic acid | $CH_3(CH_2)_{12}COOH$ | 58° C. | Myristic acid |
| Hexadecanoic acid | $CH_3(CH_2)_{14}COOH$ | 63° C. | Palmitic acid |
| Octadecanoic acid | $CH_3(CH_2)_{15}COOH$ | 71° C. | Stearic acid |
| Eicosanoic acid | $CH_3(CH_2)_{16}COOH$ | 77° C. | Arachidic acid |
| Docosanoic acid | $CH_3(CH_2)_{20}COOH$ | 80° C. | Behenic acid |

As the melting point of sols with a small particle size is usually slightly less than of the bulk material, it is preferable to choose a carboxylic acid with a melting point slightly above the desired drop selection temperature. A good example is Arachidic acid.

These carboxylic acids are available in high purity and at low cost. The amount of surfactant required is very small, so the cost of adding them to the ink is insignificant. A mixture of carboxylic acids with slightly varying chain lengths can be used to spread the melting points over a range of temperatures. Such mixtures will typically cost less than the pure acid.

It is not necessary to restrict the choice of surfactant to simple unbranched carboxylic acids. Surfactants with branched chains or phenyl groups, or other hydrophobic moieties can be used. It is also not necessary to use a carboxylic acid. Many highly polar moieties are suitable for the hydrophilic end of the surfactant. It is desirable that the polar end be ionizable in water, so that the surface of the surfactant particles can be charged to aid dispersion and prevent flocculation. In the case of carboxylic acids, this can be achieved by adding an alkali such as sodium hydroxide or potassium hydroxide.

Preparation of Inks with Surfactant Sols

The surfactant sol can be prepared separately at high concentration, and added to the ink in the required concentration.

An example process for creating the surfactant sol is as follows:
1) Add the carboxylic acid to purified water in an oxygen free atmosphere.
2) Heat the mixture to above the melting point of the carboxylic acid. The water can be brought to a boil.
3) Ultrasonicate the mixture, until the typical size of the carboxylic acid droplets is between 100 Å and 1,000 Å.
4) Allow the mixture to cool.
5) Decant the larger particles from the top of the mixture.
6) Add an alkali such as NaOH to ionize the carboxylic acid molecules on the surface of the particles. A pH of approximately 8 is suitable. This step is not absolutely necessary, but helps stabilize the sol.
7) Centrifuge the sol. As the density of the carboxylic acid is lower than water, smaller particles will accumulate at the outside of the centrifuge, and larger particles in the centre.
8) Filter the sol using a microporous filter to eliminate any particles above 5000 Å.
9) Add the surfactant sol to the ink preparation. The sol is required only in very dilute concentration.

The ink preparation will also contain either dye(s) or pigment(s), bactericidal agents, agents to enhance the electrical conductivity of the ink if electrostatic drop separation is used, humectants, and other agents as required.

Anti-foaming agents will generally not be required, as there is no bubble formation during the drop ejection process.

Cationic surfactant sols

Inks made with anionic surfactant sols are generally unsuitable for use with cationic dyes or pigments. This is because the cationic dye or pigment may precipitate or flocculate with the anionic surfactant. To allow the use of cationic dyes and pigments, a cationic surfactant sol is required. The family of alkylamines is suitable for this purpose.

Various suitable alkylamines are shown in the following table:

| Name | Formula | Synonym |
|---|---|---|
| Hexadecylamine | $CH_3(CH_2)_{14}CH_2NH_2$ | Palmityl amine |
| Octadecylamine | $CH_3(CH_2)_{16}CH_2NH_2$ | Stearyl amine |
| Eicosylamine | $CH_3(CH_2)_{18}CH_2NH_2$ | Arachidyl amine |
| Docosylamine | $CH_3(CH_2)_{20}CH_2NH_2$ | Behenyl amine |

The method of preparation of cationic surfactant sols is essentially similar to that of anionic surfactant sols, except that an acid instead of an alkali is used to adjust the pH balance and increase the charge on the surfactant particles. A pH of 6 using HCl is suitable.

Microemulsion Based Inks

An alternative means of achieving a large reduction in surface tension as some temperature threshold is to base the ink on a microemulsion. A microemulsion is chosen with a phase inversion temperature (PIT) around the desired ejection threshold temperature. Below the PIT, the microemulsion is oil in water (O/W), and above the PIT the microemulsion is water in oil (W/O). At low temperatures, the surfactant forming the microemulsion prefers a high curvature surface around oil, and at temperatures significantly above the PIT, the surfactant prefers a high curvature surface around water. At temperatures close to the PIT, the microemulsion forms a continuous 'sponge' of topologically connected water and oil.

There are two mechanisms whereby this reduces the surface tension. Around the PIT, the surfactant prefers surfaces with very low curvature. As a result, surfactant molecules migrate to the ink/air interface, which has a curvature which is much less than the curvature of the oil emulsion. This lowers the surface tension of the water. Above the phase inversion temperature, the microemulsion changes from O/W to W/O, and therefore the ink/air interface changes from water/air to oil/air. The oil/air interface has a lower surface tension.

There is a wide range of possibilities for the preparation of microemulsion based inks.

For fast drop ejection, it is preferable to chose a low viscosity oil. In many instances, water is a suitable polar solvent. However, in some cases different polar solvents may be required. In these cases, polar solvents with a high surface tension should be chosen, so that a large decrease in surface tension is achievable.

The surfactant can be chosen to result in a phase inversion temperature in the desired range. For example, surfactants of the group poly(oxyethylene)alkylphenyl ether (ethoxylated alkyl phenols, general formula: $C_nH_{2n+1}C_4H_6(CH_2CH_2O)_mOH$) can be used. The hydrophilicity of the surfactant can be increased by increasing m, and the hydrophobicity can be increased by increasing n. Values of m of approximately 10, and n of approximately 8 are suitable.

Low cost commercial preparations are the result of a polymerization of various molar ratios of ethylene oxide and alkyl phenols, and the exact number of oxyethylene groups varies around the chosen mean. These commercial preparations are adequate, and highly pure surfactants with a specific number of oxyethylene groups are not required.

The formula for this surfactant is $C_8H_{17}C_4H_6(CH_2CH_2O)_nOH$ (average n=10).

Synonyms include Octoxynol-10, PEG-10 octyl phenyl ether and POE (10) octyl phenyl ether.

The HLB is 13.6, the melting point is 7° C., and the cloud point is 65° C.

Commercial preparations of this surfactant are available under various brand names. Suppliers and brand names are listed in the following table:

| Trade Name | Supplier |
| --- | --- |
| Akyporox OP100 | Chem-Y GmbH |
| Alkasurf OP-10 | Rhone-Poulenc Surfactants and Specialties |
| Dehydrophen POP 10 | Pulcra SA |
| Hyonic OP-10 | Henkel Corp. |
| Iconol OP-10 | BASF Corp. |
| Igepal O | Rhone-Poulenc France |
| Macol OP-10 | PPG Industries |
| Malorphen 810 | Huls AG |
| Nikkol OP-10 | Nikko Chem. Co. Ltd. |
| Renex 750 | ICI Americas Inc. |
| Rexol 45/10 | Hart Chemical Ltd. |
| Synperonic OP10 | ICI PLC |
| Teric X10 | ICI Australia |

These are available in large volumes at low cost (less than one dollar per pound in quantity), and so contribute less than 10 cents per liter to prepared microemulsion ink with a 5% surfactant concentration.

Other suitable ethoxylated alkyl phenols include those listed in the following table:

| Trivial Name | Formula | HLB | Cloud Point |
| --- | --- | --- | --- |
| Nonoxynol-9 | $C_9H_{19}C_4H_6(CH_2CH_2O)_9OH$ | 13 | 54° C. |
| Nonoxynol-10 | $C_9H_{19}C_4H_6(CH_2CH_2O)_{10}OH$ | 13.2 | 62° C. |
| Nonoxynol-11 | $C_9H_{19}C_4H_6(CH_2CH_2O)_{11}OH$ | 13.8 | 72° C. |
| Nonoxynol-12 | $C_9H_{19}C_4H_6(CH_2CH_2O)_{12}OH$ | 14.5 | 81° C. |
| Octoxynol-9 | $C_8H_{17}C_4H_6(CH_2CH_2O)_9OH$ | 12.1 | 61° C. |
| Octoxynol-10 | $C_8H_{17}C_4H_6(CH_2CH_2O)_{10}OH$ | 13.6 | 65° C. |
| Octoxynol-12 | $C_8H_{17}C_4H_6(CH_2CH_2O)_{12}OH$ | 14.6 | 88° C. |
| Dodoxynol-10 | $C_{12}H_{25}C_4H_6(CH_2CH_2O)_{10}OH$ | 12.6 | 42° C. |
| Dodoxynol-11 | $C_{12}H_{25}C_4H_6(CH_2CH_2O)_{11}OH$ | 13.5 | 56° C. |
| Dodoxynol-14 | $C_{12}H_{25}C_4H_6(CH_2CH_2O)_{14}OH$ | 14.5 | 87° C. |

Microemulsion based inks have advantages other than surface tension control:

1) Microemulsions are thermodynamically stable, and will not separate. Therefore, the storage time can be very long. This is especially significant for office and portable printers, which may be used sporadically.
2) The microemulsion will form spontaneously with a particular drop size, and does not require extensive stirring, centrifuging, or filtering to ensure a particular range of emulsified oil drop sizes.
3) The amount of oil contained in the ink can be quite high, so dyes which are soluble in oil or soluble in water, or both, can be used. It is also possible to use a mixture of dyes, one soluble in water, and the other soluble in oil, to obtain specific colors.
4) Oil miscible pigments are prevented from flocculating, as they are trapped in the oil microdroplets.
5) The use of a microemulsion can reduce the mixing of different dye colors on the surface of the print medium.
6) The viscosity of microemulsions is very low.
7) The requirement for humectants can be reduced or eliminated.

Dyes and pigments in microemulsion based inks

Oil in water mixtures can have high oil contents—as high as 40%—and still form O/W microemulsions. This allows a high dye or pigment loading.

Mixtures of dyes and pigments can be used. An example of a microemulsion based ink mixture with both dye and pigment is as follows:

1) 70% water
2) 5% water soluble dye
3) 5% surfactant
4) 10% oil
5) 10% oil miscible pigment The following table shows the nine basic combinations of colorants in the oil and water phases of the microemulsion that may be used.

| Combination | Colorant in water phase | Colorant in oil phase |
|---|---|---|
| 1 | none | oil miscible pigment |
| 2 | none | oil soluble dye |
| 3 | water soluble dye | none |
| 4 | water soluble dye | oil miscible pigment |
| 5 | water soluble dye | oil soluble dye |
| 6 | pigment dispersed in water | none |
| 7 | pigment dispersed in water | oil miscible pigment |
| 8 | pigment dispersed in water | oil soluble dye |
| 9 | none | none |

The ninth combination, with no colorants, is useful for printing transparent coatings, UV ink, and selective gloss highlights.

As many dyes are amphiphilic, large quantities of dyes can also be solubilized in the oil-water boundary layer as this layer has a very large surface area.

It is also possible to have multiple dyes or pigments in each phase, and to have a mixture of dyes and pigments in each phase.

When using multiple dyes or pigments the absorption spectrum of the resultant ink will be the weighted average of the absorption spectra of the different colorants used. This presents two problems:

1) The absorption spectrum will tend to become broader, as the absorption peaks of both colorants are averaged. This has a tendency to 'muddy' the colors. To obtain brilliant color, careful choice of dyes and pigments based on their absorption spectra, not just their human-perceptible color, needs to be made.
2) The color of the ink may be different on different substrates. If a dye and a pigment are used in combination, the color of the dye will tend to have a smaller contribution to the printed ink color on more absorptive papers, as the dye will be absorbed into the paper, while the pigment will tend to 'sit on top' of the paper. This may be used as an advantage in some circumstances.

Surfactants with a Krafft point in the drop selection temperature range

For ionic surfactants there is a temperature (the Krafft point) below which the solubility is quite low, and the solution contains essentially no micelles. Above the Krafft temperature micelle formation becomes possible and there is a rapid increase in solubility of the surfactant. If the critical micelle concentration (CMC) exceeds the solubility of a surfactant at a particular temperature, then the minimum surface tension will be achieved at the point of maximum solubility, rather than at the CMC. Surfactants are usually much less effective below the Krafft point.

This factor can be used to achieve an increased reduction in surface tension with increasing temperature. At ambient temperatures, only a portion of the surfactant is in solution. When the nozzle heater is turned on, the temperature rises, and more of the surfactant goes into solution, decreasing the surface tension.

A surfactant should be chosen with a Krafft point which is near the top of the range of temperatures to which the ink is raised. This gives a maximum margin between the concentration of surfactant in solution at ambient temperatures, and the concentration of surfactant in solution at the drop selection temperature.

The concentration of surfactant should be approximately equal to the CMC at the Krafft point. In this manner, the surface tension is reduced to the maximum amount at elevated temperatures, and is reduced to a minimum amount at ambient temperatures.

The following table shows some commercially available surfactants with Krafft points in the desired range.

| Formula | Krafft point |
|---|---|
| $C_{16}H_{33}SO_3^-Na^+$ | 57° C. |
| $C_{18}H_{37}SO_3^-Na^+$ | 70° C. |
| $C_{16}H_{33}SO_4^-Na^+$ | 45° C. |
| $Na^+{}^-O_4S(CH_2)_{16}SO_4^-Na^+$ | 44.9° C. |
| $K^+{}^-O_4S(CH_2)_{16}SO_4^-K^+$ | 55° C. |
| $C_{16}H_{33}CH(CH_3)C_4H_6SO_3^-Na^+$ | 60.8° C. |

Surfactants with a cloud point in the drop selection temperature range

Non-ionic surfactants using polyoxyethylene (POE) chains can be used to create an ink where the surface tension falls with increasing temperature. At low temperatures, the POE chain is hydrophilic, and maintains the surfactant in solution. As the temperature increases, the structured water around the POE section of the molecule is disrupted, and the POE section becomes hydrophobic. The surfactant is increasingly rejected by the water at higher temperatures, resulting in increasing concentration of surfactant at the air/ink interface, thereby lowering surface tension. The temperature at which the POE section of a nonionic surfactant becomes hydrophobic is related to the cloud point of that surfactant. POE chains by themselves are not particularly suitable, as the cloud point is generally above 100° C.

Polyoxypropylene (POP) can be combined with POE in POE/POP block copolymers to lower the cloud point of POE chains without introducing a strong hydrophobicity at low temperatures.

Two main configurations of symmetrical POE/POP block copolymers are available. These are:

1) Surfactants with POE segments at the ends of the molecules, and a POP segment in the centre, such as the poloxamer class of surfactants (generically CAS 9003-11-6)
2) Surfactants with POP segments at the ends of the molecules, and a POE segment in the centre, such as the meroxapol class of surfactants (generically also CAS 9003-11-6)

Some commercially available varieties of poloxamer and meroxapol with a high surface tension at room temperature, combined with a cloud point above 40° C. and below 100° C. are shown in the following table:

| Trivial Name | BASF Trade Name | Formula | Surface Tension (mN/m) | Cloud Point |
|---|---|---|---|---|
| Meroxapol 105 | Pluronic 10R5 | $HO(CHCH_3CH_2O)_{-7}-$ $(CH_2CH_2O)_{-22}-$ $(CHCH_3CH_2O)_{-7}OH$ | 50.9 | 69° C. |
| Meroxapol 108 | Pluronic 10R8 | $HO(CHCH_3CH_2O)_{-7}-$ $(CH_2CH_2O)_{-91}-$ $(CHCH_3CH_2O)_{-7}OH$ | 54.1 | 99° C. |
| Meroxapol 178 | Pluronic 17R8 | $HO(CHCH_3CH_2O)_{-12}-$ $(CH_2CH_2O)_{-136}-$ $(CHCH_3CH_2O)_{-12}OH$ | 47.3 | 81° C. |
| Meroxapol 258 | Pluronic 25R8 | $HO(CHCH_3CH_2O)_{-18}-$ $(CH_2CH_2O)_{-163}-$ $(CHCH_3CH_2O)_{-18}OH$ | 46.1 | 80° C. |

-continued

| Trivial Name | BASF Trade Name | Formula | Surface Tension (mN/m) | Cloud Point |
|---|---|---|---|---|
| Poloxamer 105 | Pluronic L35 | $HO(CH_2CH_2O)_{-11}—$ $(CHCH_3CH_2O)_{-16}—$ $(CH_2CH_2O)_{-11}OH$ | 48.8 | 77° C. |
| Poloxamer 124 | Pluronic L44 | $HO(CH_2CH_2O)_{-11}—$ $(CHCH_3CH_2O)_{-21}—$ $(CH_2CH_2O)_{-11}OH$ | 45.3 | 65° C. |

Other varieties of poloxamer and meroxapol can readily be synthesized using well known techniques. Desirable characteristics are a room temperature surface tension which is as high as possible, and a cloud point between 40° C. and 100° C., and preferably between 60° C. and 80° C.

Meroxapol $[HO(CHCH_3CH_2O)_x(CH_2CH_2O)_y(CHCH_3CH_2O)_zOH]$ varieties where the average x and z are approximately 4, and the average y is approximately 15 may be suitable.

If salts are used to increase the electrical conductivity of the ink, then the effect of this salt on the cloud point of the surfactant should be considered.

The cloud point of POE surfactants is increased by ions that disrupt water structure (such as I$^-$), as this makes more water molecules available to form hydrogen bonds with the POE oxygen lone pairs. The cloud point of POE surfactants is decreased by ions that form water structure (such as Cl$^-$, OH$^-$), as fewer water molecules are available to form hydrogen bonds. Bromide ions have relatively little effect. The ink composition can be 'tuned' for a desired temperature range by altering the lengths of POE and POP chains in a block copolymer surfactant, and by changing the choice of salts (e.g Cl$^-$ to Br$^-$ to I$^-$) that are added to increase electrical conductivity. NaCl is likely to be the best choice of salts to increase ink conductivity, due to low cost and non-toxicity. NaCl slightly lowers the cloud point of nonionic surfactants.

Hot Melt Inks

The ink need not be in a liquid state at room temperature. Solid 'hot melt' inks can be used by heating the printing head and ink reservoir above the melting point of the ink. The hot melt ink must be formulated so that the surface tension of the molten ink decreases with temperature. A decrease of approximately 2 mN/m will be typical of many such preparations using waxes and other substances. However, a reduction in surface tension of approximately 20 mN/m is desirable in order to achieve good operating margins when relying on a reduction in surface tension rather than a reduction in viscosity.

The temperature difference between quiescent temperature and drop selection temperature may be greater for a hot melt ink than for a water based ink, as water based inks are constrained by the boiling point of the water.

The ink must be liquid at the quiescent temperature. The quiescent temperature should be higher than the highest ambient temperature likely to be encountered by the printed page. The quiescent temperature should also be as low as practical, to reduce the power needed to heat the print head, and to provide a maximum margin between the quiescent and the drop ejection temperatures. A quiescent temperature between 60° C. and 90° C. is generally suitable, though other temperatures may be used. A drop ejection temperature of between 160° C. and 200° C. is generally suitable.

There are several methods of achieving an enhanced reduction in surface tension with increasing temperature.

1) A dispersion of microfine particles of a surfactant with a melting point substantially above the quiescent temperature, but substantially below the drop ejection temperature, can be added to the hot melt ink while in the liquid phase.
2) A polar/non-polar microemulsion with a PIT which is preferably at least 20° C. above the melting points of both the polar and non-polar compounds.

To achieve a large reduction in surface tension with temperature, it is desirable that the hot melt ink carrier have a relatively large surface tension (above 30 mN/m) when at the quiescent temperature. This generally excludes alkanes such as waxes. Suitable materials will generally have a strong intermolecular attraction, which may be achieved by multiple hydrogen bonds, for example, polyols, such as Hexanetetrol, which has a melting point of 88° C.

Surface tension reduction of various solutions

FIG. 3D shows the measured effect of temperature on the surface tension of various aqueous preparations containing the following additives:
1) 0.1% sol of Stearic Acid
2) 0.1% sol of Palmitic acid
3) 0.1% solution of Pluronic 10R5 (trademark of BASF)
4) 0.1% solution of Pluronic L35 (trademark of BASF)
5) 0.1% solution of Pluronic L44 (trademark of BASF)

Inks suitable for printing systems of the present invention are described in the following Australian patent specifications, the disclosure of which are hereby incorporated by reference:
'Ink composition based on a microemulsion' (Filing no.: PN5223, filed on Sep. 6, 1995);
'Ink composition containing surfactant sol' (Filing no.: PN5224, filed on Sep. 6, 1995);
'Ink composition for DOD printers with Krafft point near the drop selection temperature sol' (Filing no.: PN6240, filed on Oct. 30, 1995); and
'Dye and pigment in a microemulsion based ink' (Filing no.: PN6241, filed on Oct. 30, 1995).

Operation Using Reduction of Viscosity

As a second example, operation of an embodiment using thermal reduction of viscosity and proximity drop separation, in combination with hot melt ink, is as follows. Prior to operation of the printer, solid ink is melted in the reservoir 64. The reservoir, ink passage to the print head, ink channels 75, and print head 50 are maintained at a temperature at which the ink 100 is liquid, but exhibits a relatively high viscosity (for example, approximately 100 cP). The Ink 100 is retained in the nozzle by the surface tension of the ink. The ink 100 is formulated so that the viscosity of the ink reduces with increasing temperature. The ink pressure oscillates at a frequency which is an integral multiple of the drop ejection frequency from the nozzle. The ink pressure oscillation causes oscillations of the ink meniscus at the nozzle tips, but this oscillation is small due to the high ink viscosity. At the normal operating temperature, these oscillations are of insufficient amplitude to result in drop separation. When the heater 103 is energized, the ink forming the selected drop is heated, causing a reduction in viscosity to a value which is preferably less than 5 cP. The reduced viscosity results in the ink meniscus moving further during the high pressure part of the ink pressure cycle. The recording medium 51 is arranged sufficiently close to the print head 50 so that the selected drops contact the recording medium 51, but sufficiently far away that the unselected drops do not contact the recording medium 51. Upon contact with the recording medium 51, part of the selected drop freezes, and attaches to the recording medium. As the ink pressure falls, ink begins to move back into the nozzle. The body of ink separates from the ink which is frozen onto the recording medium. The meniscus of the ink 100 at the nozzle tip then returns to low amplitude oscillation. The viscosity of the ink increases to its quiescent level as remaining heat is dissipated to the bulk ink and print head. One ink drop is selected, separated and forms a spot on the recording medium 51 for each heat pulse. As the heat pulses are electrically controlled, drop on demand ink jet operation can be achieved.

Image Processing for Print Heads

An objective of printing systems according to the invention is to attain a print quality which is equal to that which people are accustomed to in quality color publications printed using offset printing. This can be achieved using a print resolution of approximately 1,600 dpi. However, 1,600 dpi printing is difficult and expensive to achieve. Similar results can be achieved using 800 dpi printing, with 2 bits per pixel for cyan and magenta, and one bit per pixel for yellow and black. This color model is herein called CC'MM'YK. Where high quality monochrome image printing is also required, two bits per pixel can also be used for black. This color model is herein called CC'MM'YKK'.

Applications Using Print Heads According to this Invention

Printing apparatus and methods of this invention are suitable for a wide range of applications, including (but not limited to) the following: color and monochrome office printing, short run digital printing, high speed digital printing, process color printing, spot color printing, offset press supplemental printing, low cost printers using scanning print heads, high speed printers using page width print heads, portable color and monochrome printers, color and monochrome copiers, color and monochrome facsimile machines, combined printer, facsimile and copying machines, label printing, large format plotters, photographic duplication, printers for digital photographic processing, portable printers incorporated into digital 'instant' cameras, video printing, printing of PhotoCD images, portable printers for 'Personal Digital Assistants', wallpaper printing, indoor sign printing, billboard printing, and fabric printing.

Compensation of Print Heads for Environmental Conditions

It is desirable that drop on demand printing systems have consistent and predictable ink drop size and position. Unwanted variation in ink drop size and position causes variations in the optical density of the resultant print, reducing the perceived print quality. These variations should be kept to a small proportion of the nominal ink drop volume and pixel spacing respectively. Many environmental variables can be compensated to reduce their effect to insignificant levels. Active compensation of some factors can be achieved by varying the power applied to the nozzle heaters.

An optimum temperature profile for one print head embodiment involves an instantaneous raising of the active region of the nozzle tip to the ejection temperature, maintenance of this region at the ejection temperature for the duration of the pulse, and instantaneous cooling of the region to the ambient temperature.

This optimum is not achievable due to the stored heat capacities and thermal conductivities of the various materials used in the fabrication of the nozzles in accordance with the invention. However, improved performance can be achieved by shaping the power pulse using curves which can be derived by iterative refinement of finite element simulation of the print head. The power applied to the heater can be varied in time by various techniques, including, but not limited to:

1) Varying the voltage applied to the heater
2) Modulating the width of a series of short pulses (PWM)
3) Modulating the frequency of a series of short pulses (PFM)

To obtain accurate results, a transient fluid dynamic simulation with free surface modeling is required, as convection in the ink, and ink flow, significantly affect on the temperature achieved with a specific power curve. By the incorporation of appropriate digital circuitry on the print head substrate, it is practical to individually control the power applied to each nozzle. One way to achieve this is by 'broadcasting' a variety of different digital pulse trains across the print head chip, and selecting the appropriate pulse train for each nozzle using multiplexing circuits.

An example of the environmental factors which may be compensated for is listed in the table "Compensation for environmental factors". This table identifies which environmental factors are best compensated globally (for the entire print head), per chip (for each chip in a composite multi-chip print head), and per nozzle.

| Compensation for environmental factors | | | |
|---|---|---|---|
| Factor Compensated | Scope | Sensing or User Control Method | Compensation Mechanism |
| Ambient Temperature | Global | Temperature sensor mounted on print head | Power supply voltage or global PFM patterns |
| Power supply voltage fluctuation with number of active nozzles | Global | Predictive active nozzle count based on print data | Power supply voltage or global PFM patterns |
| Local heat build-up with successive nozzle actuation | Per nozzle | Predictive active nozzle count based on print data | Selection of appropriate PFM pattern for each printed drop |
| Drop size control for multiple bits per pixel | Per nozzle | Image data | Selection of appropriate PFM pattern for each printed drop |
| Nozzle geometry variations between wafers | Per chip | Factory measurement, datafile supplied with print head | Global PFM patterns per print head chip |
| Heater resistivity variations between wafers | Per chip | Factory measurement, datafile supplied with print head | Global PFM patterns per print head chip |
| User image intensity adjustment | Global | User selection | Power supply voltage, electrostatic acceleration voltage, or ink pressure |
| Ink surface tension reduction method and threshold temperature | Global | Ink cartridge sensor or user selection | Global PFM patterns |
| Ink viscosity | Global | Ink cartridge sensor or user selection | Global PFM patterns and/or clock rate |
| Ink dye or pigment concentration | Global | Ink cartridge sensor or user selection | Global PFM patterns |
| Ink response time | Global | Ink cartridge sensor or user selection | Global PFM patterns |

Most applications will not require compensation for all of these variables. Some variables have a minor effect, and compensation is only necessary where very high image quality is required.

Print head drive circuits

Figure 4:
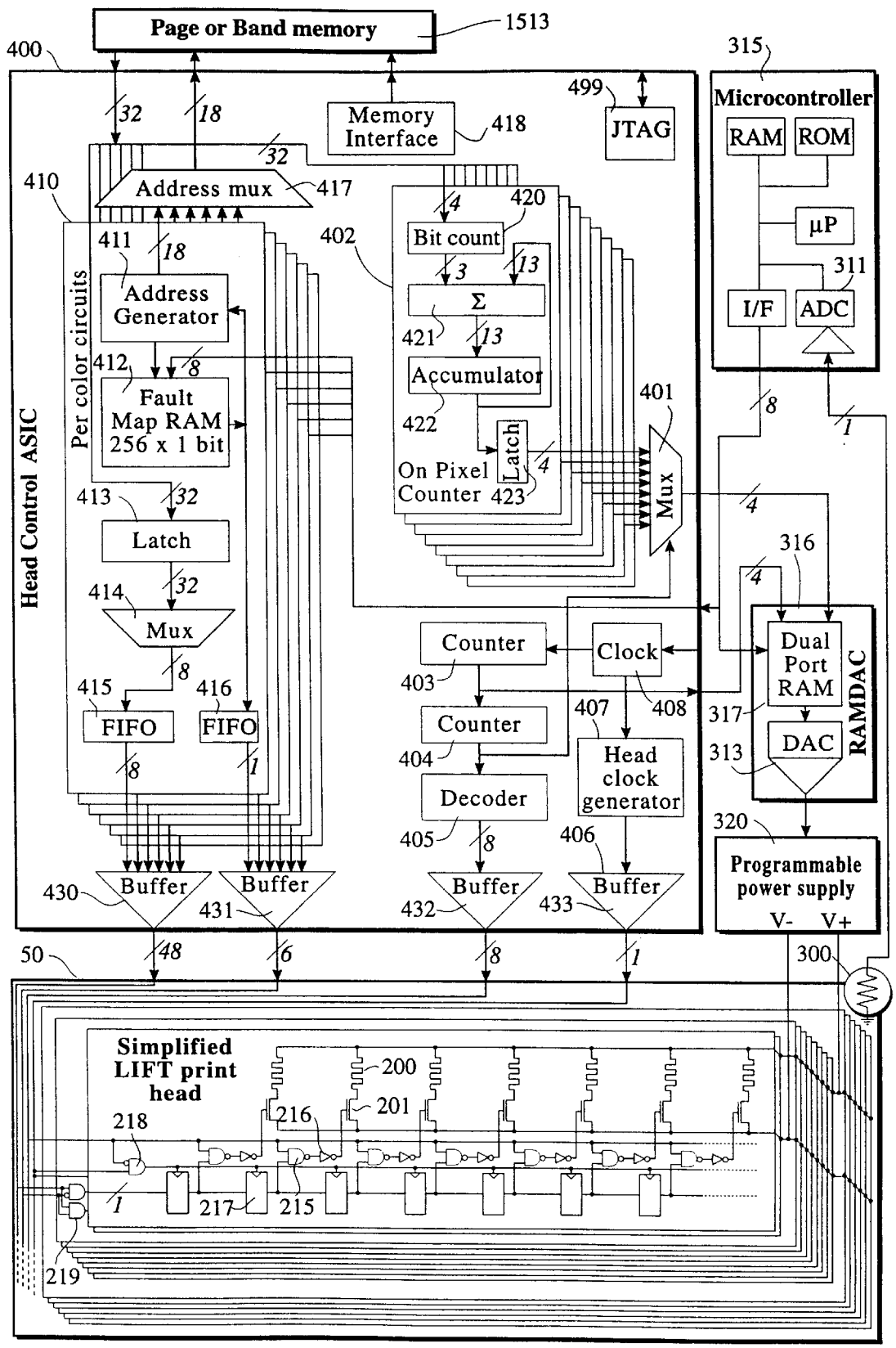
FIG. 4 shows a block schematic diagram of print head drive circuitry for practice of the invention.

FIG. 4 is a block schematic diagram showing electronic operation of an example head driver circuit in accordance with this invention. This control circuit uses analog modulation of the power supply voltage applied to the print head to achieve heater power modulation, and does not have individual control of the power applied to each nozzle. FIG. 4 shows a block diagram for a system using an 800 dpi page width print head which prints process color using the CC'MM'YK color model. The print head 50 has a total of 79,488 nozzles, with 39,744 main nozzles and 39,744 redundant nozzles. The main and redundant nozzles are divided into six colors, and each color is divided into 8 drive phases. Each drive phase has a shift register which converts the serial data from a head control ASIC 400 into parallel data for enabling heater drive circuits. There is a total of 96 shift registers, each providing data for 828 nozzles. Each shift register is composed of 828 shift register stages 217, the outputs of which are logically anded with phase enable signal by a nand gate 215. The output of the nand gate 215 drives an inverting buffer 216, which in turn controls the drive transistor 201. The drive transistor 201 actuates the electrothermal heater 200, which may be a heater 103 as shown in FIG. 1B. To maintain the shifted data valid during the enable pulse, the clock to the shift register is stopped the enable pulse is active by a clock stopper 218, which is shown as a single gate for clarity, but is preferably any of a range of well known glitch free clock control circuits. Stopping the clock of the shift register removes the requirement for a parallel data latch in the print head, but adds some complexity to the control circuits in the Head Control ASIC 400. Data is routed to either the main nozzles or the redundant nozzles by the data router 219 depending on the state of the appropriate signal of the fault status bus.

The print head shown in FIG. 4 is simplified, and does not show various means of improving manufacturing yield, such as block fault tolerance. Drive circuits for different configurations of print head can readily be derived from the apparatus disclosed herein.

Digital information representing patterns of dots to be printed on the recording medium is stored in the Page or Band memory 1513, which may be the same as the Image memory 72 in FIG. 1A. Data in 32 bit words representing dots of one color is read from the Page or Band memory 1513 using addresses selected by the address mux 417 and control signals generated by the Memory Interface 418. These addresses are generated by Address generators 411, which forms part of the 'Per color circuits' 410, for which there is one for each of the six color components. The addresses are generated based on the positions of the nozzles in relation to the print medium. As the relative position of the nozzles may be different for different print heads, the Address generators 411 are preferably made programmable. The Address generators 411 normally generate the address corresponding to the position of the main nozzles. However, when faulty nozzles are present, locations of blocks of nozzles containing faults can be marked in the Fault Map RAM 412. The Fault Map RAM 412 is read as the page is printed. If the memory indicates a fault in the block of nozzles, the address is altered so that the Address generators 411 generate the address corresponding to the position of the redundant nozzles. Data read from the Page or Band memory 1513 is latched by the latch 413 and converted to four sequential bytes by the multiplexer 414. Timing of these bytes is adjusted to match that of data representing other colors by the FIFO 415. This data is then buffered by the buffer 430 to form the 48 bit main data bus to the print head 50. The data is buffered as the print head may be located a relatively long distance from the head control ASIC. Data from the Fault Map RAM 412 also forms the input to the FIFO 416. The timing of this data is matched to the data output of the FIFO 415, and buffered by the buffer 431 to form the fault status bus.

The programmable power supply 320 provides power for the head 50. The voltage of the power supply 320 is controlled by the DAC 313, which is part of a RAM and DAC combination (RAMDAC) 316. The RAMDAC 316 contains a dual port RAM 317. The contents of the dual port RAM 317 are programmed by the Microcontroller 315. Temperature is compensated by changing the contents of the dual port RAM 317. These values are calculated by the microcontroller 315 based on temperature sensed by a thermal sensor 300. The thermal sensor 300 signal connects to the Analog to Digital Converter (ADC) 311. The ADC 311 is preferably incorporated in the Microcontroller 315.

The Head Control ASIC 400 contains control circuits for thermal lag compensation and print density. Thermal lag compensation requires that the power supply voltage to the head 50 is a rapidly time-varying voltage which is synchronized with the enable pulse for the heater. This is achieved by programming the programmable power supply 320 to produce this voltage. An analog time varying programming voltage is produced by the DAC 313 based upon data read from the dual port RAM 317. The data is read according to an address produced by the counter 403. The counter 403 produces one complete cycle of addresses during the period of one enable pulse. This synchronization is ensured, as the counter 403 is clocked by the system clock 408, and the top count of the counter 403 is used to clock the enable counter 404. The count from the enable counter 404 is then decoded by the decoder 405 and buffered by the buffer 432 to produce the enable pulses for the head 50. The counter 403 may include a prescaler if the number of states in the count is less than the number of clock periods in one enable pulse. Sixteen voltage states are adequate to accurately compensate for the heater thermal lag. These sixteen states can be specified by using a four bit connection between the counter 403 and the dual port RAM 317. However, these sixteen states may not be linearly spaced in time. To allow non-linear timing of these states the counter 403 may also include a ROM or other device which causes the counter 403 to count in a non-linear fashion. Alternatively, fewer than sixteen states may be used.

For print density compensation, the printing density is detected by counting the number of pixels to which a drop is to be printed ('on' pixels) in each enable period. The 'on' pixels are counted by the On pixel counters 402. There is one On pixel counter 402 for each of the eight enable phases. The number of enable phases in a print head in accordance with the invention depend upon the specific design. Four, eight, and sixteen are convenient numbers, though there is no requirement that the number of enable phases is a power of two. The On Pixel Counters 402 can be composed of combinatorial logic pixel counters 420 which determine how many bits in a nibble of data are on. This number is then accumulated by the adder 421 and accumulator 422. A latch 423 holds the accumulated value valid for the duration of the enable pulse. The multiplexer 401 selects the output of the latch 423 which corresponds to the current enable phase, as determined by the enable counter 404. The output of the multiplexer 401 forms part of the address of the dual port RAM 317. An exact count of the number of 'on' pixels is not necessary, and the most significant four bits of this count are adequate.

Combining the four bits of thermal lag compensation address and the four bits of print density compensation address means that the dual port RAM 317 has an 8 bit address. This means that the dual port RAM 317 contains 256 numbers, which are in a two dimensional array. These two dimensions are time (for thermal lag compensation) and print density. A third dimension—temperature—can be included. As the ambient temperature of the head varies only slowly, the microcontroller 315 has sufficient time to calculate a matrix of 256 numbers compensating for thermal lag and print density at the current temperature. Periodically (for example, a few times a second), the microcontroller senses the current head temperature and calculates this matrix.

The clock to the print head 50 is generated from the system clock 408 by the Head clock generator 407, and buffered by the buffer 406. To facilitate testing of the Head control ASIC, JTAG test circuits 499 may be included.

The clock to the LIFT print head 50 is generated from the system clock 408 by the Head clock generator 407, and buffered by the buffer 406. To facilitate testing of the Head control ASIC, JTAG test circuits 499 may be included.

Comparison with thermal ink jet technology

The table "Comparison between Thermal ink jet and Present Invention" compares the aspects of printing in accordance with the present invention with thermal ink jet printing technology.

A direct comparison is made between the present invention and thermal ink jet technology because both are drop on demand systems which operate using thermal actuators and liquid ink. Although they may appear similar, the two technologies operate on different principles.

Thermal ink jet printers use the following fundamental operating principle. A thermal impulse caused by electrical resistance heating results in the explosive formation of a bubble in liquid ink. Rapid and consistent bubble formation can be achieved by superheating the ink, so that sufficient heat is transferred to the ink before bubble nucleation is complete. For water based ink, ink temperatures of approximately 280° C. to 400° C. are required. The bubble formation causes a pressure wave which forces a drop of ink from the aperture with high velocity. The bubble then collapses, drawing ink from the ink reservoir to refill the nozzle. Thermal ink jet printing has been highly successful commercially due to the high nozzle packing density and the use of well established integrated circuit manufacturing techniques. However, thermal ink jet printing technology faces significant technical problems including multi-part precision fabrication, device yield, image resolution, 'pepper' noise, printing speed, drive transistor power, waste power dissipation, satellite drop formation, thermal stress, differential thermal expansion, kogation, cavitation, rectified diffusion, and difficulties in ink formulation.

Printing in accordance with the present invention has many of the advantages of thermal ink jet printing, and completely or substantially eliminates many of the inherent problems of thermal ink jet technology.

| Comparison between Thermal ink jet and Present Invention | | |
|---|---|---|
| | Thermal Ink-Jet | Present Invention |
| Drop selection mechanism | Drop ejected by pressure wave caused by thermally induced bubble | Choice of surface tension or viscosity reduction mechanisms |
| Drop separation mechanism | Same as drop selection mechanism | Choice of proximity, electrostatic, magnetic, and other methods |
| Basic ink carrier | Water | Water, microemulsion, alcohol, glycol, or hot melt |
| Head construction | Precision assembly of nozzle plate, ink channel, and substrate | Monolithic |
| Per copy printing cost | Very high due to limited print head life and expensive inks | Can be low due to permanent print heads and wide range of possible inks |
| Satellite drop formation | Significant problem which degrades image quality | No satellite drop formation |
| Operating ink temperature | 280° C. to 400° C. (high temperature limits dye use and ink formulation) | Approx. 70° C. (depends upon ink formulation) |
| Peak heater temperature | 400° C. to 1,000° C. (high temperature reduces device life) | Approx. 130° C. |
| Cavitation (heater erosion by bubble collapse) | Serious problem limiting head life | None (no bubbles are formed) |
| Kogation (coating of heater by ink ash) | Serious problem limiting head life and ink formulation | None (water based ink temperature does not exceed 100° C.) |
| Rectified diffusion (formation of ink bubbles due to pressure cycles) | Serious problem limiting ink formulation | Does not occur as the ink pressure does not go negative |
| Resonance | Serious problem limiting nozzle design and repetition rate | Very small effect as pressure waves are small |
| Practical resolution | Approx. 800 dpi max. | Approx. 1,600 dpi max. |
| Self-cooling operation | No (high energy required) | Yes: printed ink carries away drop selection energy |
| Drop ejection velocity | High (approx. 10 m/sec) | Low (approx. 1 m/sec) |
| Crosstalk | Serious problem requiring careful acoustic design, which limits nozzle refill rate. | Low velocities and pressures associated with drop ejection make crosstalk very small. |
| Operating thermal stress | Serious problem limiting print-head life. | Low: maximum temperature increase approx. 90° C. at centre of heater. |
| Manufacturing thermal stress | Serious problem limiting print-head size. | Same as standard CMOS manufacturing process. |
| Drop selection energy | Approx. 20 mJ | Approx. 270 nJ |
| Heater pulse period | Approx. 2–3 ms | Approx. 15–30 ms |
| Average heater pulse power | Approx. 8 Watts per heater. | Approx. 12 mW per heater. This is more than 500 times less than Thermal Ink-Jet. |
| Heater pulse voltage | Typically approx. 40 V. | Approx. 5 to 10 V. |
| Heater peak pulse current | Typically approx. 200 mA per heater. This requires bipolar or very large MOS drive transistors. | Approx. 4 mA per heater. This allows the use of small MOS drive transistors. |
| Fault tolerance | Not implemented. Not practical for edge shooter type. | Simple implementation results in better yield and reliability |
| Constraints on ink composition | Many constraints including kogation, nucleation, etc. | Temperature coefficient of surface tension or viscosity must be negative. |

-continued

Comparison between Thermal ink jet and Present Invention

| | Thermal Ink-Jet | Present Invention |
|---|---|---|
| Ink pressure | Atmospheric pressure or less | Approx. 1.1 atm |
| Integrated drive circuitry | Bipolar circuitry usually required due to high drive current | CMOS, nMOS, or bipolar |
| Differential thermal expansion | Significant problem for large print heads | Monolithic construction reduces problem |
| Page width print heads | Major problems with yield, cost, precision construction, head life, and power dissipation | High yield, low cost and long life due to fault tolerance. Self cooling due to low power dissipation. |

Yield and Fault Tolerance

In most cases, monolithic integrated circuits cannot be repaired if they are not completely functional when manufactured. The percentage of operational devices which are produced from a wafer run is known as the yield. Yield has a direct influence on manufacturing cost. A device with a yield of 5% is effectively ten times more expensive to manufacture than an identical device with a yield of 50%.

There are three major yield measurements:

1) Fab yield
2) Wafer sort yield
3) Final test yield

For large die, it is typically the wafer sort yield which is the most serious limitation on total yield. Full page width color heads in accordance with this invention are very large in comparison with typical VLSI circuits. Good water sort yield is critical to the cost-effective manufacture of such heads.

Figure 5:
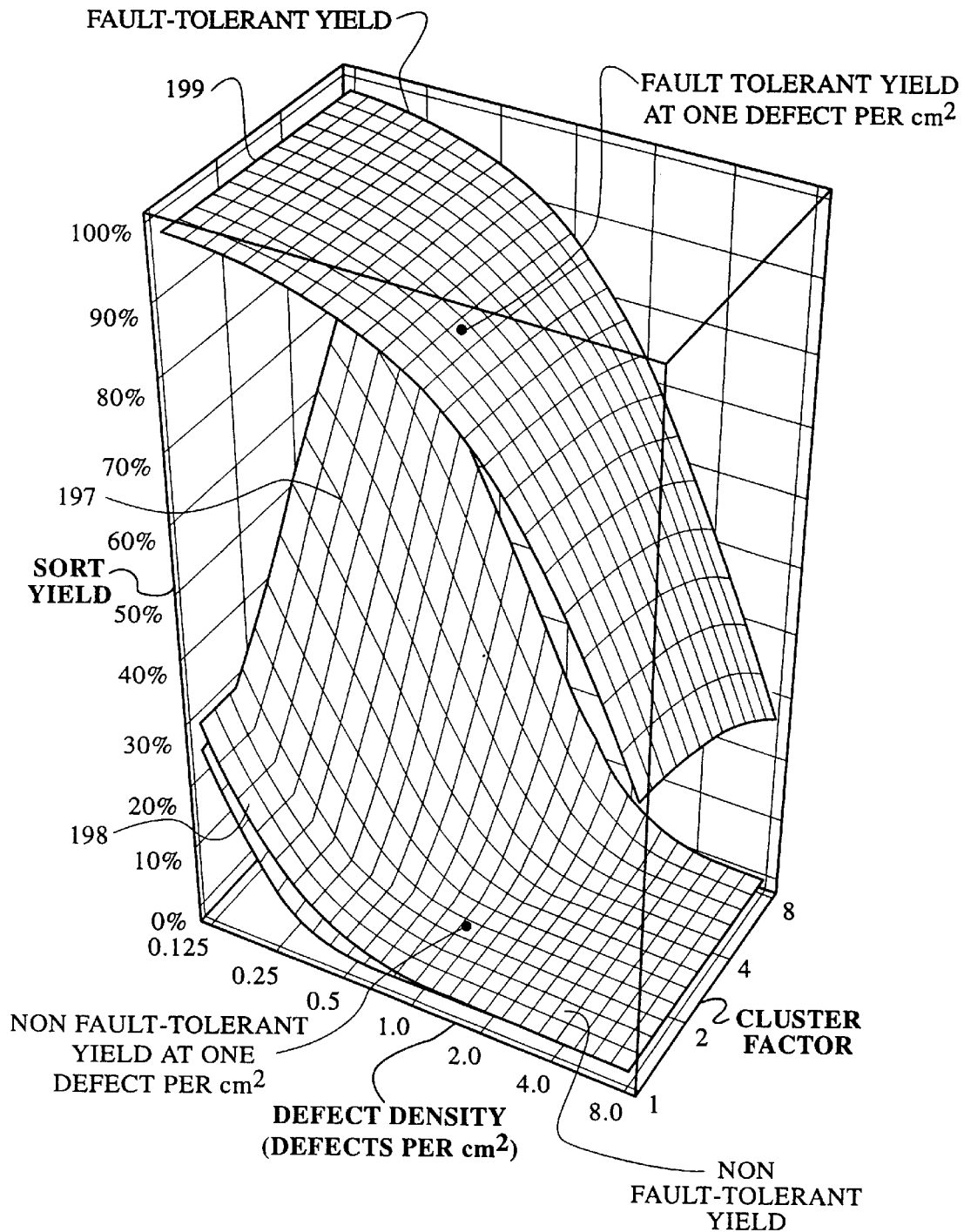
FIG. 5 shows projected manufacturing yields for an A4 page width color print head embodying features of the invention, with and without fault tolerance.

FIG. 5 is a graph of wafer sort yield versus defect density for a monolithic full width color A4 head embodiment of the invention. The head is 215 mm long by 5 mm wide. The non fault tolerant yield 198 is calculated according to Murphy's method, which is a widely used yield prediction method. With a defect density of one defect per square cm, Murphy's method predicts a yield less than 1%. This means that more than 99% of heads fabricated would have to be discarded. This low yield is highly undesirable, as the print head manufacturing cost becomes unacceptably high.

Murphy's method approximates the effect of an uneven distribution of defects. FIG. 5 also includes a graph of non fault tolerant yield 197 which explicitly models the clustering of defects by introducing a defect clustering factor. The defect clustering factor is not a controllable parameter in manufacturing, but is a characteristic of the manufacturing process. The defect clustering factor for manufacturing processes can be expected to be approximately 2, in which case yield projections closely match Murphy's method.

A solution to the problem of low yield is to incorporate fault tolerance by including redundant functional units on the chip which are used to replace faulty functional units.

In memory chips and most Wafer Scale Integration (WSI) devices, the physical location of redundant sub-units on the chip is not important. However, in printing heads the redundant sub-unit may contain one or more printing actuators. These must have a fixed spatial relationship to the page being printed. To be able to print a dot in the same position as a faulty actuator, redundant actuators must not be displaced in the non-scan direction. However, faulty actuators can be replaced with redundant actuators which are displaced in the scan direction. To ensure that the redundant actuator prints the dot in the same position as the faulty actuator, the data timing to the redundant actuator can be altered to compensate for the displacement in the scan direction.

To allow replacement of all nozzles, there must be a complete set of spare nozzles, which results in 100% redundancy. The requirement for 100% redundancy would normally more than double the chip area, dramatically reducing the primary yield before substituting redundant units, and thus eliminating most of the advantages of fault tolerance.

However, with print head embodiments according to this invention, the minimum physical dimensions of the head chip are determined by the width of the page being printed, the fragility of the head chip, and manufacturing constraints on fabrication of ink channels which supply ink to the back surface of the chip. The minimum practical size for a full width, full color head for printing A4 size paper is approximately 215 mm×5 mm. This size allows the inclusion of 100% redundancy without significantly increasing chip area, when using 1.5 mm CMOS fabrication technology. Therefore, a high level of fault tolerance can be included without significantly decreasing primary yield.

When fault tolerance is included in a device, standard yield equations cannot be used. Instead, the mechanisms and degree of fault tolerance must be specifically analyzed and included in the yield equation. FIG. 5 shows the fault tolerant sort yield 199 for a full width color A4 head which includes various forms of fault tolerance, the modeling of which has been included in the yield equation. This graph shows projected yield as a function of both defect density and defect clustering. The yield projection shown in FIG. 5 indicates that thoroughly implemented fault tolerance can increase wafer sort yield from under 1% to more than 90% under identical manufacturing conditions. This can reduce the manufacturing cost by a factor of 100.

Fault tolerance is highly recommended to improve yield and reliability of print heads containing thousands of printing nozzles, and thereby make page width printing heads practical. However, fault tolerance is not to be taken as an essential part of the present invention.

When fault tolerance is included in a device, standard yield equations cannot be used. Instead, the mechanisms and degree of fault tolerance must be specifically analysed and included in the yield equation. FIG. 5 shows the fault tolerant sort yield 199 for a full width color A4 LIFT head which includes various forms of fault tolerance, the modelling of which has been included in the yield equation. This graph shows projected yield as a function of both defect density and defect clustering. The yield projection shown in FIG. 5 indicates that thoroughly implemented fault tolerance can increase wafer sort yield from under 1% to more than 90% under identical manufacturing conditions. This can reduce the manufacturing cost by a factor of 100.

The acronym LIFT contains a reference to Fault Tolerance. Fault tolerance is highly recommended to improve yield and reliability of LIFT print heads containing thousands of printing nozzles, and thereby make page width LIFT printing heads practical. However, fault tolerance is not to be taken as an essential part of the definition of LIFT printing for the purposes of this document.

Printing System Embodiments

Figure 6:
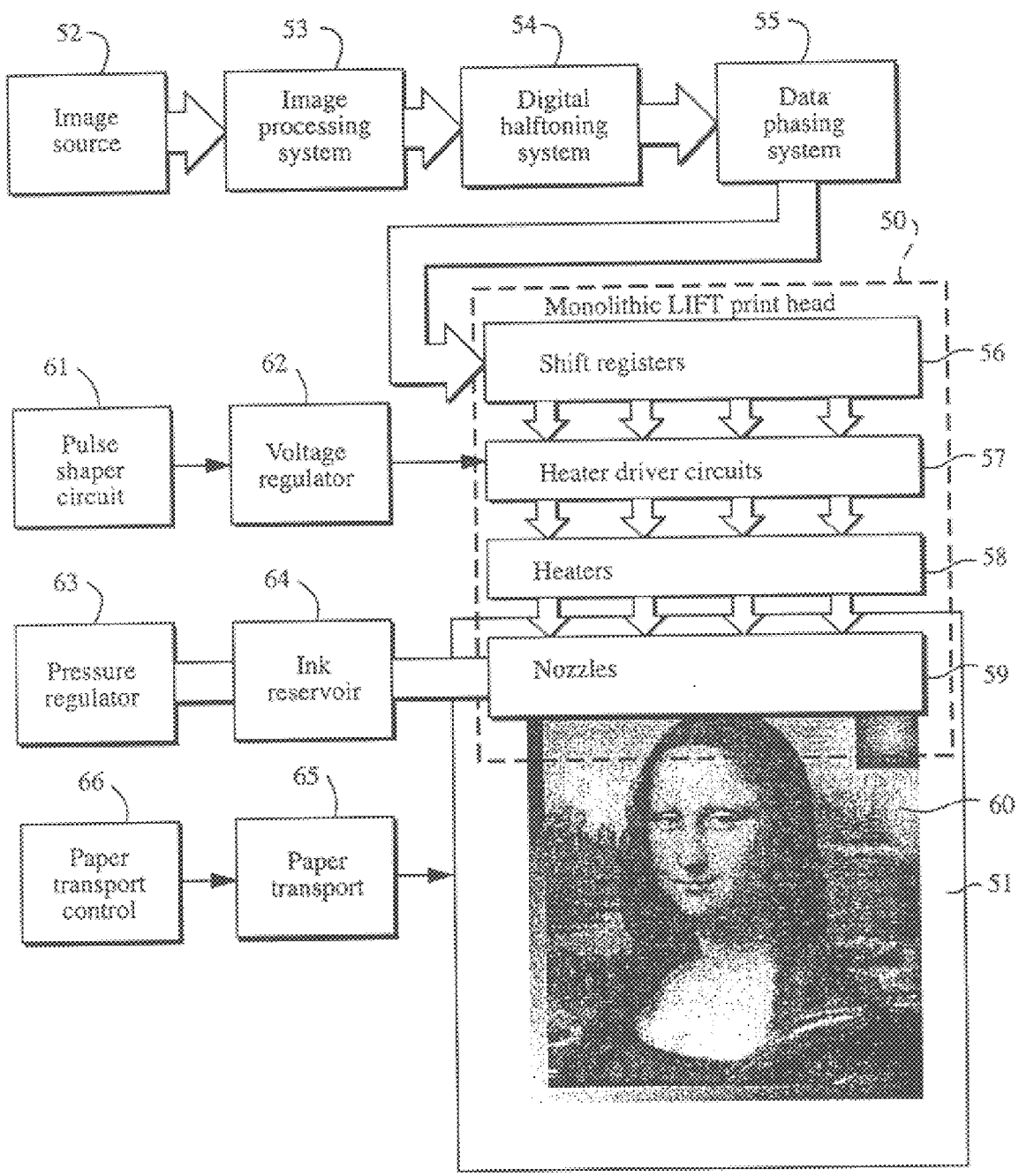
FIG. 6 shows a generalized block diagram of a printing system using a LIFT print head.

A schematic diagram of a digital electronic printing system using a print head of this invention is shown in FIG. 6. This shows a monolithic printing head 50 printing an image 60 composed of a multitude of ink drops onto a recording medium 51. This medium will typically be paper, but can also be overhead transparency film, cloth, or many other substantially flat surfaces which will accept ink drops. The image to be printed is provided by an image source 52, which may be any image type which can be converted into a two dimensional array of pixels. Typical image sources are image scanners, digitally stored images, images encoded in a page description language (PDL) such as Adobe Postscript, Adobe Postscript level 2, or Hewlett-Packard PCL 5, page images generated by a procedure-call based rasterizer, such as Apple QuickDraw, Apple Quickdraw GX, or Microsoft GDI, or text in an electronic form such as ASCII. This image data is then converted by an image processing system 53 into a two dimensional array of pixels suitable for the particular printing system. This may be color or monochrome, and the data will typically have between 1 and 32 bits per pixel, depending upon the image source and the specifications of the printing system. The image processing system may be a raster image processor (RIP) if the source image is a page description, or may be a two dimensional image processing system if the source image is from a scanner.

If continuous tone images are required, then a halftoning system 54 is necessary. Suitable types of halftoning are based on dispersed dot ordered dither or error diffusion. Variations of these, commonly known as stochastic screening or frequency modulation screening are suitable. The halftoning system commonly used for offset printing—clustered dot ordered dither—is not recommended, as effective image resolution is unnecessarily wasted using this technique. The output of the halftoning system is a binary monochrome or color image at the resolution of the printing system according to the present invention.

The binary image is processed by a data phasing circuit 55 (which may be incorporated in a Head Control ASIC 400 as shown in FIG. 4) which provides the pixel data in the correct sequence to the data shift registers 56. Data sequencing is required to compensate for the nozzle arrangement and the movement of the paper. When the data has been loaded into the shift registers 56, it is presented in parallel to the heater driver circuits 57. At the correct time, the driver circuits 57 will electronically connect the corresponding heaters 58 with the voltage pulse generated by the pulse shaper circuit 61 and the voltage regulator 62. The heaters 58 heat the tip of the nozzles 59, affecting the physical characteristics of the ink. Ink drops 60 escape from the nozzles in a pattern which corresponds to the digital impulses which have been applied to the heater driver circuits. The pressure of the ink in the ink reservoir 64 is regulated by the pressure regulator 63. Selected drops of ink drops 60 are separated from the body of ink by the chosen drop separation means, and contact the recording medium 51. During printing, the recording medium 51 is continually moved relative to the print head 50 by the paper transport system 65. If the print head 50 is the full width of the print region of the recording medium 51, it is only necessary to move the recording medium 51 in one direction, and the print head 50 can remain fixed. If a smaller print head 50 is used, it is necessary to implement a raster scan system. This is typically achieved by scanning the print head 50 along the short dimension of the recording medium 51, while moving the recording medium 51 along its long dimension.

Computer simulation of nozzle dynamics

Details of the operation of print heads according to this invention have been extensively simulated by computer. FIGS. 8 to 18 are some results from an example simulation of a preferred nozzle embodiment's operation using electrothermal drop selection by reduction in surface tension, combined with electrostatic drop separation.

Computer simulation is extremely useful in determining the characteristics of phenomena which are difficult to observe directly. Nozzle operation is difficult to observe experimentally for several reasons, including:
1) Useful nozzles are microscopic, with important phenomena occurring at dimensions less than 1 $\mu$m.
2) The time scale of a drop ejection is a few microseconds, requiring very high speed observations.
3) Important phenomena occur inside opaque solid materials, making direct observation impossible.
4) Some important parameters, such as heat flow and fluid velocity vector fields are difficult to directly observe on any scale.
5) The cost of fabrication of experimental nozzles is high.

Computer simulation overcomes the above problems. A leading software package for fluid dynamics simulation is FIDAP, produced by Fluid Dynamics International Inc. of Illinois, USA (FDI). FIDAP is a registered trademark of FDI. Other simulation programs are commercially available, but FIDAP was chosen for its high accuracy in transient fluid dynamic, energy transport, and surface tension calculations. The version of FIDAP used is FIDAP 7.51.

The simulations combine energy transport and fluid dynamic aspects. Axi-symmetric simulation is used, as the example nozzle is cylindrical in form. There are four deviations from cylindrical form. These are the connections to the heater, the laminar air flow caused by paper movement, gravity (if the print head is not vertical), and the presence of adjacent nozzles in the substrate. The effect of these factors on drop ejection is minor.

To obtain convergence for transient free surface simulations with variable surface tension at micrometer scales with microsecond transients using FIDAP 7.51, it is necessary to nondimensionalize the simulation.

Only the region in the tip of the nozzle is simulated, as most phenomena relevant to drop selection occur in this region. The simulation is from the axis of symmetry of the nozzle out to a distance of 40 $\mu$m.

A the beginning of the simulation, the entire nozzle and ink is at the device ambient temperature, which in this case is 30° C. During operation, the device ambient temperature will be slightly higher than the air ambient temperature, as an equilibrium temperature based on printing density is reached over the period of many drop ejections. Most of the energy of each drop selection is carried away with the ink drop. The remaining heat in the nozzle becomes very evenly distributed between drop ejections, due to the high thermal conductivity of silicon, and due to convection in the ink.

Geometry of the simulated nozzle

Figure 7:
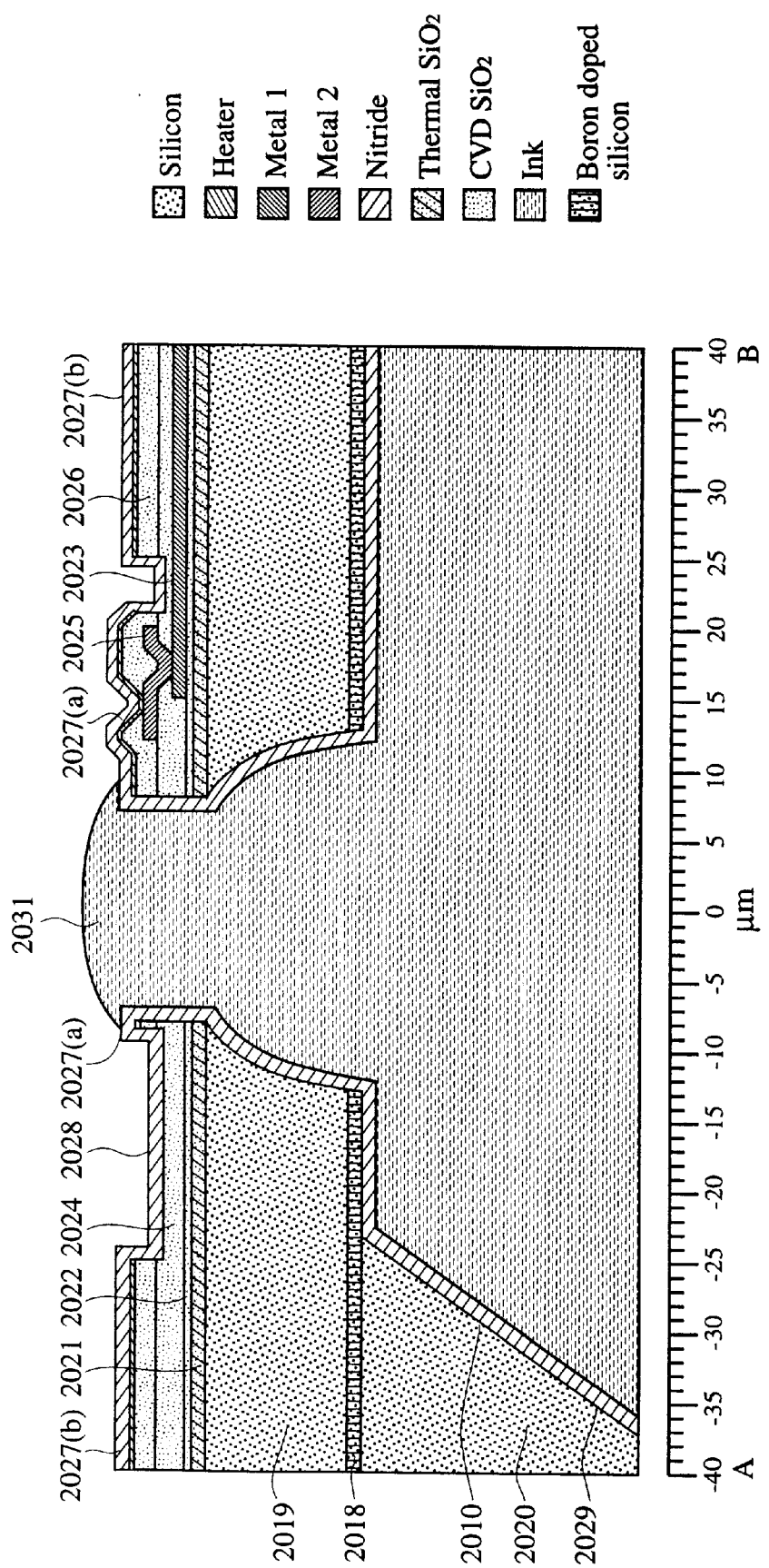
FIG. 7 shows a cross section of an example LIFT print head nozzle used for computer simulations shown in FIGS. 8 to 18.

FIG. 7 shows the geometry and dimensions of the a preferred nozzle embodiment modeled in this simulation.

The nozzle is constructed on a single crystal silicon substrate 2020. The substrate has an epitaxial boron doped silicon layer 2018, which is used as an etch stop during nozzle fabrication. An epitaxial silicon layer 2019 provides the active substrate for the fabrication of CMOS drive transistors and data distribution circuits. On this substrate are several layers deposited CMOS processing. These are a thermal oxide layer 2021, a first interlevel oxide layer 2022, first level metal 2023, second interlevel oxide layer 2024, second level metal 2025, and passivation oxide layer 2026. Subsequent processing of the wafers forms the nozzles and heaters. These structures include the active heater 2027(*a*), an ESD shield formed from 'spare' heater material 2027(*b*), and a silicon nitride passivation layer 2028.

The heater is atop a narrow 'rim' etched from the various oxide layers. This is to reduce the 'thermal mass' of the material around the heater, and to prevent the ink from spreading across the surface of the print head.

The print head is filled with electrically conductive ink 2031. An electric field is applied to the print head, using an electrode which is in electrical contact with the ink, and another electrode which is behind the recording medium.

The nozzle radius is 8 $\mu$m, and the diagram is to scale.

Theoretical basis of calculations

The theoretical basis for fluid dynamic and energy transport calculations using the Finite Element Method, and the manner that this theoretical basis is applied to the FIDAP computer program, is described in detail in the FIDAP 7.0 Theory Manual (April 1993) published by FDI, the disclosure of which is hereby incorporated by reference.

Material characteristics

The table "Properties of materials used for FIDAP simulation" gives approximate physical properties of materials which may be used in the fabrication of the print head in accordance with this invention.

The properties of 'ink' used in this simulation are that of a water based ink with 25% pigment loading. The ink contains a suspension of fine particles of palmitic acid (hexadecanoic acid) to achieve a pronounced reduction in surface tension with temperature. The surface tensions were measured at various temperatures using a surface tensiometer.

The values which have been used in the example simulation using the FIDAP program are shown in the table "Properties of materials used for FIDAP simulation". Most values are from direct measurement, or from the CRC Handbook of Chemistry and Physics, 72nd edition, or Lange's handbook of chemistry, 14th edition.

Properties of materials used for FIDAP simulation

| Property | Material or Temperature | Physical Value | Dimensionless Value |
|---|---|---|---|
| Characteristic length (L) | All | 1 mm | 1 |
| Characteristic velocity (U) | Ink | 1 m/s | 1 |
| Characteristic time | All | 1 ms | 1 |
| Time Step | All | 0.1 ms | 0.25 |
| Ambient temperature | All | 30° C. | 30 |
| Boiling point | Ink | 103° C. | 103 |
| Viscosity (h) | At 20° C. | 2.306 cP | 3.530 |
| Viscosity (h) | At 30° C. | 1.836 cP | 2.810 |
| Viscosity (h) | At 40° C. | 1.503 cP | 2.301 |
| Viscosity (h) | At 50° C. | 1.259 cP | 1.927 |
| Viscosity (h) | At 60° C. | 1.074 cP | 1.643 |
| Viscosity (h) | At 70° C. | 0.930 cP | 1.423 |
| Viscosity (h) | At 80° C. | 0.816 cP | 1.249 |
| Viscosity (h) | At 90° C. | 0.724 cP | 1.108 |
| Viscosity (h) | At 100° C. | 0.648 cP | 0.993 |
| Surface Tension (g) | 28° C. | 59.3 mN/m | 90.742 |
| Surface Tension (g) | 33° C. | 58.8 mN/m | 89.977 |
| Surface Tension (g) | 38° C. | 54.1 mN/m | 82.785 |
| Surface Tension (g) | 43° C. | 49.8 mN/m | 76.205 |
| Surface Tension (g) | 47° C. | 47.3 mN/m | 72.379 |
| Surface Tension (g) | 53° C. | 44.7 mN/m | 68.401 |
| Surface Tension (g) | 58° C. | 39.4 mN/m | 60.291 |
| Surface Tension (g) | 63° C. | 35.6 mN/m | 54.476 |
| Surface Tension (g) | 68° C. | 33.8 mN/m | 51.721 |
| Surface Tension (g) | 73° C. | 33.7 mN/m | 51.568 |
| Pressure (p) | Ink | 10 kPa | 15.3 |
| Thermal Conductivity (k) | Ink | 0.631 Wm$^{-1}$K$^{-1}$ | 1 |
| Thermal Conductivity (k) | Silicon | 148 Wm$^{-1}$K$^{-1}$ | 234.5 |
| Thermal Conductivity (k) | SiO$_2$ | 1.5 Wm$^{-1}$K$^{-1}$ | 2.377 |
| Thermal Conductivity (k) | Heater | 23 Wm$^{-1}$K$^{-1}$ | 36.45 |
| Thermal Conductivity (k) | Si$_3$N$_4$ | 19 Wm$^{-1}$K$^{-1}$ | 30.11 |
| Specific Heat (c$_p$) | Ink | 3,727 Jkg$^{-1}$K$^{-1}$ | 3.8593 |
| Specific Heat (c$_p$) | Silicon | 711 Jkg$^{-1}$K$^{-1}$ | 0.7362 |
| Specific Heat (c$_p$) | SiO$_2$ | 738 Jkg$^{-1}$K$^{-1}$ | 0.7642 |
| Specific Heat (c$_p$) | Heater | 250 Jkg$^{-1}$K$^{-1}$ | 0.2589 |
| Specific Heat (c$_p$) | Si$_3$N$_4$ | 712 Jkg$^{-1}$K$^{-1}$ | 0.7373 |
| Density ($\rho$) | Ink | 1.036 gcm$^{-1}$ | 1.586 |
| Density ($\rho$) | Silicon | 2.320 gcm$^{-1}$ | 3.551 |
| Density ($\rho$) | SiO$_2$ | 2.190 gcm$^{-1}$ | 3.352 |
| Density ($\rho$) | Heater | 10.50 gcm$^{-1}$ | 16.07 |
| Density ($\rho$) | Si$_3$N$_4$ | 3.160 gcm$^{-1}$ | 4.836 |

Fluid dynamic simulations

Figure 8A:
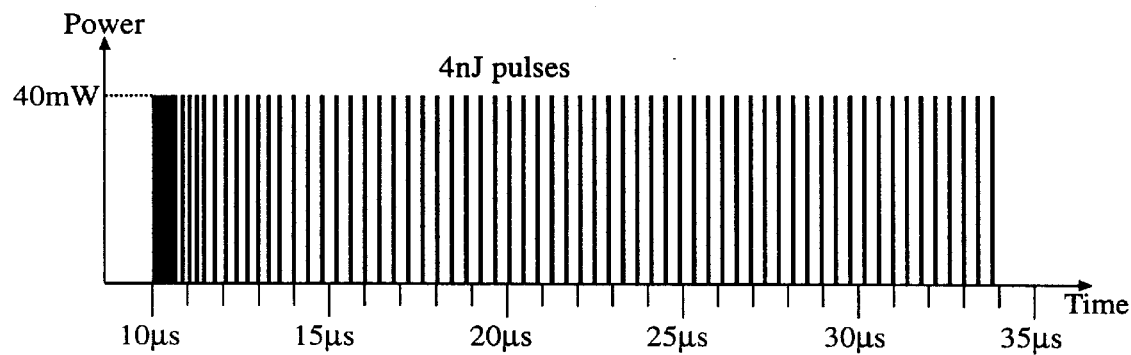
FIG. 8A shows the power sub-pulses applied to the print head for a single heater energizing pulse.

FIG. 8A shows the power applied to the heater. The maximum power applied to the heater is 40 mW. This power is pulse frequency modulated to obtain a desirable temporal distribution of power to the heater. The power pulses are each of a duration of 0.1 ms, each delivering 4 nJ of energy to the heater. The drop selection pulse is started 10 ms into the simulation, to allow the meniscus to settle to its quiescent position. The total energy delivered to the heater during the drop selection pulse is 276 nJ.

Figure 8B:
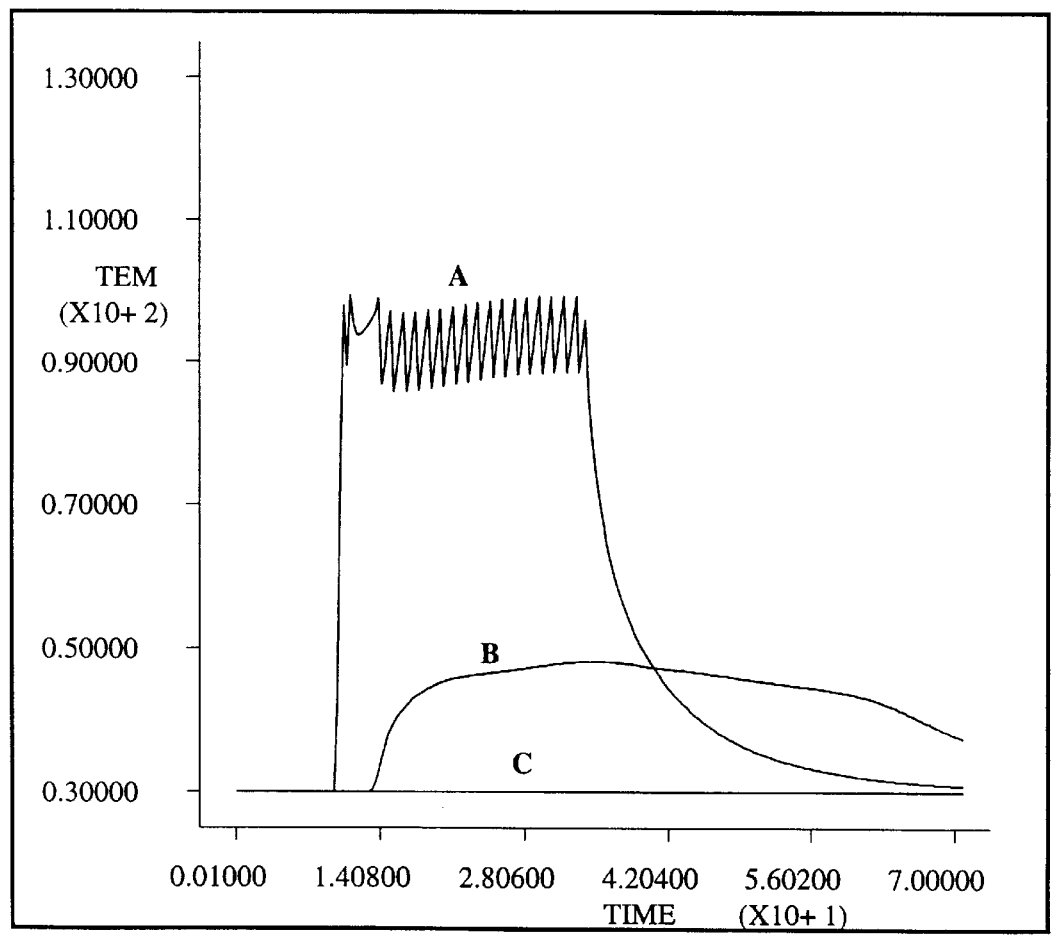
FIG. 8B shows the temperature at various points in the nozzle during the drop selection process.

FIG. 8B shows the temperature at various points in the nozzle during the simulation.

Point A is at the contact point of the ink meniscus and the nozzle rim. For optimal operation, it is desirable that this point be raised as close as possible to the boiling point of the ink, without exceeding the boiling point, and maintained at this temperature for the duration of the drop selection pulse. The 'spiky' temperature curve is due to the pulse frequency modulation of the power applied to the heater. This 'spikiness' can be reduced by increasing the pulse frequency, and proportionally reducing the pulse energy.

Point B is a point on the ink meniscus, approximately midway between the centre of the meniscus and the nozzle tip.

Point C is a point on the surface of the silicon, 20 $\mu$m from the centre of the nozzle. This shows that the temperature rise when a drop is selected is very small a short distance away from the nozzle. This allows active devices, such as drive transistors, to be placed very close to the nozzles.

Figure 9:
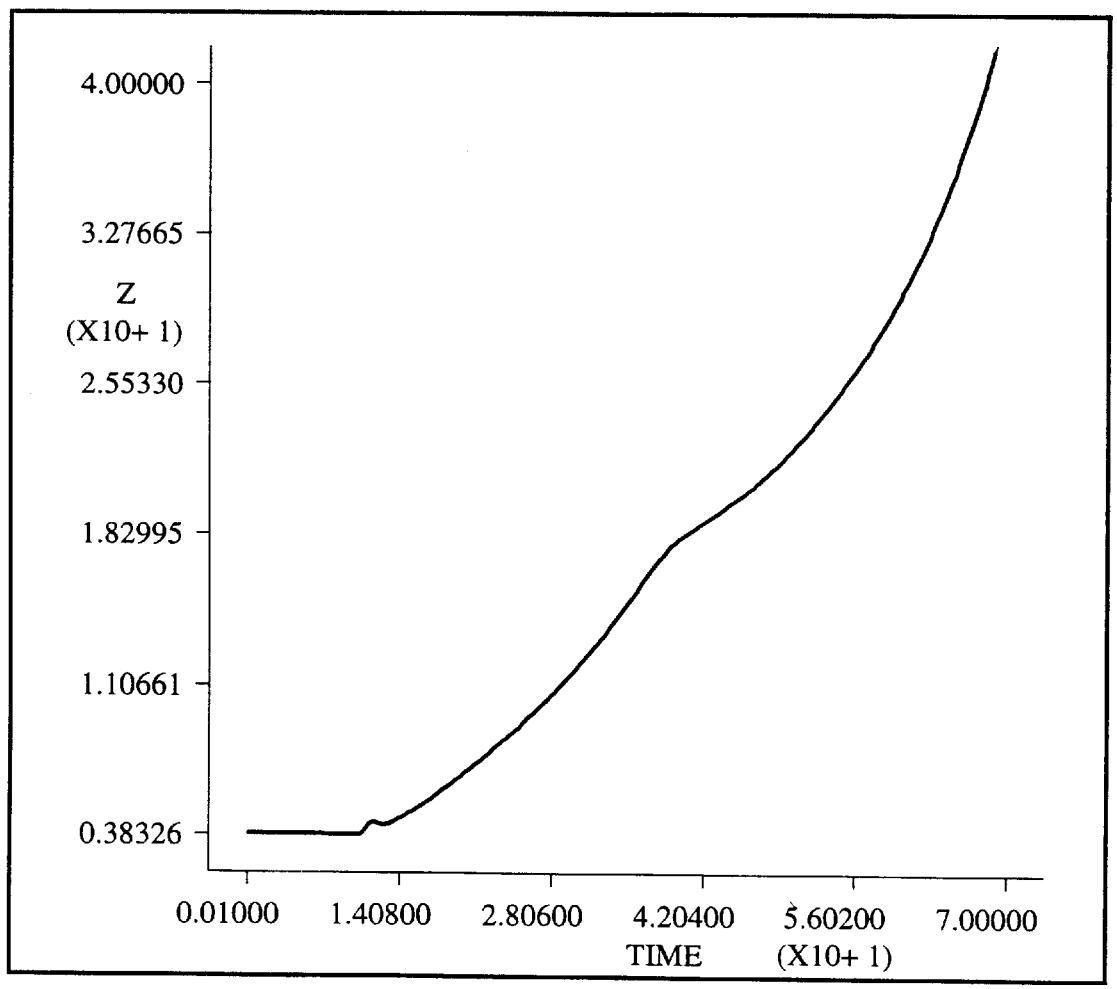
FIG. 9 is a graph of meniscus position versus time for the drop selection process.

FIG. 9 shows the position versus time of a point at the centre of the meniscus.

Figure 10:
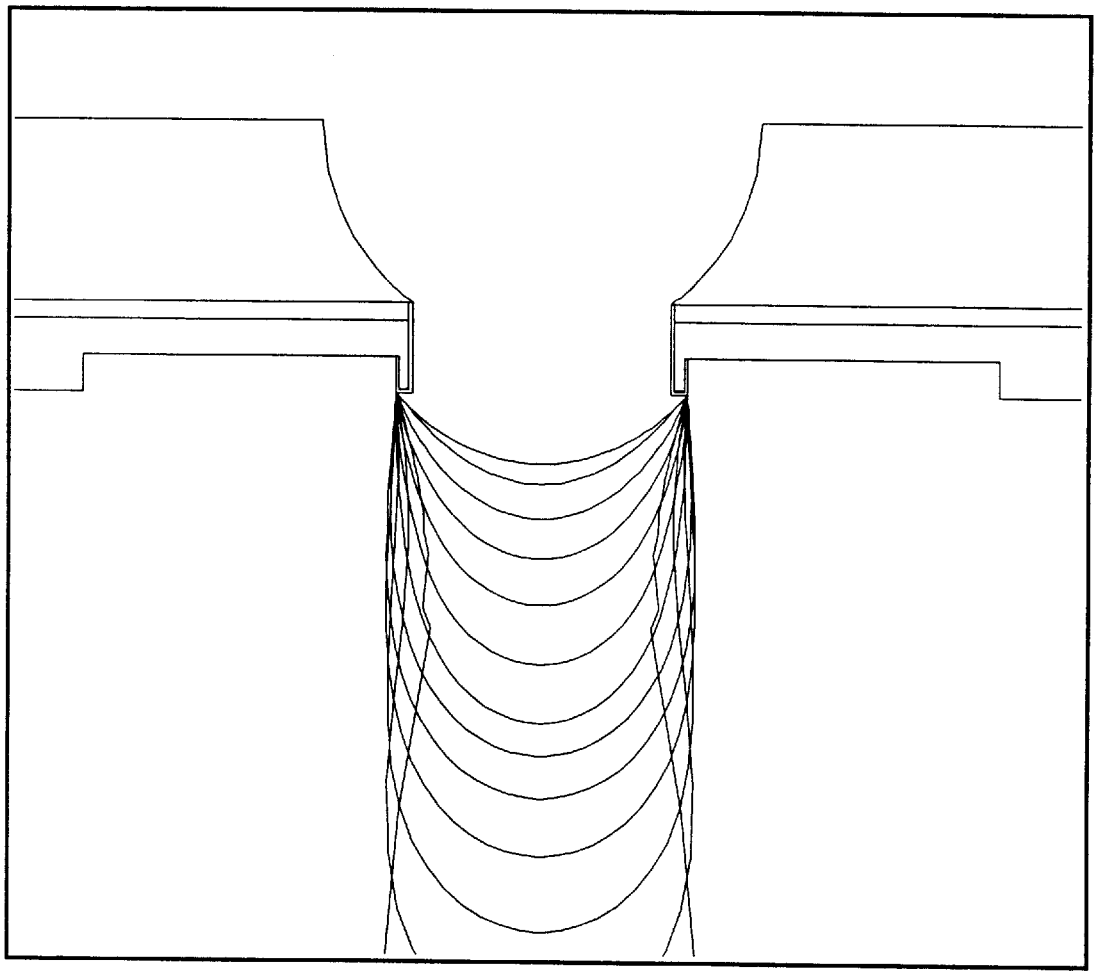
FIG. 10 is a plot of meniscus position and shape at 5 ms intervals during the drop selection process.

FIG. 10 shows the meniscus position and shape at various times during the drop selection pulse. The times shown are at the start of the drop selection pulse, (10 ms into the simulation), and at 5 ms intervals, until 60 ms after the start of the heater pulse.

Figure 11:
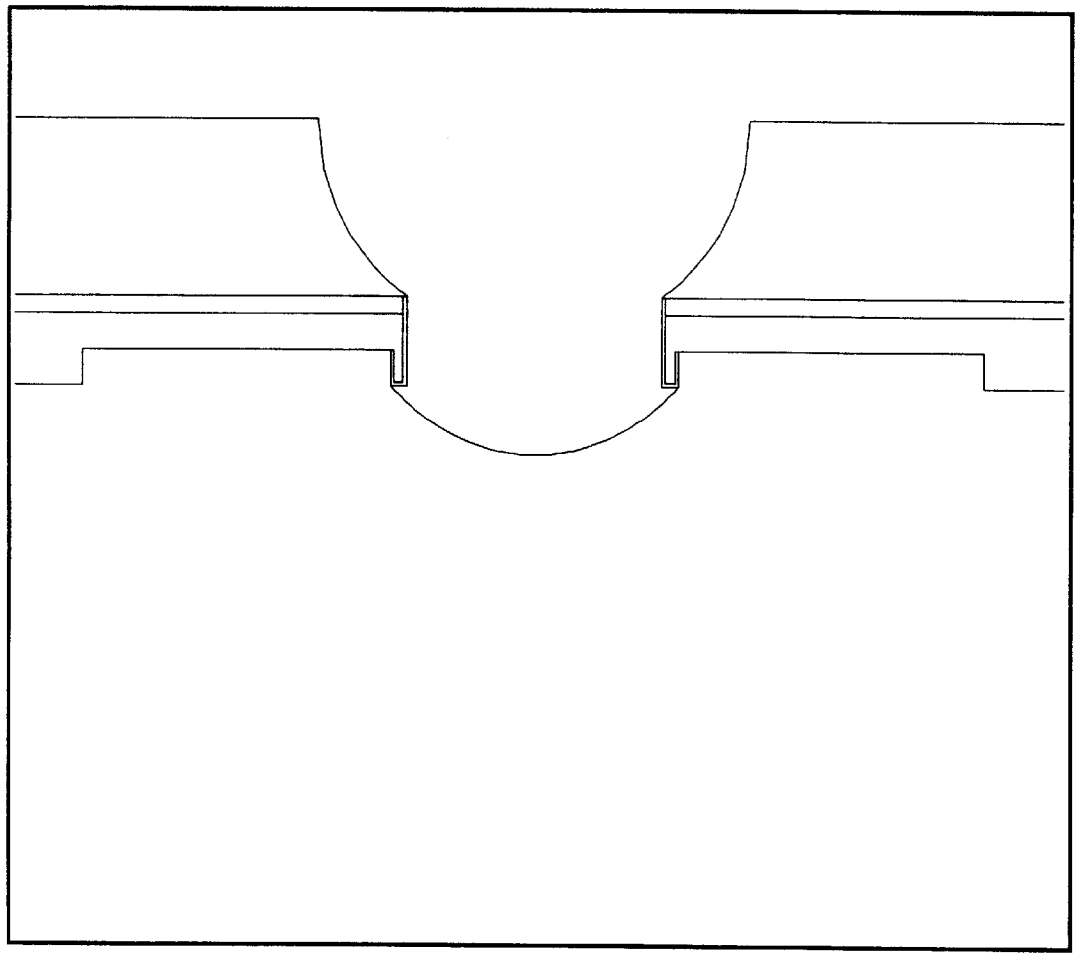
FIG. 11 shows the quiescent position of the ink meniscus before the drop selection process.

FIG. 11 shows temperature contours in the nozzle just before the beginning of the drop selection pulse, 9 ms into the simulation. The surface tension balances the combined effect of the ink pressure and the external constant electric field.

Figure 12:
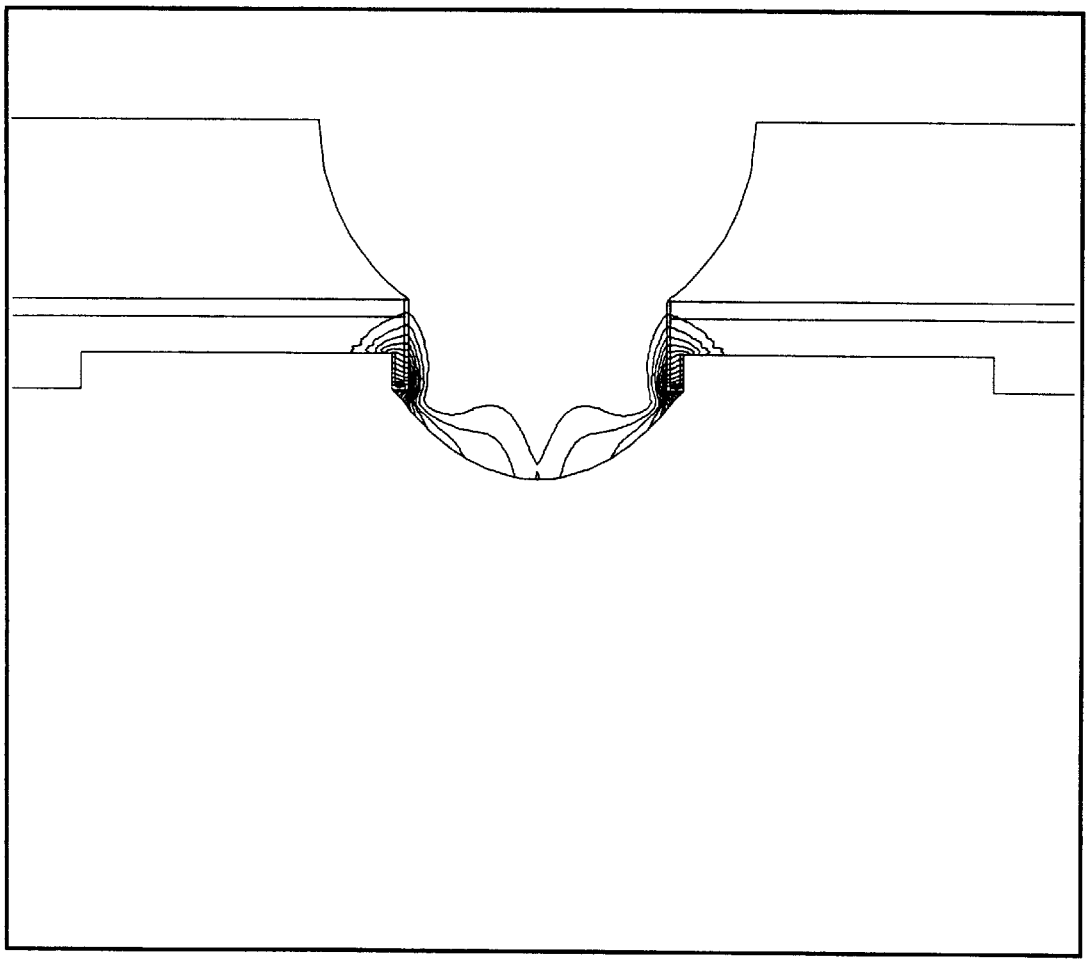
FIGS. 12, 13, 14, 15, 16 and 17 show the meniscus position and thermal contours at various stages during the drop selection process.

FIG. 12 shows temperature contours in the nozzle 5 ms after beginning of the drop selection pulse, 15 ms into the simulation. The reduction in surface tension at the nozzle tip causes the surface at this point to expand, rapidly carrying the heat around the meniscus. The ink has begun to move, as the surface tension is no longer high enough to balance the combined effect of the ink pressure and the external constant electric field. The centre of the meniscus begins to move faster than the outside, due to viscous drag at the nozzle walls. In FIGS. 12 to 17 temperature contours are shown starting at 35° C. and increasing in 5° C. intervals.

Figure 13:
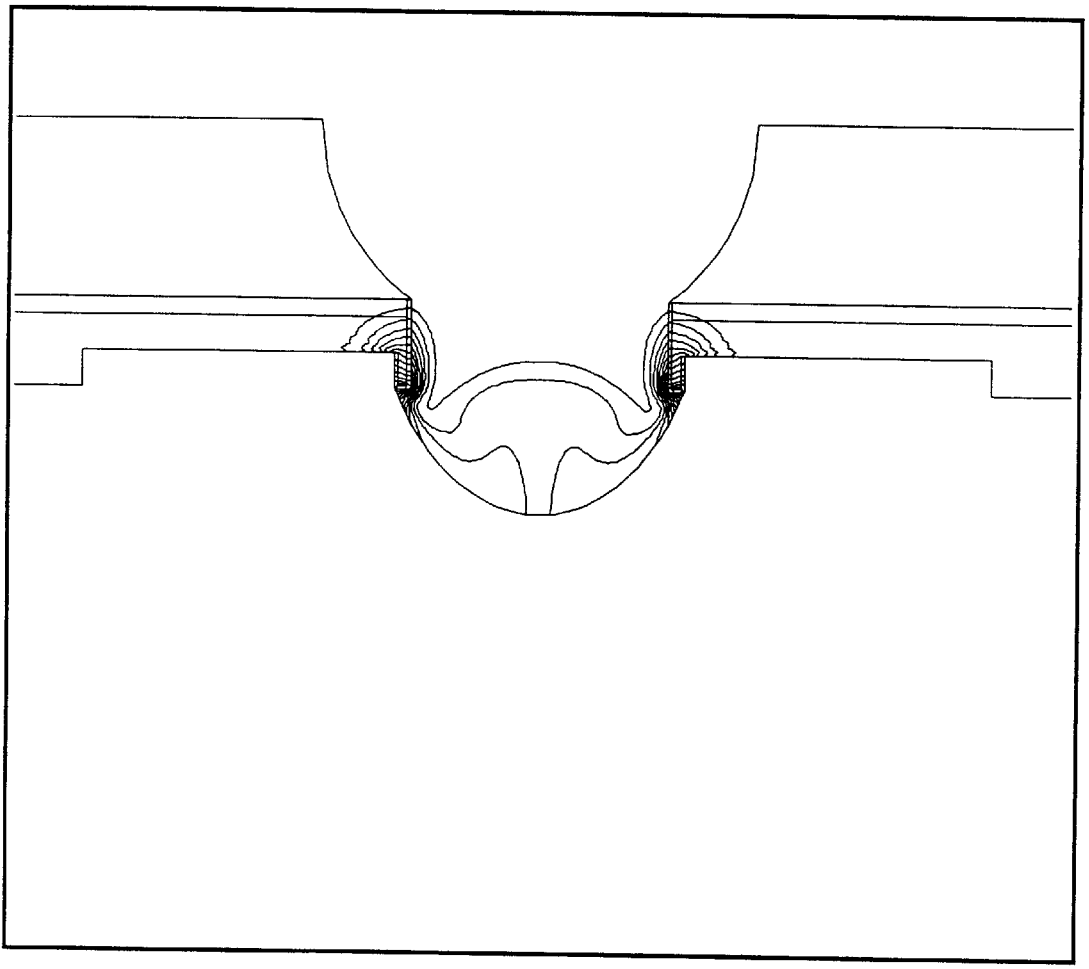

FIG. 13 shows temperature contours in the nozzle 10 ms after beginning of the drop selection pulse, 20 ms into the simulation.

Figure 14:
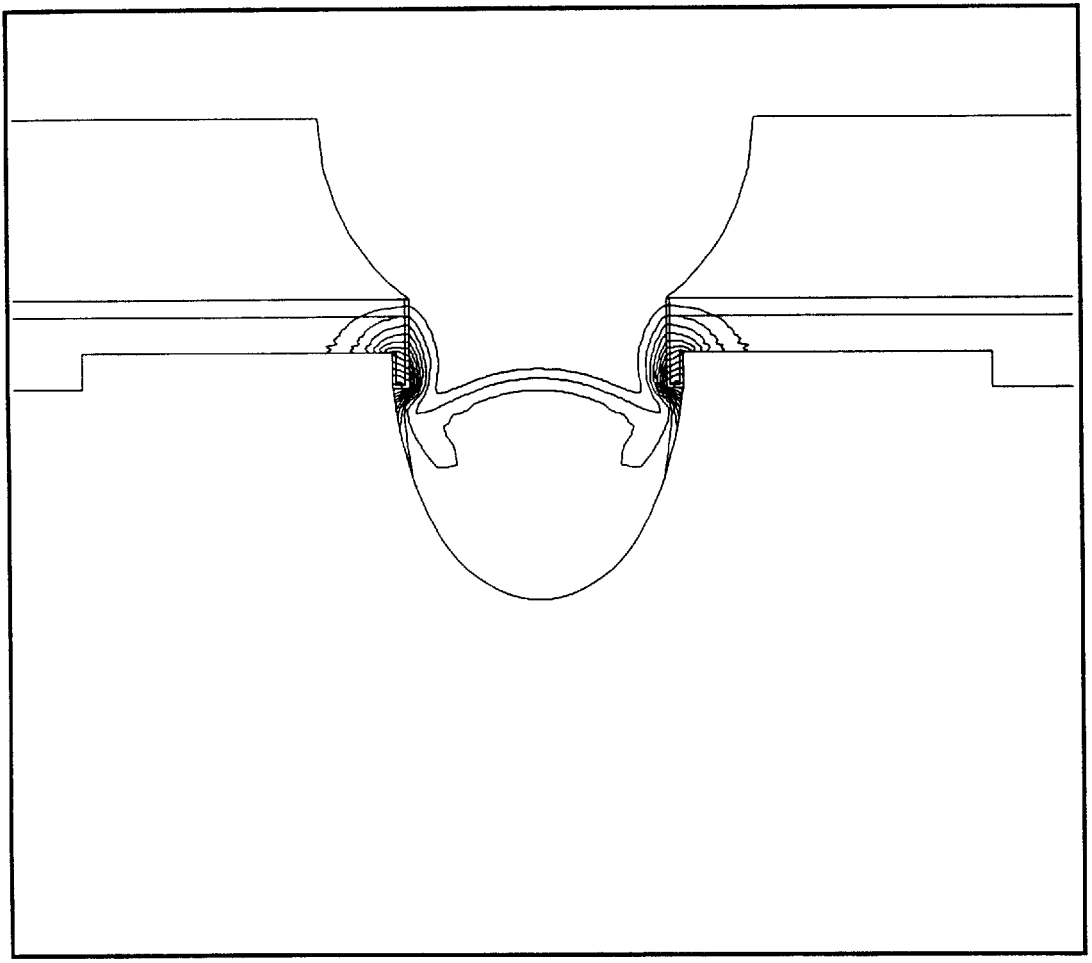

FIG. 14 shows temperature contours in the nozzle 20 ms after beginning of the drop selection pulse, 30 ms into the simulation.

Figure 15:
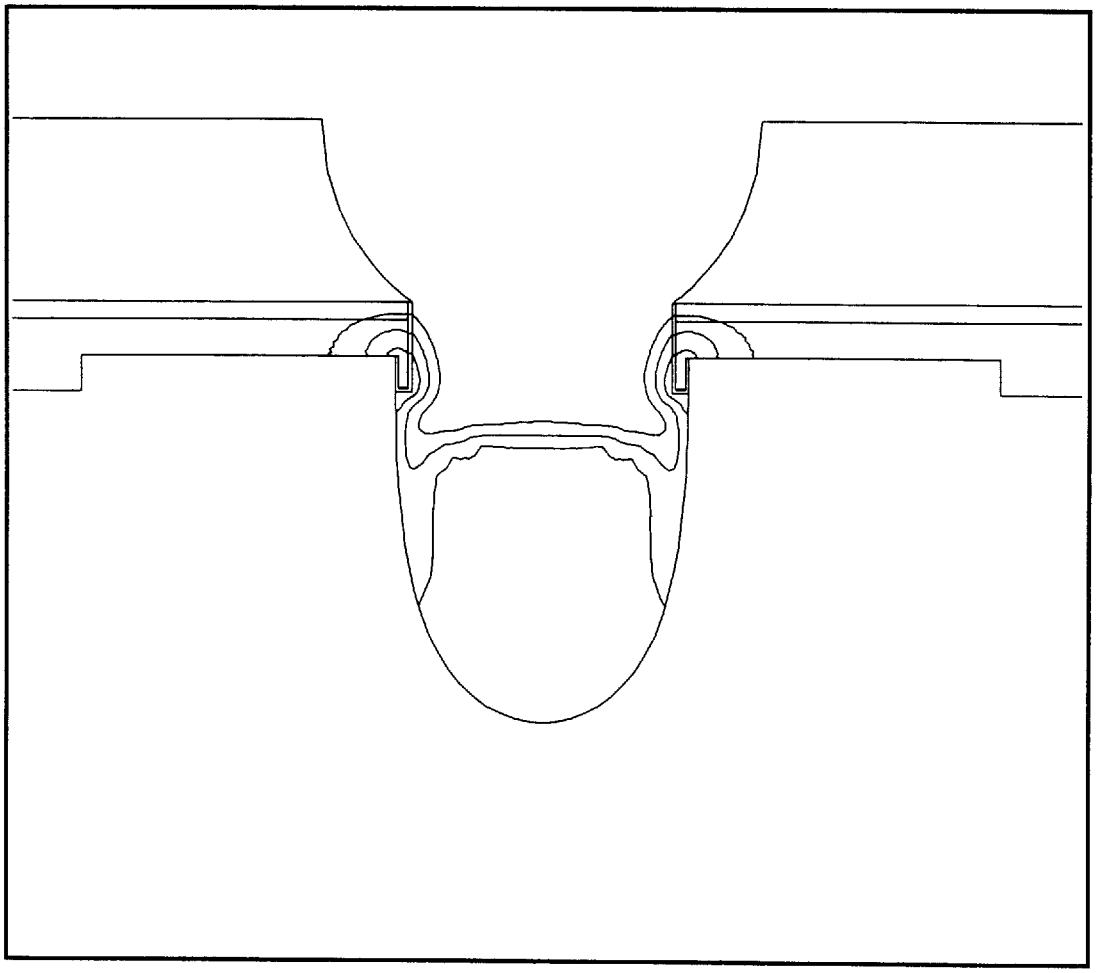

FIG. 15 shows temperature contours in the nozzle 30 ms after beginning of the drop selection pulse, 40 ms into the simulation. This is 6 ms after the end of the drop selection pulse, and the nozzle has begun to cool down.

Figure 16:
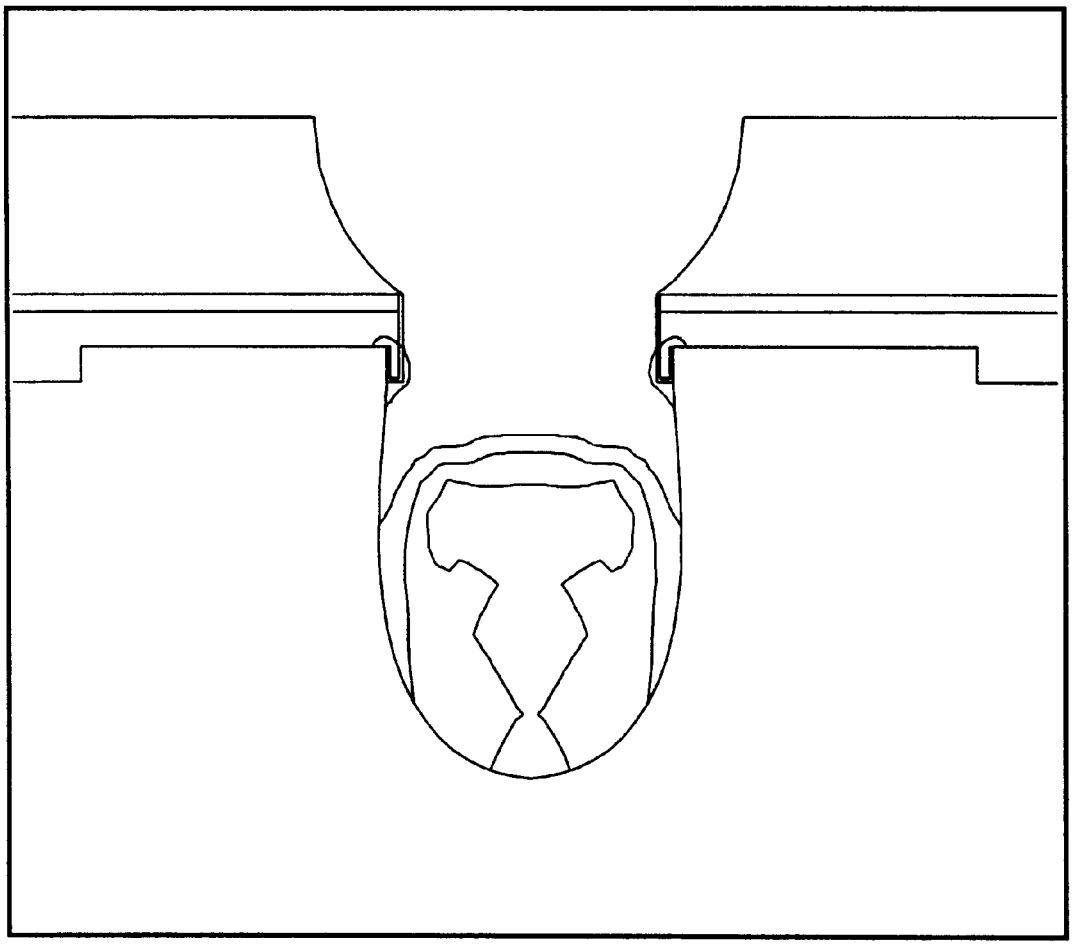

FIG. 16 shows temperature contours in the nozzle 40 ms after beginning of the drop selection pulse, 50 ms into the simulation. If is clear from this simulation that the vast majority of the energy of the drop selection pulse is carried away with the selected drop.

Figure 17:
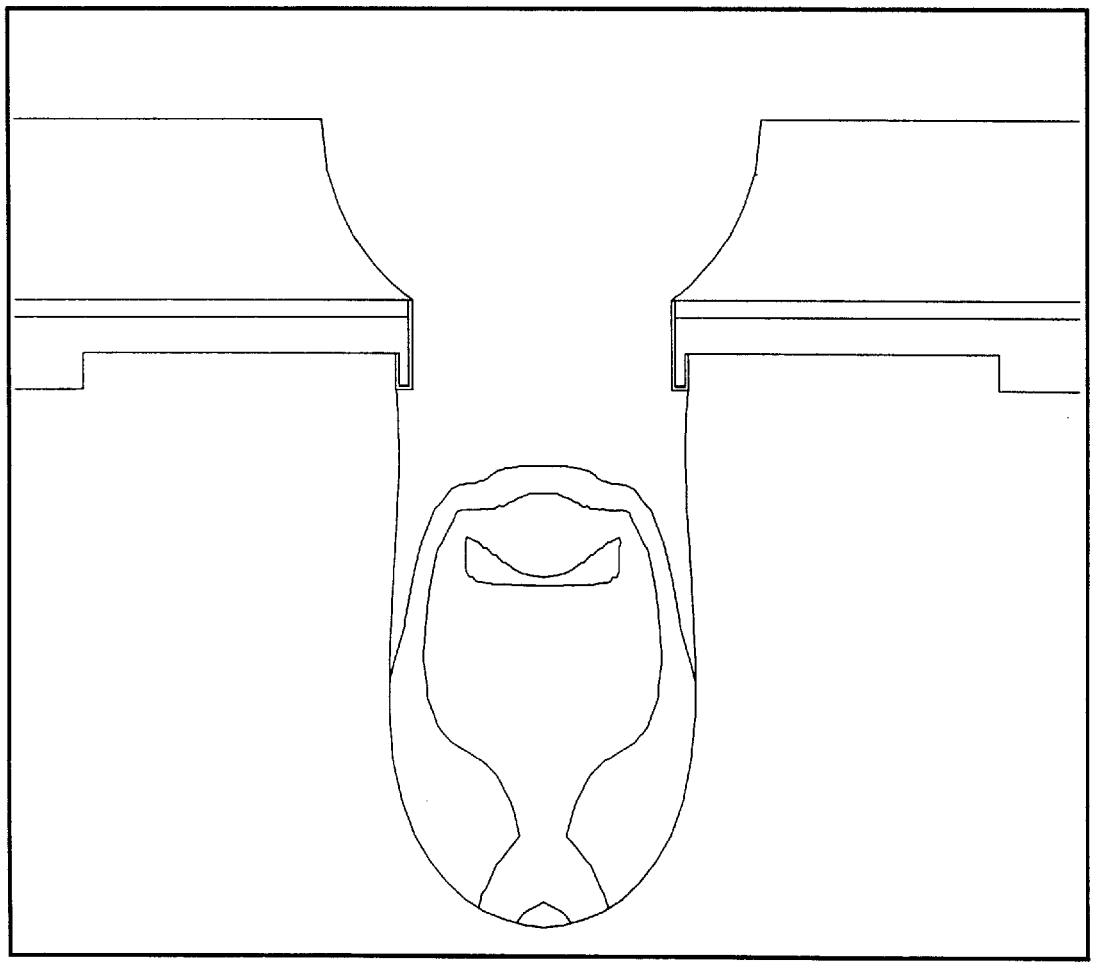

FIG. 17 shows temperature contours in the nozzle 50 ms after beginning of the drop selection pulse, 60 ms into the simulation. At this time, the selected drop is beginning to 'neck', and the drop separation process is beginning.

Figure 18:
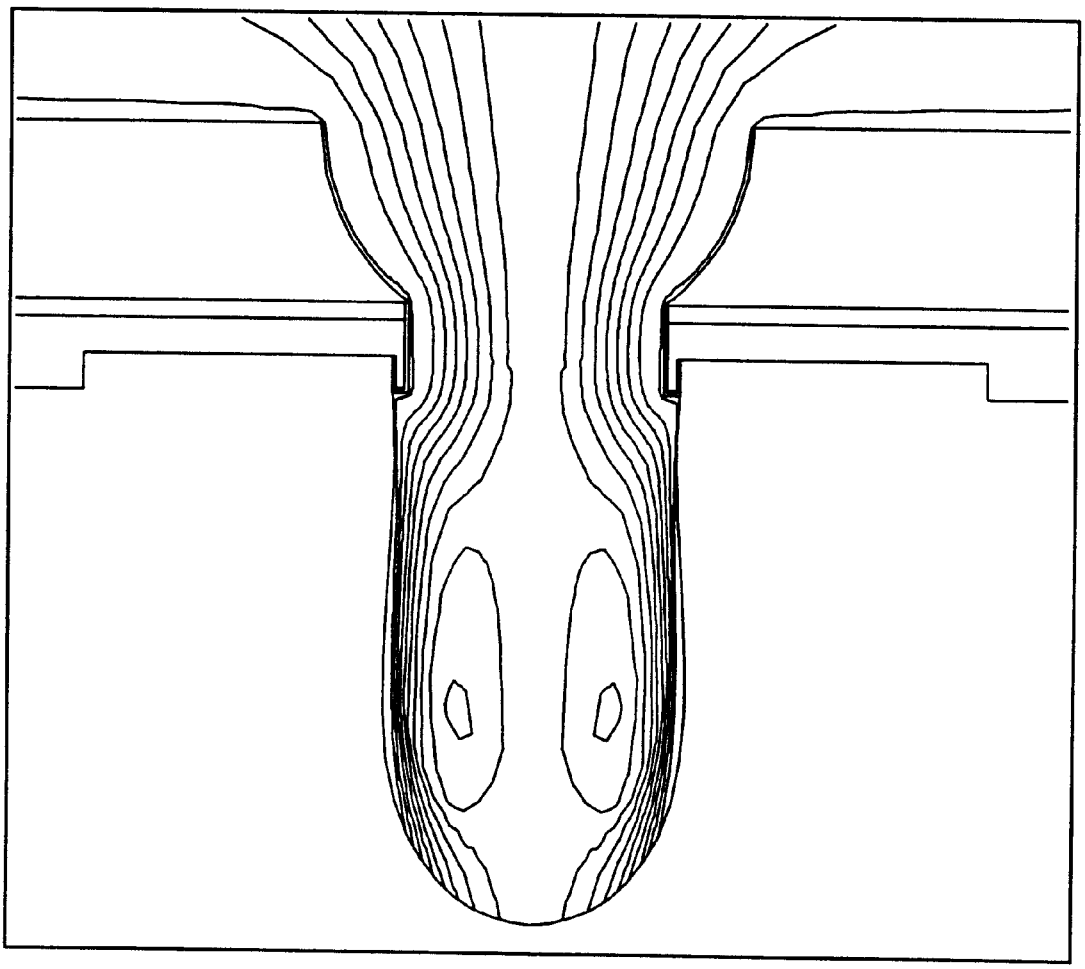
FIG. 18 shows fluid streamlines 50 ms after the beginning of the drop selection heater pulse.

FIG. 18 shows streamlines in the nozzle at the same time as FIG. 17.

The approximate duration of three consecutive phases in the drop ejection cycle are:

1) 24 ms heater energizing cycle
2) 60 ms to reach drop separation
3) 40 ms to return to the quiescent position The total of these times is 124 ms, which results in a maximum drop repetition rate (drop frequency) of approximately 8 Khz.

Proximity Drop Separation

Drop separation of liquid ink by print media proximity preferably operates under the following conditions:

1) The difference in meniscus positions between selected and unselected drops is greater than the surface roughness of the print medium.
2) The surface roughness of the print medium is less than approximately 30% of the ink drop diameter.
3) The rate at which the volume of the ink drop increases due to wetting the print medium surface and/or soaking into a porous print medium is greater than the rate of flow from the ink nozzle under the applied ink pressure.

These conditions can be met over a wide range of nozzle radii, ink types, media, and print resolutions.

For hot melt printing, the molten ink drop freezes when in contact with the print medium, and the characteristics of ink absorption into the print medium are not as important.

The principle of operation of proximity separation printing is shown in FIG. 19(*a*) through FIG. 19(*i*). In this case, the drop is selected by electrothermal transducers, which heat the ink at the nozzle tip, causing an increase in temperature at the meniscus. The increased temperature causes a reduction of surface tension below a critical surface tension, resulting in ink egress from the nozzle tip.

In FIGS. 19A to 19I 1 is the selected drop, 10 is the nozzle from which the selected drop 1 was produced, 11 is a nozzle in which the heater 103 was not activated and, therefore, no drop was selected, 5 is the direction of print medium movement, 51 is the print medium, 100 is the body of ink, 101 is silicon, 102 is silicon dioxide, 103 is the electrothermal actuator (also referred to as "heater"), and 109 is the print head hydrophobic layer.

Figure 19A:
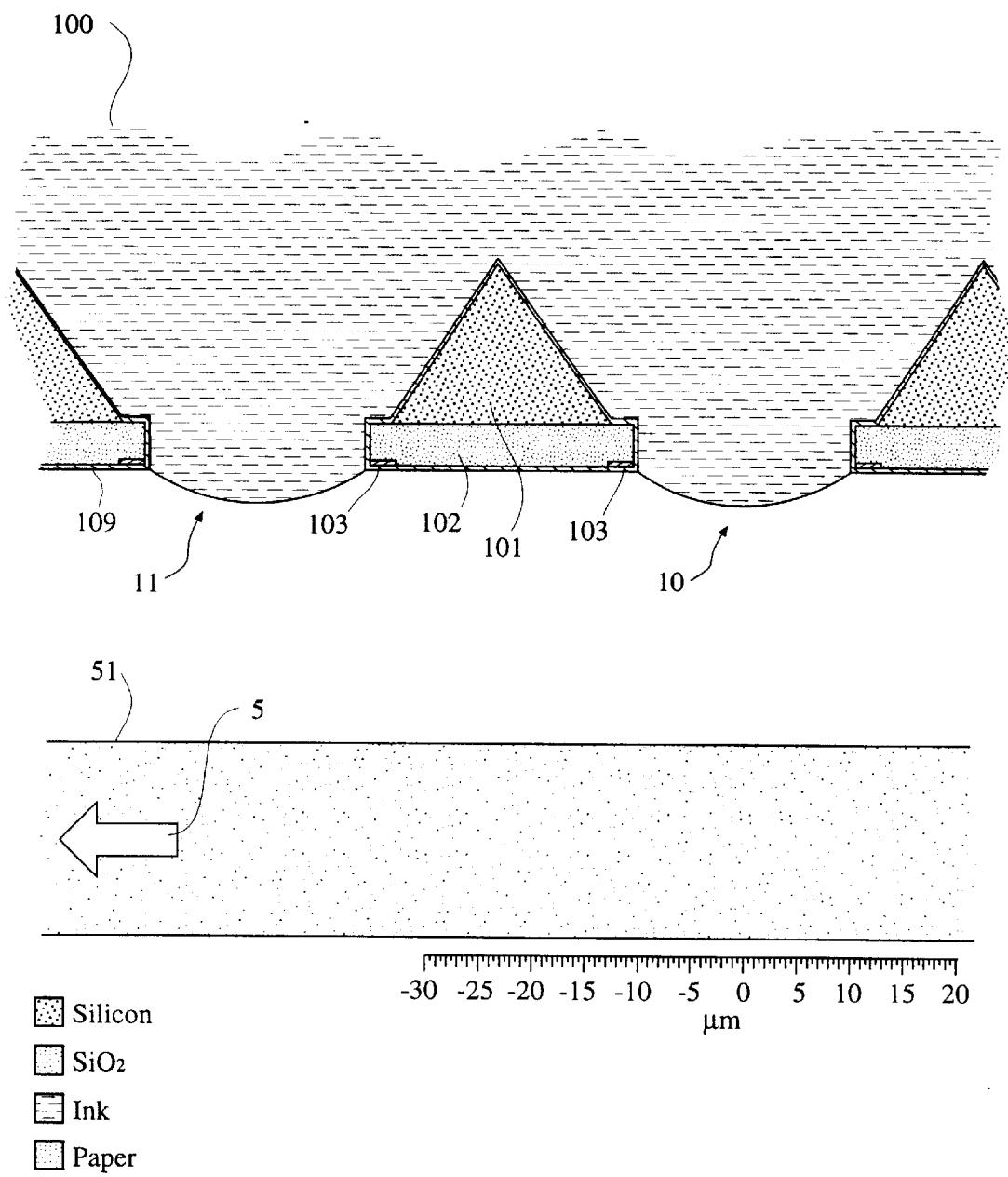
FIGS. 19A, 19B, 19C, 19D, 19E, 19F, 19G, 19H and 19I show a drop ejection cycle of a thermal proximity separation nozzle.

FIG. 19A shows a cross section through two adjacent nozzles 10 and 11 in the quiescent state. The nozzles are in close proximity to the recording medium 51 which is moving relative to the nozzles in the direction 5. The cross section is at an angle of 45 degrees to the direction of media movement, through the plane of the diagram. The nozzles 10 and 11 represent two staggered nozzles offset by one pixel width in the direction normal to the plane of the diagram. All surfaces of the nozzle have a hydrophobic surface layer 109, and the ink 100 is hydrophilic. The ink is under pressure, resulting in the ink meniscus bulging.

Figure 19B:
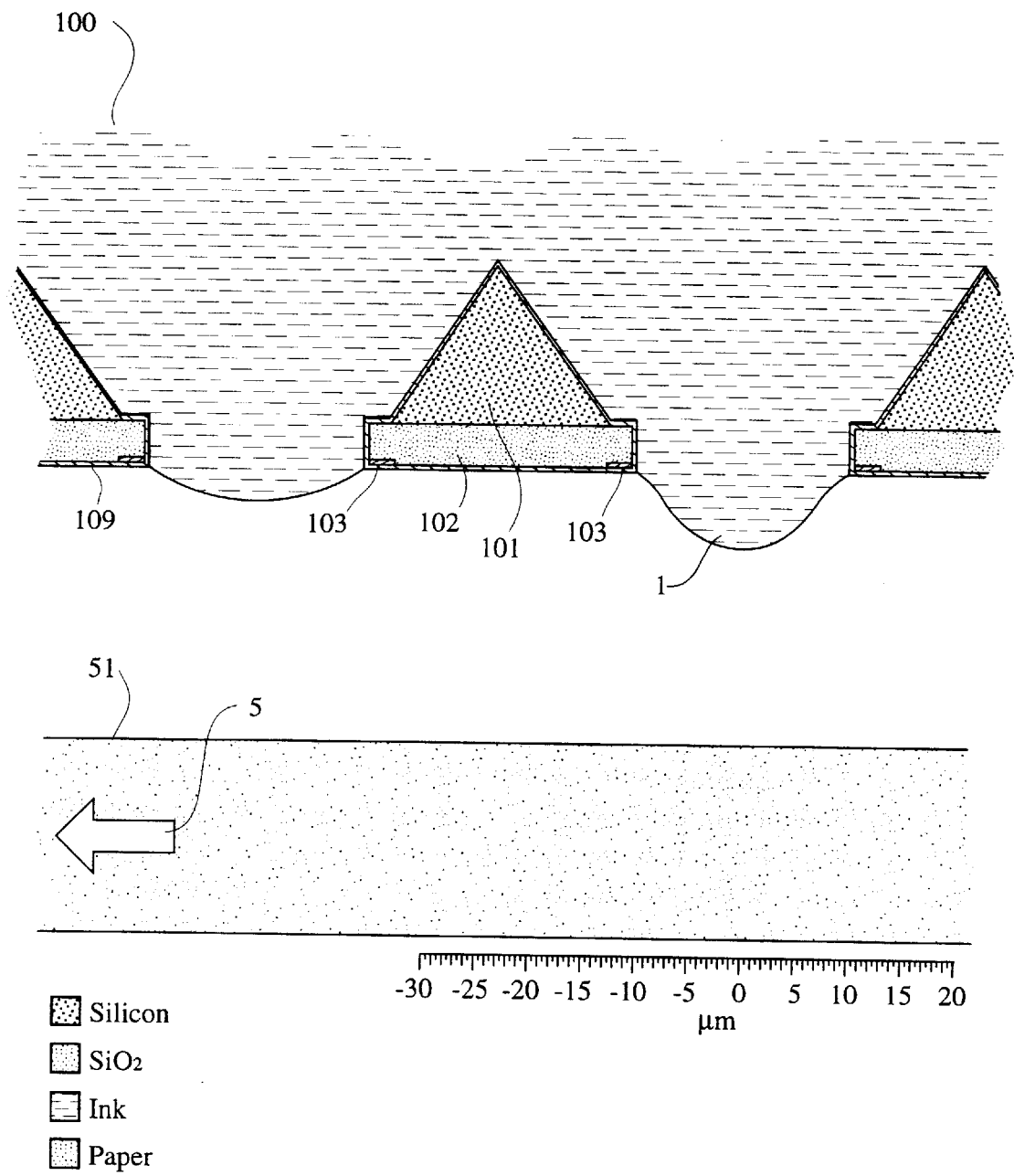

FIG. 19B shows the ink in the two nozzles shortly after an energizing pulse has been applied to the heater 103 of nozzle 10, but not of nozzle 11. The heat is conducted to the ink surface, where the resultant rise in temperature causes a local decrease in the surface tension of the ink. The decrease in surface tension may be the result of the natural properties of the ink, but is preferably enhanced by the inclusion of an agent in the ink which causes a significant fall in surface tension at the temperature to which the ink is heated. This agent may be a surfactant which is in the form of a suspended solid particles at the quiescent temperature, but melts when the heaters are activated. When in solid form, the surfactant has little effect on surface tension. When molten, surfactant molecules rapidly migrate to the ink surface, causing a significant decrease in surface tension. In this case, the surfactant is 1-Hexadecanol, a 16 carbon alcohol with a melting point of 50° C.

Figure 19C:
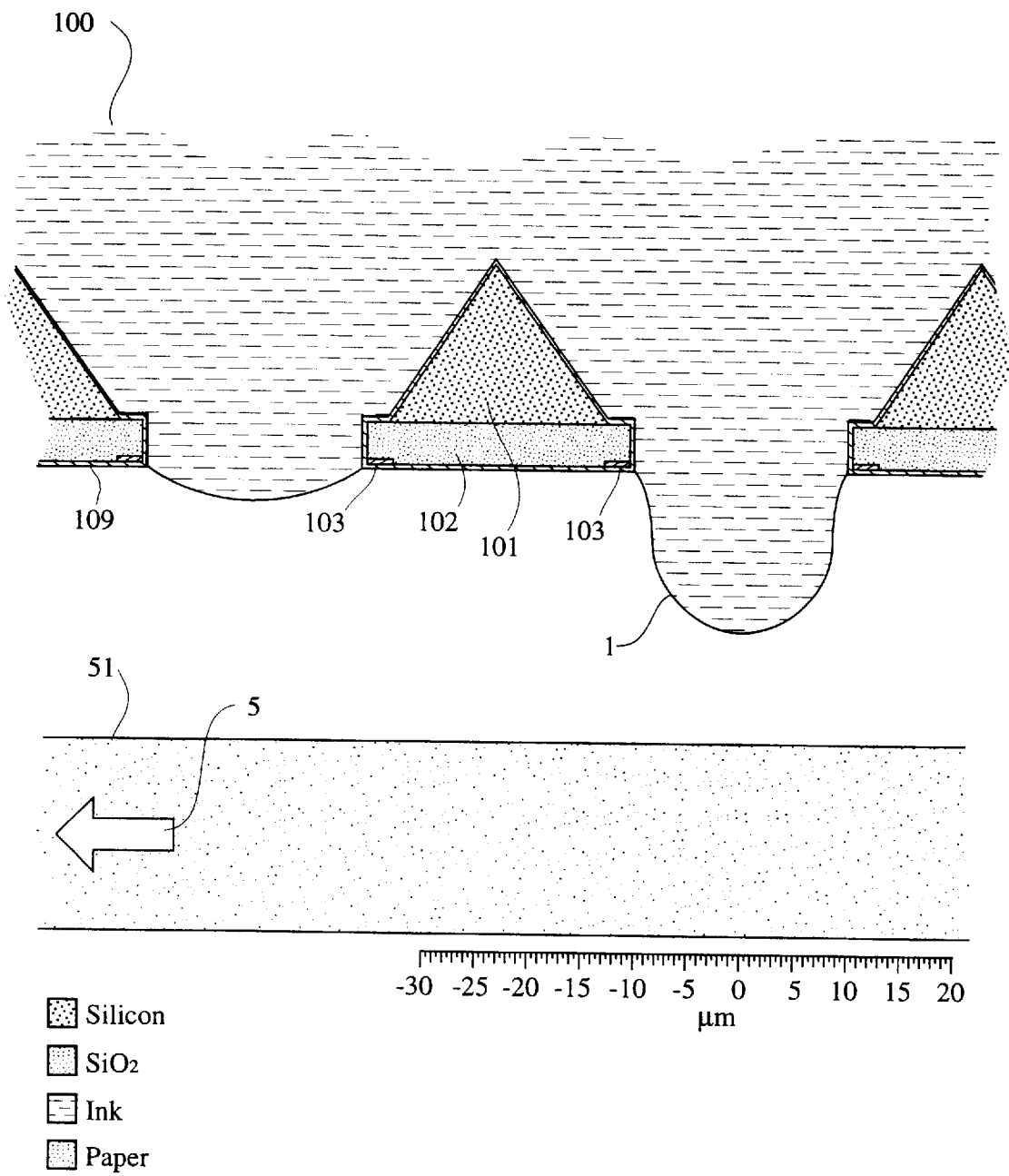

FIG. 19C shows the drop evolution a short time later. The selected drop 1 takes on a substantially cylindrical form due to a surface tension gradient from the nozzle tip to the centre of the meniscus, and due to viscous drag slowing ink movement near the walls of the nozzle. In this case, there are no external electrostatic or magnetic fields applied, and gravity is not significant on this scale.

Figure 19D:
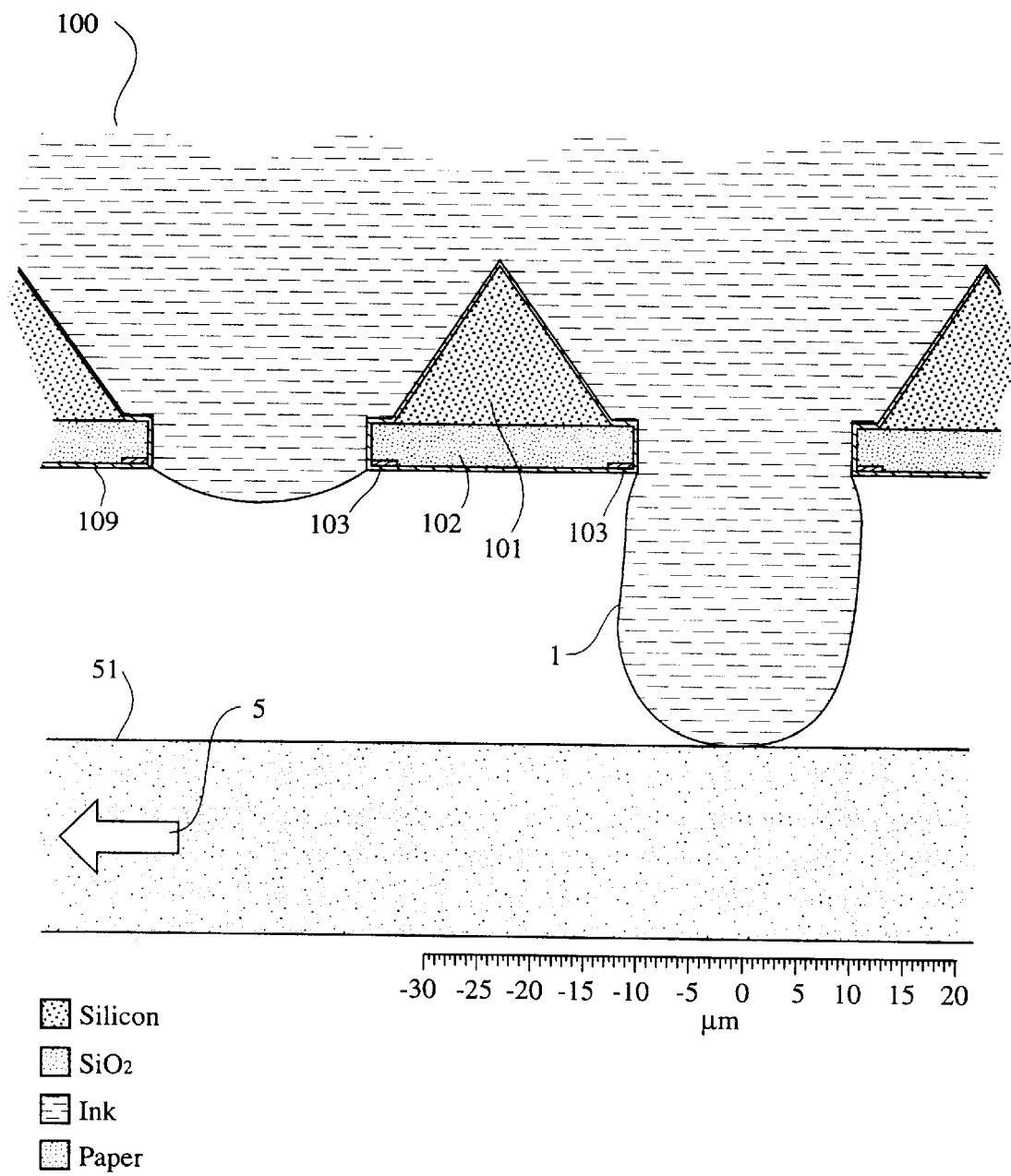

FIG. 19D shows the selected drop 1 at the instant that it contacts the recording medium 51. The "tilt" of the selected drop is due to the laminar air flow between the print head and the recording medium 51, caused by the movement of the recording medium. In many practical situations the recording medium will be paper, which will typically have a surface which is rough on the scale of the distance between the nozzle and the recording medium. This roughness will cause variation in the time of contact between the drop 1 and the recording medium 51 and, therefore, cause variations in the printed dot area. This variation can be minimized by using coated paper and/or passing the recording medium through compression rollers immediately prior to printing.

Figure 19E:
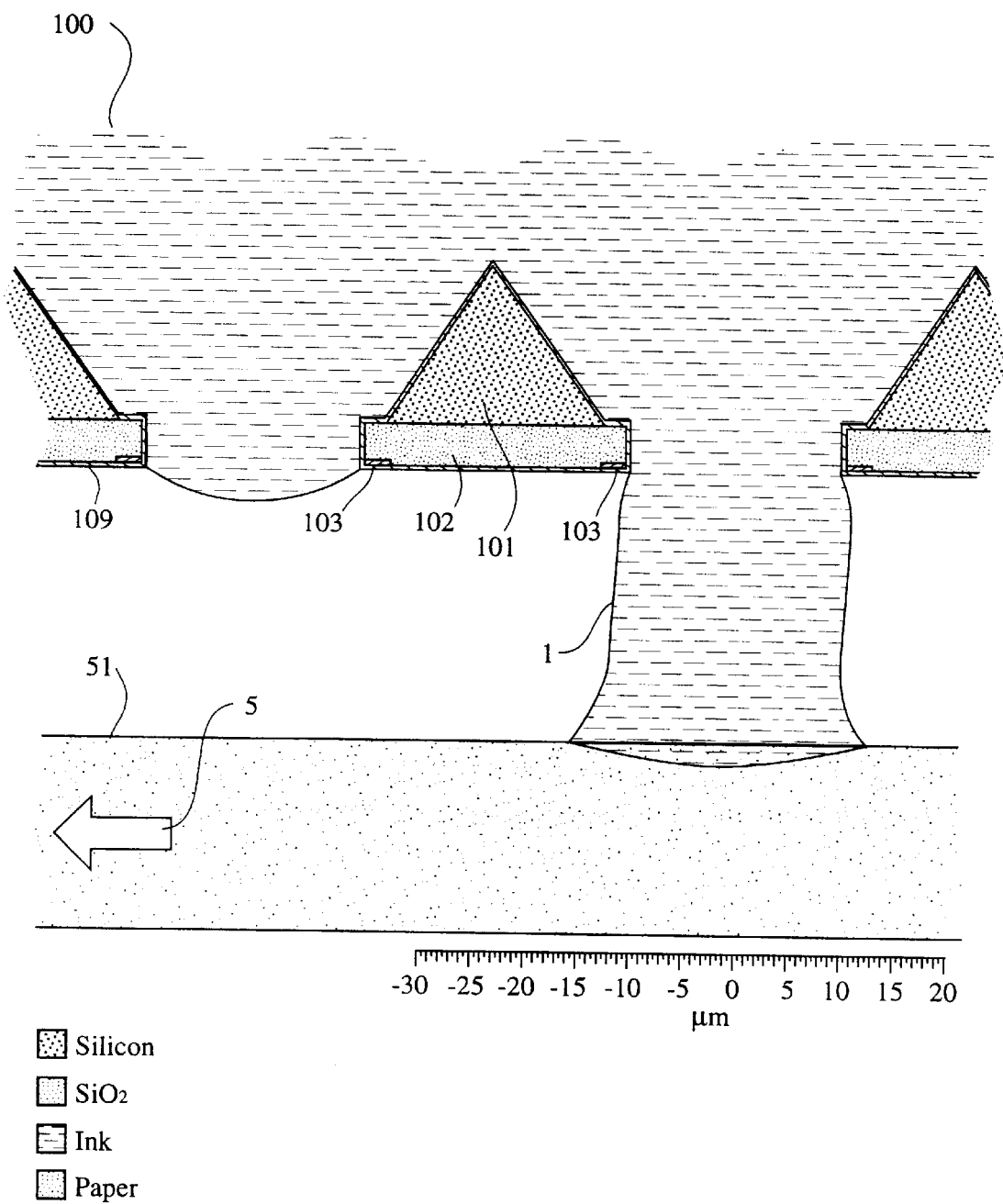

FIG. 19E shows the selected drop as it begins to "soak into" the recording medium 51.

Figure 19F:
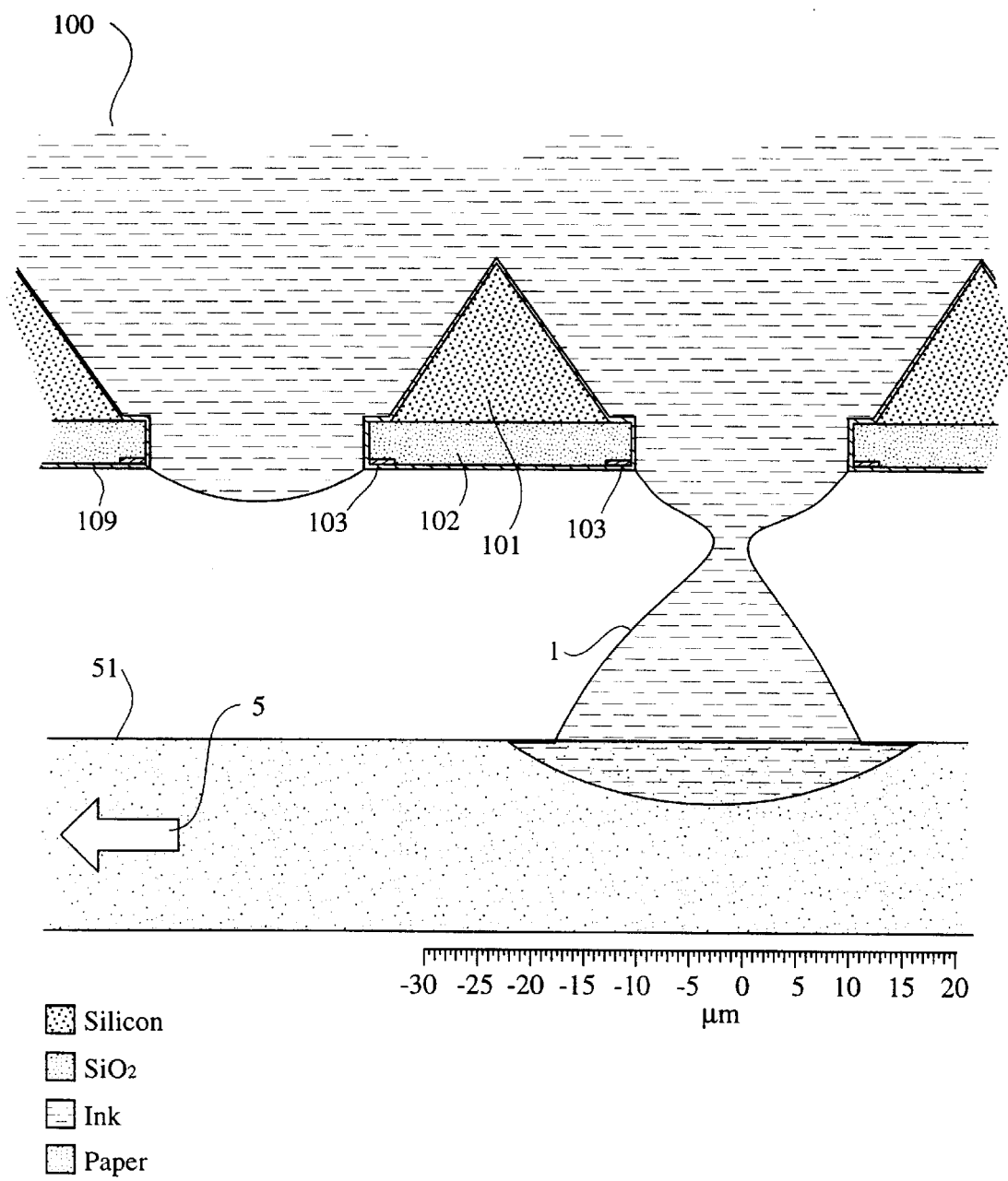

FIG. 19F shows the selected drop a short time later. The ink is absorbed by the recording medium at a rate approximately proportional to the gradient of the saturation. In many fibrous print media such as paper, the circle of contact between the print medium and the ink meniscus will not follow the lateral absorption of the ink into the print medium. This is because the surface fibers do not become fully wetted.

Ink flow into the print medium is highly dependent upon print medium composition. In many circumstances ink can be made to flow more quickly into the printing medium 51 by wetting the medium before printing. This may be achieved by using a series of rollers. The technology for continuously applying an even coat of liquid using rollers is well known in the offset printing industry. Most offset printing systems use damping rollers to apply a thin coating of fount solution, and inking rollers to apply a thin coating of ink, to the printing plates.

Figure 19G:
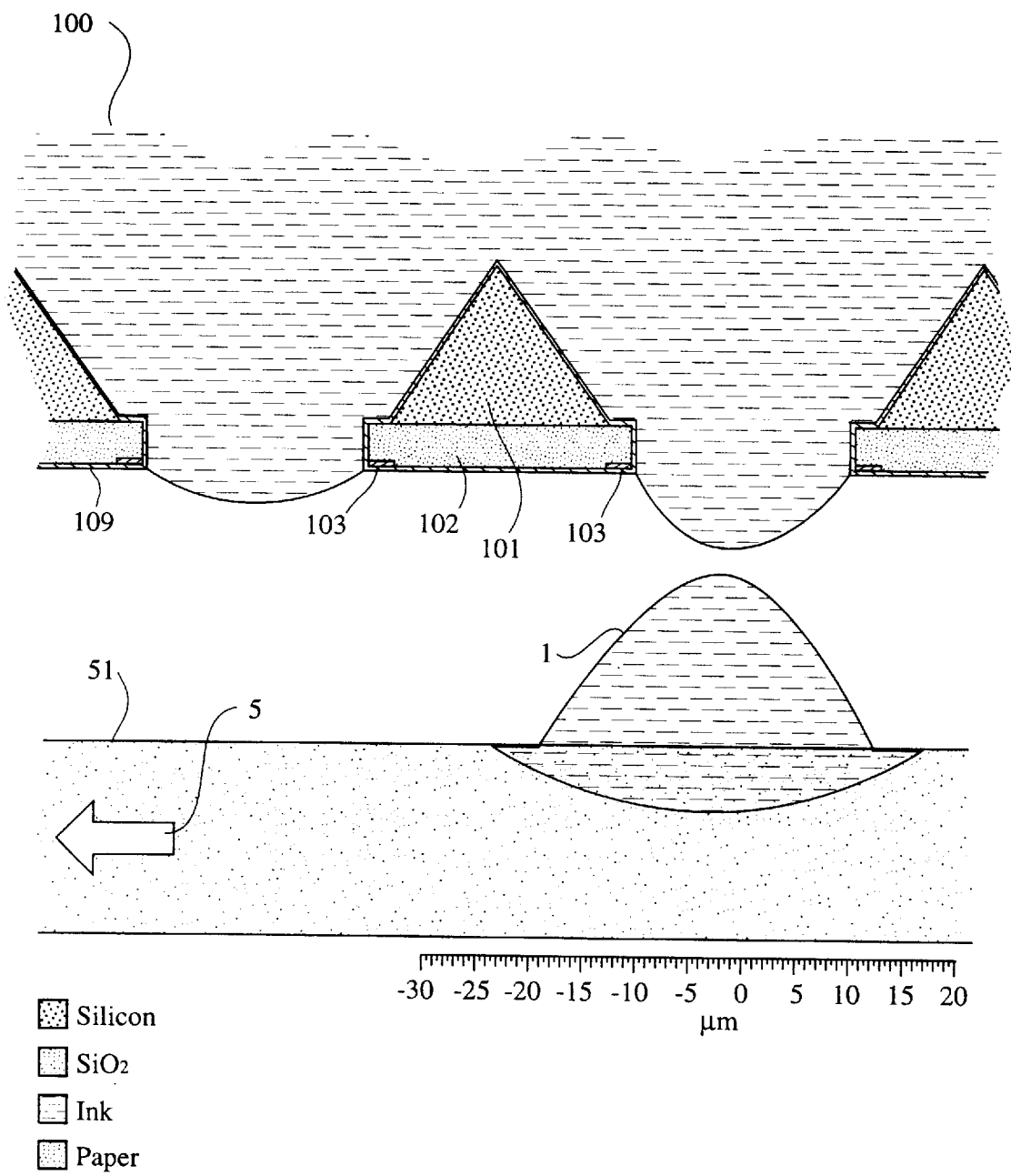

FIG. 19G shows the selected drop 1 immediately after it has separated from the body of ink 100. The ink will separate if the rate of ink flow into the porous recording medium 51 exceeds the flow rate of pressurized ink from the nozzle 10. This can be achieved for a wide range of inks, media, and nozzle radii. Non-porous media such as plastic or metal films can also be used. In this case, drop separation occurs when the rate of volume increase of a drop as it wets the non-porous medium exceeds the rate of ink flow from the nozzle 10. For some combinations of ink and non-porous media, the medium may need to be coated with an agent to promote wetting.

Figure 19H:
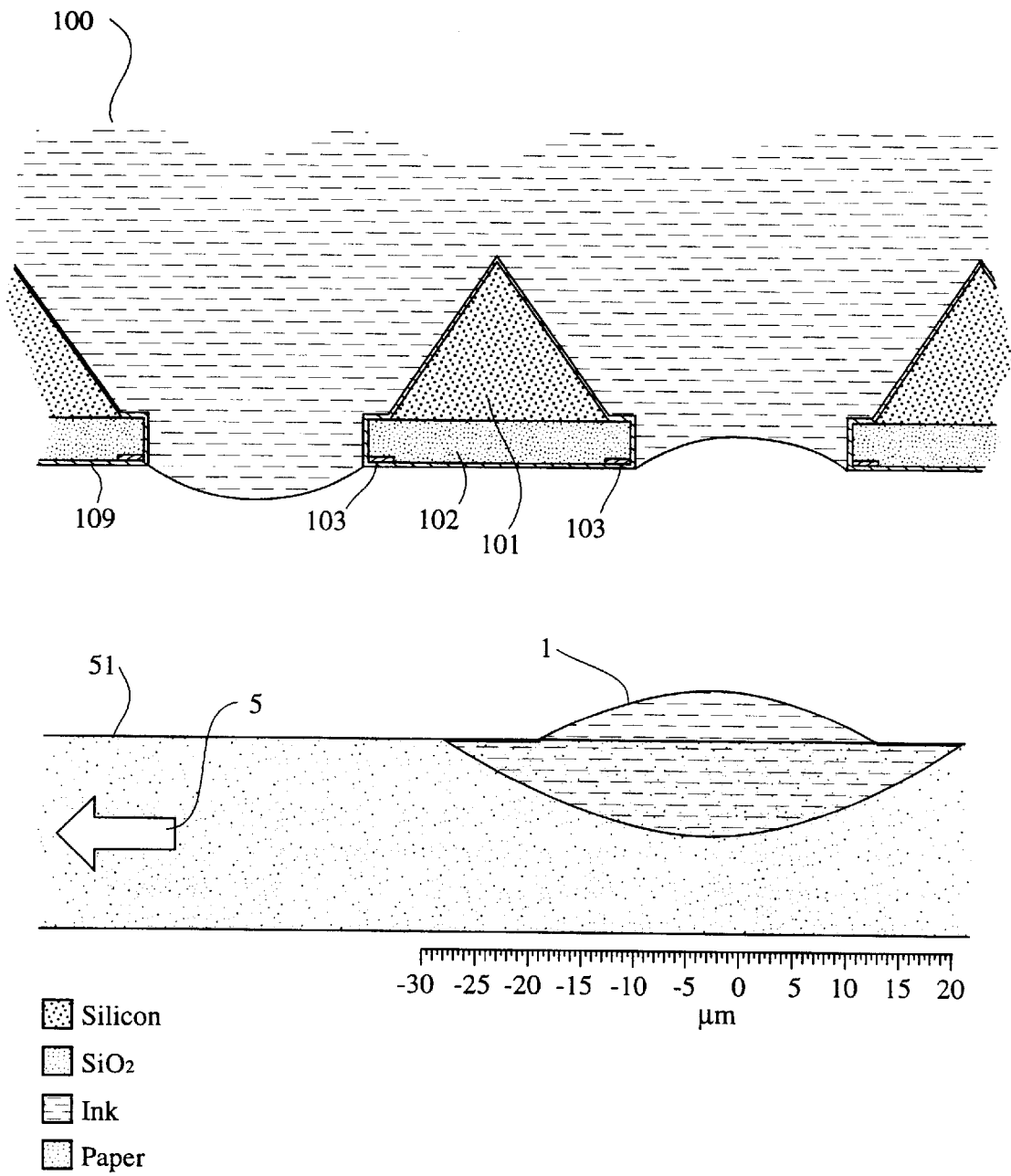

FIG. 19H shows the selected drop 1 after it has mostly soaked into the recording medium. Momentum of the ink returning to the nozzle carries the meniscus at the nozzle 10 past the quiescent position. The degree of this "overshoot" is very small compared to conventional thermal ink jet or piezoelectric ink jet systems.

Figure 19I:
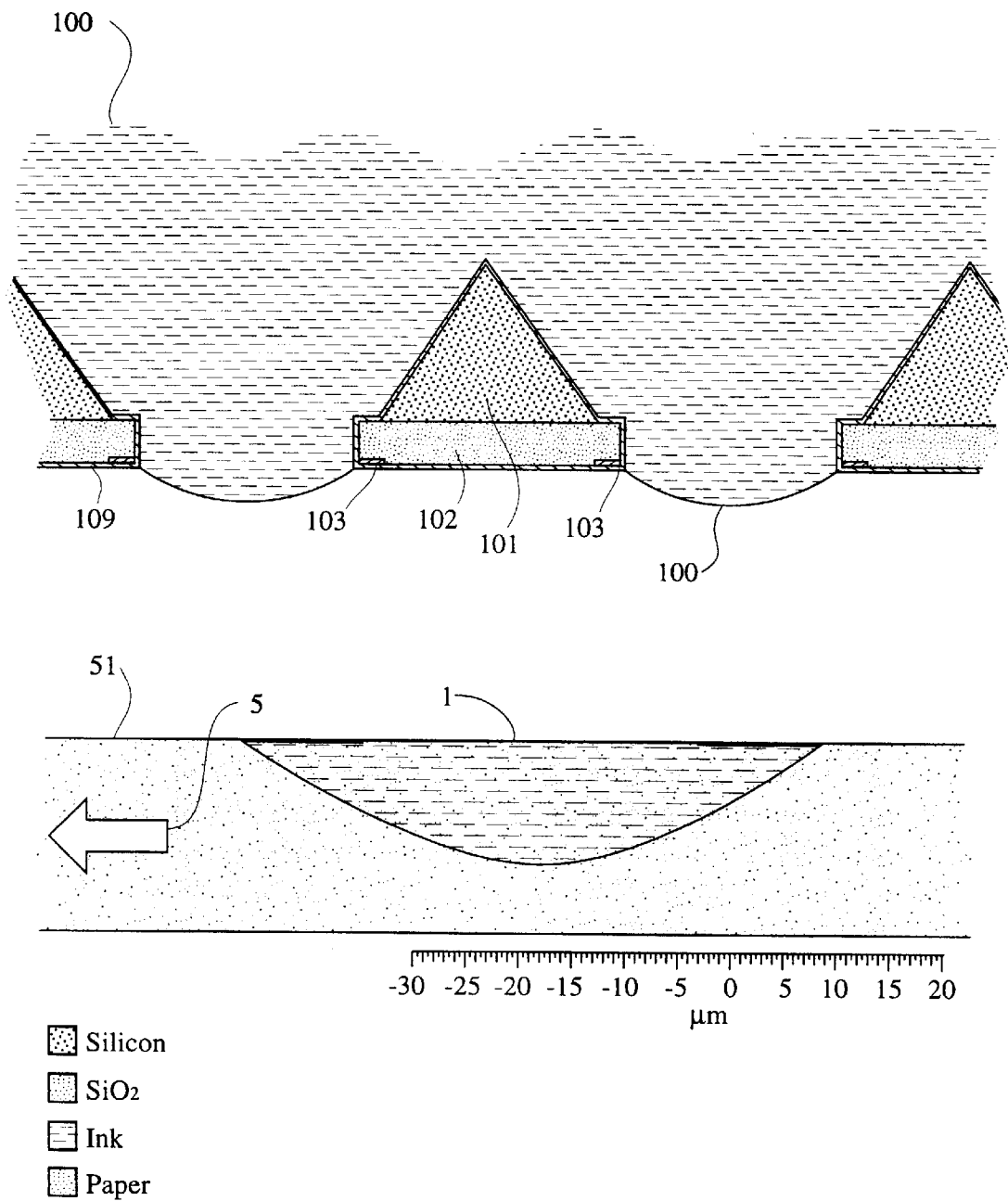

FIG. 19I shows the nozzle 10 after the meniscus has returned to the quiescent position, and is ready for the next drop selection pulse. The selected drop 1 is shown fully absorbed into the print medium 51. The rate of absorption is highly dependent upon the print medium, and the selected drop 1 may not be completely absorbed by the time a drop of a different color is printed at the same location. In some circumstances this may degrade print quality, in which case a more absorptive print medium can be used, a different ink composition can be used, a print head with greater separation between colors can be used, the print medium can be heated to promote fast drying, or a combination of the above techniques can be used.

Acoustic ink waves for proximity separation printing

Correctly applied acoustic waves in the ink of proximity printing systems of the invention can achieve several benefits:

1) Drop growth can proceed faster when the period of maximum forward ink velocity caused by the acoustic wave coincides with the drop growth period.
2) The amount of ink delivered to the recording medium by a selected drop can be reduced when the drop separating time coincides with a period of reduced ink pressure, as less ink will flow out of the nozzle, and the drop will separate earlier.
3) The degree of variation in the amount of ink delivered to the recording medium will be reduced, as both the contact time and separating time of the selected drop are influence by the acoustic wave, which can be created with a highly accurate and stable frequency and amplitude.
4) The use of pigments instead of dyes is augmented, as the ink is constantly agitated by the acoustic waves, reducing one of the major problems of pigments, which is pigment settling in the ink.
5) Blocking of nozzles with dried ink is reduced, as the constant motion of the ink meniscus stirs the ink in the vicinity of the meniscus, replacing drying ink with "fresh" ink.

Figure 20A:
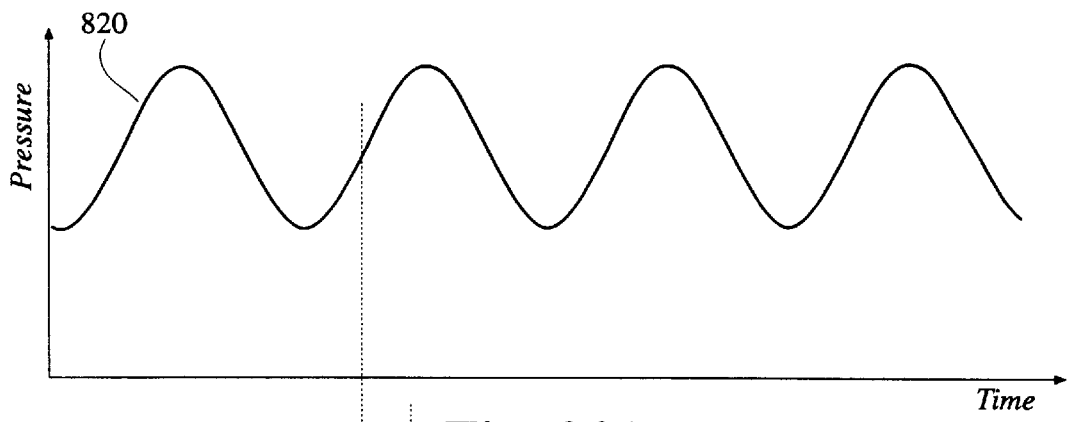
FIGS. 20A and 20B, respectively, show an acoustic wave applied to the ink and a space/time diagram showing the ink occupancy along the nozzle axis for both selected and non-selected drops.

FIG. 20A shows the acoustic wave 820 applied to the ink.

Figure 20B:
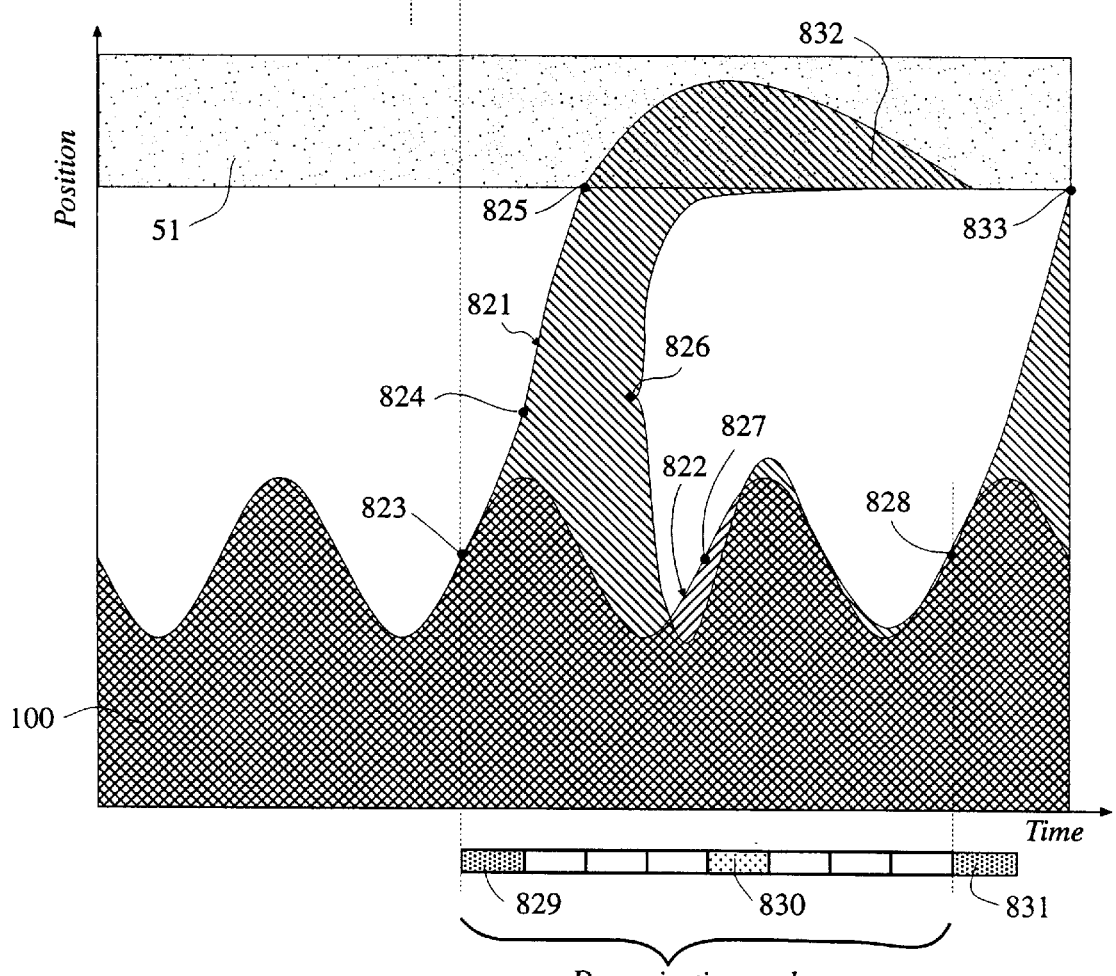

FIG. 20B is a space/time diagram showing the ink occupancy along the nozzle axis for both selected drops 821 and drops which have not been selected 822. The graph shows ink position versus time for a small region along the nozzle axis, ranging from a small distance inside the body of the ink 100 (at the bottom of the graph) to a small distance within the paper 51 (at the top of the graph)

The two graphs are superimposed to allow direct comparison of the selected drop with the unselected drop.

The graph of ink occupancy for unselected drops 822 shows a sinusoidal oscillation of the same frequency as the acoustic wave 820, but with a certain phase shift $\Delta\Phi$. The degree of phase shift depends upon the shape and dimensions of the ink nozzles and ink reservoirs, and the fluid characteristics of the ink. The phase shift will approach 90° as the frequency of the acoustic wave approaches the resonant frequency of the ink in the nozzle. The phase shift is easily compensated by altering the phase of the drive voltage to the piezoelectric or other transducer which is used to create the acoustic wave. The wave shape for the unselected drop is shown as being sinusoidal. The actual shape will have substantial harmonic distortion, and depends upon the geometry of the nozzle tip and the fluid characteristics of the ink.

FIG. 20B is specifically related to a head embodiment with eight drive phases and four ink colors (for example, CMYK colors). Only one ink color is shown. The phases of the acoustic waves in the other ink colors are 90°, 180°, and 270° out of phase with the phase of the acoustic wave 820. The eight drive phases in the drop ejection cycle extend over two periods of the acoustic wave 820. There are two drive phases per ink color in one drop ejection cycle. These are separated by 360° of the acoustic wave, and do not apply to the same nozzle, but to interleaved nozzles. The periods 829 and 831 are two successive heater drive periods of one nozzle (in this case, the nozzle with the selected drop 821. The period 830 is the period in which the heaters of the alternate nozzles of the same ink color may be enabled.

At the time that the heater is turned on 823 the ink occupancy history of the selected drop 821 begins to diverge from the ink occupancy history of drops which are not selected 822. Ink flow from the nozzle is aided by being at a period of maximum forward velocity caused by the acoustic wave 820. At the time 824 this divergence is irreversible, as the oscillating equilibrium between surface tension and oscillating ink pressure is broken. Ink continues to emerge from the nozzle until the ink contact the recording medium 51 at time 825. Ink wets the surface of the recording medium 51, and is absorbed into the medium, as is shown by the ink overlapping the recording medium in the space-time region 832. The selected drop 821 separates from the body of ink 100 when the rate of volume flow into and/or along the surface of the recording medium exceeds the rate of flow from the nozzle at the separation time and position 826. After the instant of separation at 826 the ink meniscus rapidly contracts for both the ink which remains in the recording medium 51 and for the body of ink 100. The separation is aided by occurring at a time of low ink pressure, when the ink for unselected drops is flowing back into the nozzle.

Ink on the nozzle side of the separation point 826 rapidly moves back into the nozzle by ink surface tension. The ink meniscus undergoes a damped oscillation at the resonant frequency of the ink in the nozzle tip for a short period. This damped oscillation is superimposed on the oscillation caused by the acoustic wave. In most cases, it will be neither necessary nor practical to match the resonant frequency of the ink in the nozzle with the frequency of the acoustic wave. The example shown in FIG. 20B the heater on period is 18 μs, and the drop ejection cycle is 144 μs. The period of the acoustic wave is 72 μs, therefore the frequency of the acoustic wave is 13.8 KHz. The resonant frequency of the ink column is 25 Khz.

At the time 827 that the acoustic wave is at the same phase as the start of heater energizing 823, the ink meniscus has not returned sufficiently to the quiescent oscillating state of drops which are not selected 822. However, the alternate nozzle of the same ink color are ready for heater energizing for the period 830 at the time 827. At the next time 828 the acoustic wave is at the same phase as the start of heater energizing 823 the heater of the same nozzle can again be energized, as the meniscus has returned to the quiescent oscillating state with very minor error.

The region of ink 832 which has been absorbed into the recording medium 51 is shown first growing thicker, then thinner with progressing time. The actual ink region in the recording medium only gets thinner, slows, and stops at a certain thickness. The thinning of the ink region is because FIG. 20 is a space/time diagram of ink occupancy along the axis of the nozzle, and the recording medium 51 is moving relative to the nozzle axis. By the time 833 that the next selected drop for the nozzle has reached the recording medium the edge of the previous drop has been passed. The second ink spot flows back in the recording material to join with the first ink spot, thereby providing a continuous layer of ink when subsequent drops are selected.

A simple means of achieving an acoustic wave in the ink is by placing a piezoelectric crystal in such a way that it displaces the ink in the ink channel behind the nozzles. The piezoelectric crystal should be the entire length of the row of nozzles to ensure that all nozzles receive an acoustic wave of the same amplitude and phase. The amplitude of the voltage applied to the piezoelectric crystal depends upon the physical characteristics of the crystal, the dimensions of the nozzles, the shape, location and dimensions of the ink reservoir, the placement of the piezoelectric crystal in relation to the ink nozzles and ink reservoir, the fluid characteristics of the ink, and other factors. The simplicity and low cost of trying differing voltages, amplitudes and phases of drive voltage makes experimentation a more effective means of deriving the appropriate drive waveforms than calculation.

In the example shown in FIG. 20, the frequency of the acoustic wave is 13.8 KHz. This is within the normal audible range of humans, and may be perceived as an annoying high pitched hiss if significant amplitudes of the wave are transmitted to the air and escape the printer enclosure. The level of annoyance perceived is subjective, and highly variable from person to person. For example, only some people are annoyed by the 15.625 KHz line frequency emitted by NTSC and PAL television sets, while most people are unaware of the sound. There are several remedies to the problem of sound emission. One is to ensure that the acoustic wave frequency is above 20 KHz, the normal maximum audible frequency. Another solution is to encase the print head assembly with acoustic absorptive material. This need only absorb strongly at the fundamental frequency of the acoustic wave, as the second harmonic is above 20 KHz. Another solution is to minimize the acoustic coupling between the ink and the air (via the ink channel assembly and other components) at the appropriate frequency.

Drop size adjustment in proximity separation printers

FIG. 21A shows a cross section of a Proximity separation print head and platen assembly for a web fed printing system.

The print head 50 prints six colors (CC'MM'YK) for high quality full color printing using digital halftoning. The head is approximately 8 mm wide and 600 μm thick. The print head is positioned a distance $D_{HtoP}$ away from the recording medium 51 which moves in a direction shown by the arrow 5. The recording medium 51 is tensioned against a platen 67. The platen 67 should have a highly polished and optically flat surface to reduce friction with the recording medium, and to maintain positioning accuracy across the entire print region. The platen may alternatively be formed by two or more rollers (not shown), to reduce friction further. The rollers may be surrounded by an band (not shown) to maintain positional accuracy of the recording medium 51. The platen 67 is fixed to a piezoelectric ceramic 31 which has an axis of polarization 33. The piezoelectric crystal is fixed to a plate 30 which is mechanically fixed in relation to the print head 50 during printing. Electrodes 32 are applied to the piezoelectric crystal 31. To adjust the distance $D_{HtoP}$ a voltage is applied to the electrodes 32.

Ink 100 is supplied to the head by the ink channel assembly 75. The ink channel assembly 75 may also serve the function of holding the print head rigidly in place, and of correcting warp in the print head. Alternatively, these functions may be provided by alternative means. Power to actuate the thermal heaters is supplied by the two power connections 38 and 39. Because these connections can be manufactured from a conductive metal which can readily be several hundred microns thick, and because these connections may be the entire length of the print head, high currents can be supplied to the print head with a small voltage drop. This is important, as page width color print heads may consume as much as 20 Amps when several thousand nozzles are actuated simultaneously.

A paper guide lightly contacts the recording medium 51 under pressure provided by an elastically deformable material 35 acting against a fixed block 34. The guide 36 has two purposes: to tension the recording medium against the platen in conjunction with the paper transport roller 65, and to temporarily flatten any fibers which may protrude from a recording medium such as paper. It is desirable to flatten protruding fibers to improve print quality by reducing variations in the distance from the print head to the effective surface of the recording medium. Protruding fibers do not have as significant an affect on the printed dot size as may be implied by the reduced distance from the nozzle to the closed part of the recording medium. This is because the ink drop will not soak into or wick along the surface of a small protruding fibers as fast as it will soak into the bulk surface. Therefore, the time before ink drop separation, and thus the total amount of ink delivered, will not vary greatly. Depending upon the printing speed, the recording medium type, and other aspects of the printing system, the guide 36 may not be necessary, or may be replaced by tensioned rollers to reduce friction.

FIG. 21B shows a small distance $D_{HtoP}$ between the print head and the recording medium 51. This results in a small volume of the selected drop 1 at the instant of contact between the selected drop and the recording medium. This value of $D_{HtoP}$ is achieved by applying a voltage of $V_{nom}+\Delta V$ to the piezoelectric crystal.

FIG. 21C shows a nominal distance $D_{HtoP}$ between the print head and the recording medium 51. This results in a nominal volume of the selected drop 1 at the instant of contact between the selected drop and the recording medium. This value of $D_{HtoP}$ is achieved by applying a voltage of $V_{nom}$ to the piezoelectric crystal where $V_{nom}$ is the nominal voltage. $V_{nom}$ may be zero, or may be biased so that the full range of required adjustment can be achieved with a unipolar adjustment voltage. $\Delta V$ may be positive or negative, depending upon the crystal orientation and choice of electrodes.

FIG. 21D shows a relatively large distance $D_{HtoP}$ between the print head and the recording medium 51. This results in a relatively large volume of the selected drop 1 at the instant of contact between the selected drop and the recording medium. This value of $D_{HtoP}$ is achieved by applying a voltage of $V_{nom}-\Delta V$ to the piezoelectric crystal.

The volume of ink delivered to the recording medium is not equal to the volume of the selected drop at the instant of contact with the recording medium, as ink continues to flow from the nozzle while the selected drop is soaking into the recording medium. However, the volume of ink delivered to the recording medium will be approximately proportional to the volume of the selected drop at the instant of contact over an operating range determined by ink, recording medium, and nozzle characteristics.

An alternative configuration of the apparatus is to use a piezoelectric crystal to alter the position of the print head in relation to a fixed platen, instead of vice versa. This arrangement is equivalent in function, with no significant disadvantage over the preferred apparatus, except that in many cases it will be more difficult to manufacture.

It is possible to derive many different arrangement of piezoelectric crystal, including arrangements where the crystal operates in shear mode, and arrangements which use multiple stacked layers of piezoelectric crystal to reduce the magnitude of the control voltage required. These variations are obvious to those skilled in the art, and are within the scope of the invention.

EXAMPLES

The following examples are intended to be illustrative and not exaustive of the invention. Parts and percentages are by weight unless otherwise mentioned.

Examples 1 through 3

Preparation of Sols of Solid Carboxylic Acids and those of Mixed Solid Carboxylic Acids General Method: Total 4 g of solid carboxylic acid (or a mixture of solid carboxylic acids) were added to 200 g of distilled water, making it of a total carboxylic acid content of 1.96% (or, nominal 2%). The mixture was then heated on a hot plate to 95 deg C. under constant stirring. This melted the solid carboxylic acid or acids to form a mixture of liquid carboxylic acid and water. Next, a vortex mixer (Silverson, Model-L4R) was used to form the coarse emulsion premix. The head of the mixture was kept in a beaker of water at 95° C. to bring up the temperature of the mixing head before emulsification was carried out. A Microfluidizer (Model-110T) was used to form the final solid carboxylic acid sols. About 2 liters of distilled water at 95° C. was passed through the fluidizer to bring the temperature of the dispersion flow path such that no crystallization took place inside the fluidizer. The hot pre-dispersion was fluidized in a single pass to form dispersions of low turbitiy. The dispersion was cooled down to room temperature.

Specific Compositions: The specific compositions of the examples of this disclosure are listed in the following table. The colloidal stability of the prepared dispersions are also indicated in this table as observations. It is noted in this table that the colloidal stability of the dispersion prepared from the mixture of the two carboxylic acids is far superior to those prepared with the individual acids themselves. This clearly indicates that the two component mixed carboxylic acid sols are far superior in restraining Ostwald ripening of the sol particles and eventual flocculation.

| | | Various Carboxylic Acid Sols | | | |
|---|---|---|---|---|---|
| Example | Nature of the Carboxylic acids | Weight of Carboxylic Acid-1 in g | Weight of Carboxylic Acid-2 in g | Weight of Distilled Water in g | Comments Regarding Dispersion Stability |
| Example-1 (Control) | Acid-1: Arachidic Acid-2: None | 2.00 | 0.00 | 200 | Sol underwent rapid particle growth and finally flocculated within about 3 days. |
| Example-2 (Control) | Acid-1: Behenic Acid-2: None | 2.00 | 0.00 | 200 | Sol underwent particle growth and finally flocculated within about 7 days. |
| Example-3 (Inventive) | Acid-1: Arachidic Acid-2: Behenic | 1.00 | 1.00 | 200 | Sol remained visually virtually unchanged over about 45 days. |

The above observation constitutes reduction to practice of the invention of this disclosure.

Surface tension (sol/air interfacial tension) values were measured using a Wilhelmey plate tensiometer device containing a thermostated sample reservoir. Surface tension measurements were carried out at 25 and 90° C. It was found that the equilibration of surface tension values took any where between 4 and 26 minutes. The cause of this was not full y understood. Therefore, both the initial and the equilibrium surface tension values are reported in this disclosure along with the equilibration times. The results of the surface tension measurements are shown in the following table.

Air/Sol Interfacial Tension

| Example Type | Sol Acid | Surface Tension @ 25° C. dynes/cm | | | Surface Tension, @ 90° C. dynes/cm | | | Surface Tension Difference dynes/cm | |
|---|---|---|---|---|---|---|---|---|---|
| | | Initial | Time min | Equili-brium | Initial | Time min | Equili-brium | Initial | Equili-brium |
| Example-1 Control | Arachidic | 61.3 | 26 | 70.0 | 34.6 | 10 | 35.5 | 26.7 | 34.5 |
| Example-2 Control | Behenic | 69.0 | 7 | 70.8 | 30.7 | 12 | 28.4 | 38.3 | 42.4 |
| Example-3 Invention | Behenic + Arachidic | 66.4 | 10 | 71.0 | 27.8 | 16 | 32.5 | 38.6 | 38.5 |

The changes in the values of the surface tension indicated in the above table show that all the carboxylic acid sols, including the mixed carboxylic acid sol of Example-3, show very large changes in the air/sol interfacial tension between temperatures of 25° C. and 90° C. Therefore it is very clear from previous discussions that inks with such surface energetic properties, poised at room temperature, can be released by electrothermal heating of the nozzle surrounding the drop.

Examples-4 through 6

Simulation of Drop Selection Using the Surface Energetic Characteristics of the Inventive Example-3

Computer modeling was performed for observing the process of drop ejection after electrothermal selection of a poised drop using FIDAP, as described earlier. The various parameters used for such a calculation are described as follows:

1. Nozzle Radius was chosen to be 10 microns.
2. The temperature dependence of surface tension was assumed linear and was constructed based upon the observed initial sol/water interfacial tensions of Inventive Example-3, which are 66.4 dynes/cm at 25° C. and 27.8 dynes/cm at 90° C.
3. The ink reservoir pressure was assumed to be 10 k Pa, or about 0.1 atmosphere above ambient pressure.
4. The operating temperature under poised condition of the drop was assumed to be 30° C. At this temperature the ink/water interfacial tension was 63.4 dynes/cm. At this temperature a pressure difference 12.7 k Pa would be required to overcome the Laplace pressure due to the surface tension. So the drop will remain poised under the ink container pressure of 10 k Pa above the ambient pressure.
5. Heat pulses of 0.5 $\mu$ Joules were applied for 20 $\mu$ sec to actuate drop ejection by lowering the tension at the ink/air interface at the nozzle edge.

Figure 22C:
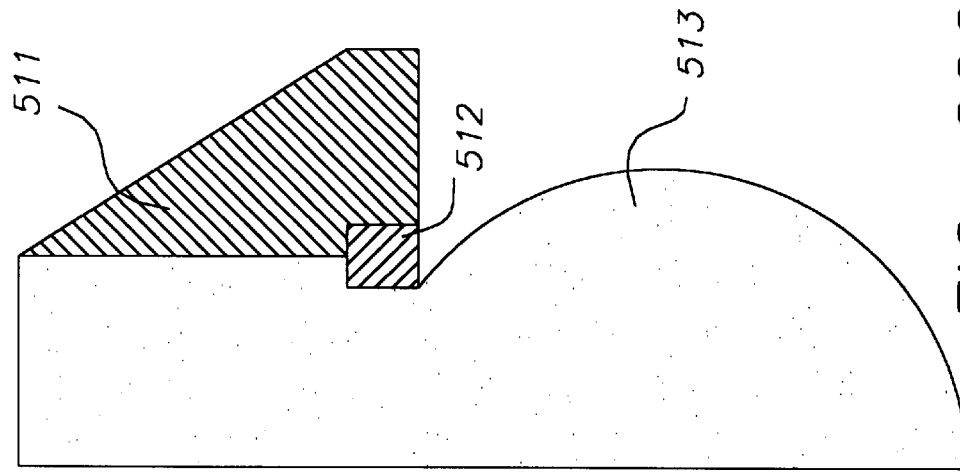
FIG. 22C shows the picture of the drop of FIG. 22B after the end of the heat pulse.
Figure 22B:
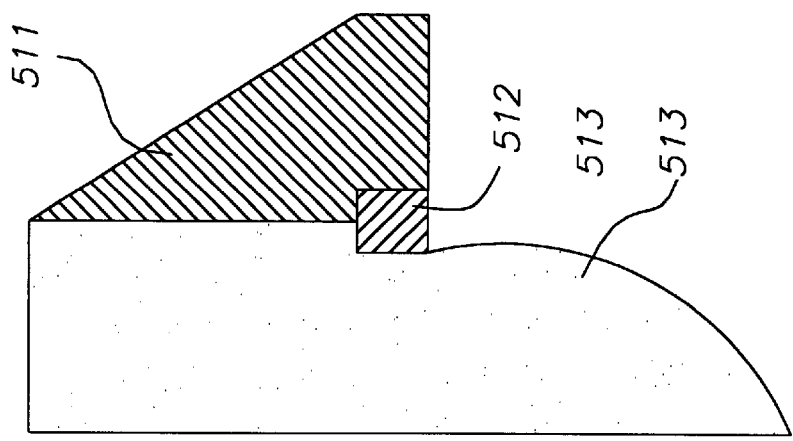
FIG. 22B shows the picture of the drop of FIG. 22A after a 20 $\mu$ sec heat pulse.
Figure 22A:
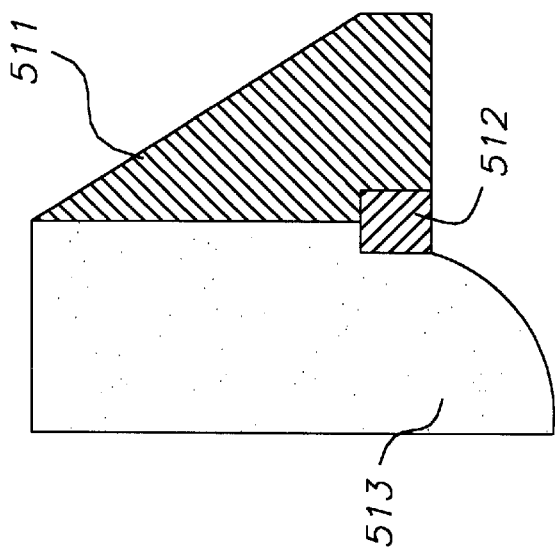
FIG. 22A shows the picture of a poised drop from FIDAP modeling of the ink composition of the Inventive Example-3 of this invention.

Results of the computations are shown in FIGS. 22A (Example-4), 22B (Example-5) and 22C (Example-6). FIG. 22A shows a poised drop at equilibrium at 30° C. where the ink is held back by the surface tension of the fluid. Actually only half of a drop is shown because of symmetry. Area marked 511 is the circular nozzle, 512 is the circular heater and 513 is the ink fluid. In FIG. 22B, is shown, the drop of FIG. 22A after a 20 $\mu$ second heat pulse of 0.5 $\mu$ Joules. Here it is observed that the drop has been launched and surface tension can no longer hold the drop back in the nozzle. In FIG. 22C, although the drop is cooled down nearly to ambient temperature of 30° C. and the surface tension is back up to 63.4 dynes/cm, the drop continues to grow and appears close to spherical. These examples demonstrate the theoretical feasibility of drop launching by the LIFT principle.

Examples-7 through 9

Actual Drop Selection Using Ink Fluid of the Inventive Example-3

Fabrication of the Nozzles

Figure 23:
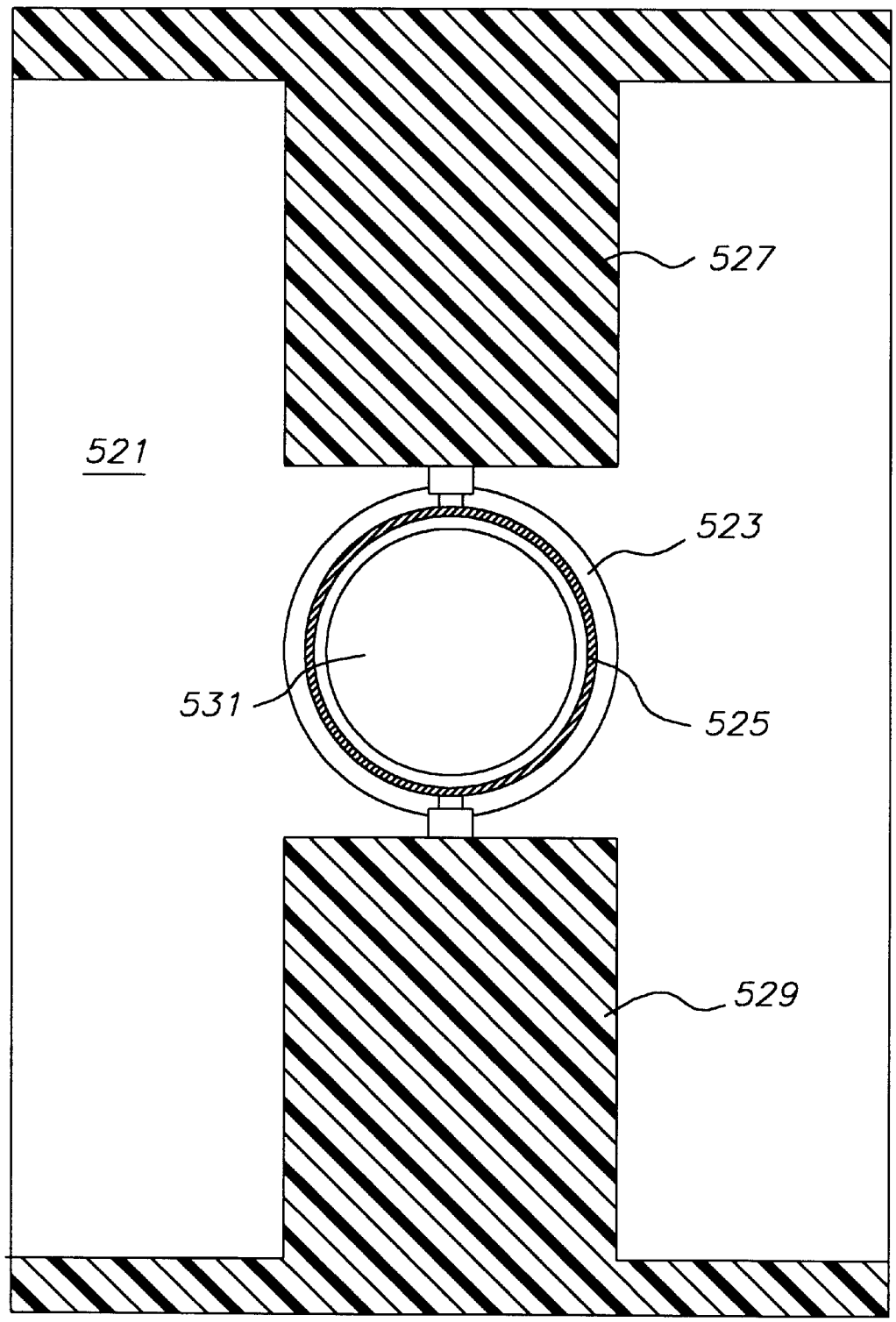
FIG. 23 shows the actual lay out of the fabrication of the nozzles used for testing of the ink fluids of this invention.

The model nozzles for testing of the ink fluids were fabricated on a silicon wafer using conventional integrated-circuit technology, as indicated earlier. The actual layout of a single nozzle is shown in FIG. 23. The surface of the silicon wafer, 521, is heavily doped except for the circular region 523. However, during processing, the boron impurities diffuse such that the undoped region shrinks to about the inside rim of ring 525. Ring 525 defines the actual resistive heater. Its drawn width is 1 $\mu$m, which after etching reduces to about 0.8 $\mu$m. Within this ring is defined, a circular bore region, 531, which is separated by about 0.8 $\mu$m from the inner edge of the heater ring 525. In FIG. 23 are also shown the power and ground connections to the heater. The +V electrode is marked 527 and the return electrode is marked 529. In the design, the heater and the power busses were made of polysilicon doped at the standard level of about 30 ohms/square. Finally the actual nozzles were bored by KOH preferential etch.

Experimental Setup

Figure 24:
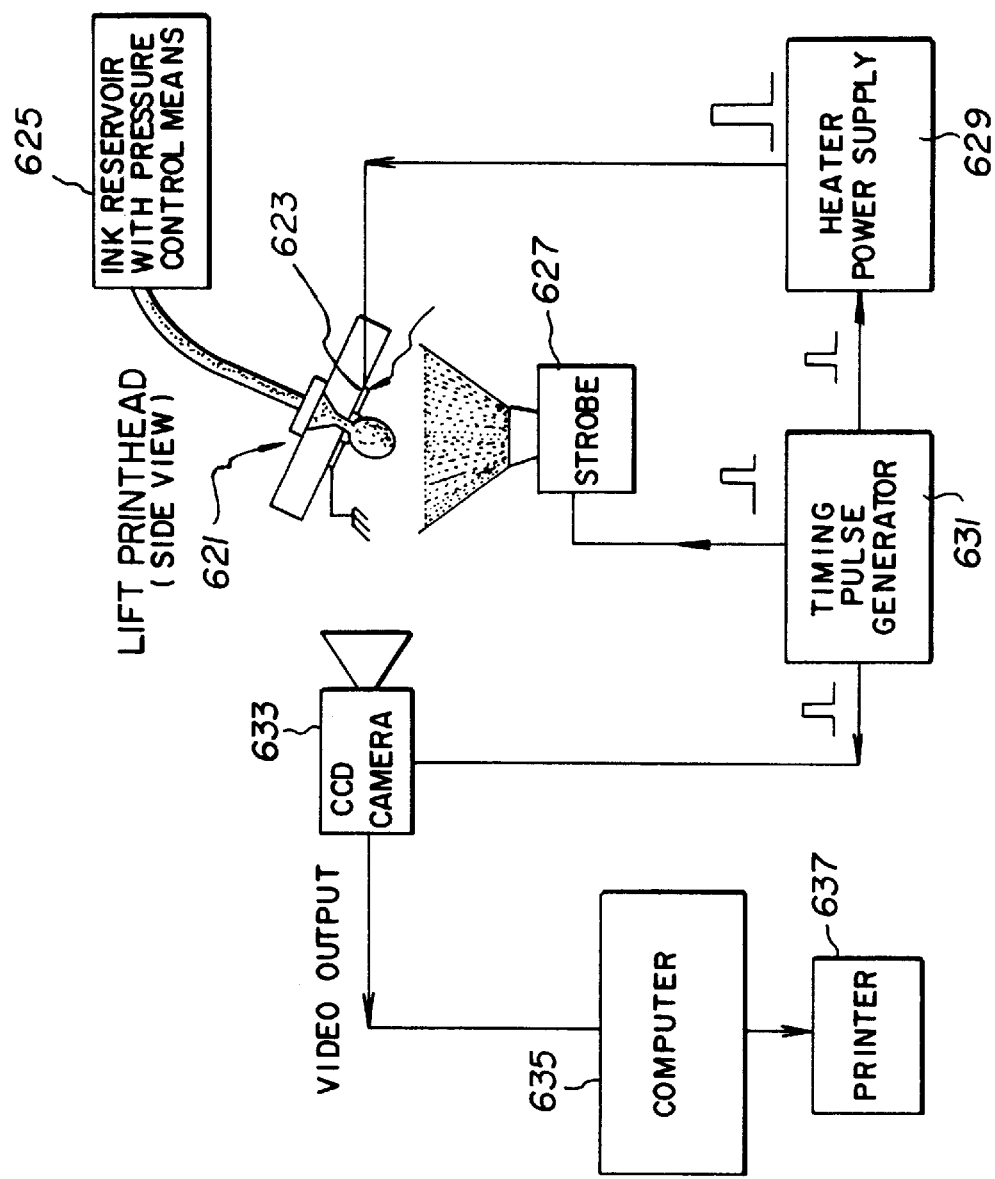
FIG. 24 shows the layout of the experimental setup used for testing of the ink fluids of this invention.

FIG. 24 is a schematic diagram of the experimental set up used to image drops emitted from a LIFT printhead 621. A CCD camera 633 connected to a computer 635 and printer 637 is used to record images of the drop at various delay times relative to the heating pulse. The LIFT printhead 621 is angled at 30 degrees from the horizontal so that the entire heater 623 can be viewed. Because of the reflective nature of the surface, a reflected image of the drop appears together with the imaged drop. An ink reservoir and pressure control means 625 is included to poise the ink meniscus at a point below the threshold of ink release. A fast strobe 627 is used to freeze the image of the drop in motion. A heater power supply 629 is used to provide a current pulse to the heater 623. The strobe 627, camera 633, and heater power supply 629 may be synchronously triggered by the timing pulse generator 631. In this way, the delay between the strobe 627 and heater power supply 629 may be set to capture the drop at various points during its formation.

Experimental Results

Figure 25A:
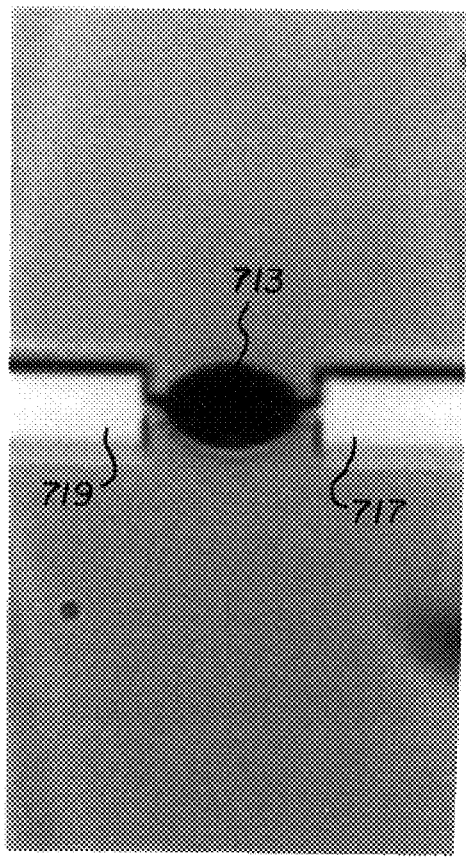
FIG. 25A shows an image of a poised ink fluid of this invention.

A 20 $\mu$m diameter nozzle, fabricated as described above and shown schematically in FIG. 23, was mounted in the test setup shown schematically in FIG. 24. The nozzle reservoir was filled with the sol/water mixture of inventive Example 3. FIG. 25A is an image of a meniscus 713 poised on the nozzle lip 525 by pressurizing the reservoir 625 to 9.4 kPa, well below the measured critical pressure of 13.6 kPa. Note that the image is taken at a tilt of 30 degrees from horizontal with a reflected image of the poised meniscus also appearing. Also labeled on the image are the V+ electrode 717 and the return electrode 719.

Figure 25B:
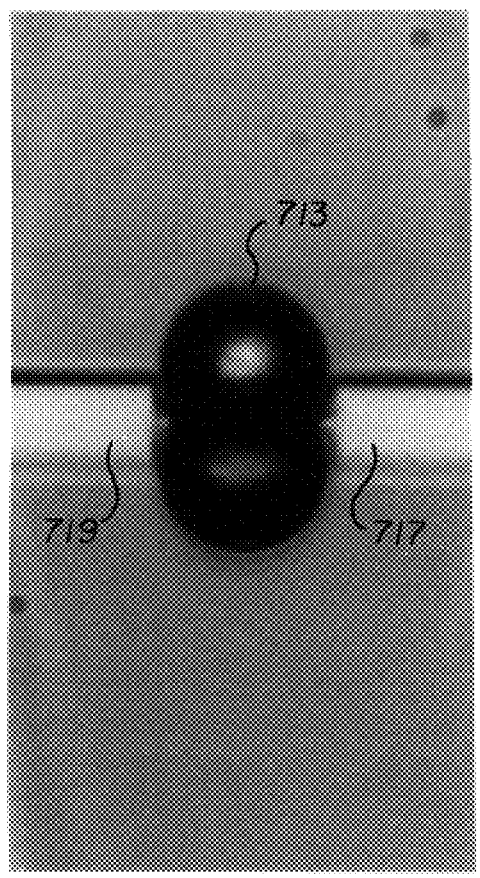
FIG. 25B shows an image of the ink fluid meniscus after application of heat pulses according to the process of this invention.

FIG. 25B is an image taken of the meniscus after pulsing the heater 525. The local change in temperature caused by the heater has resulted in a reduction in surface tension of the solution. This surface tension reduction causes the meniscus 713 to move further out in the nozzle. The above observation constitutes reduction to practice of this invention.

Figure 25C:
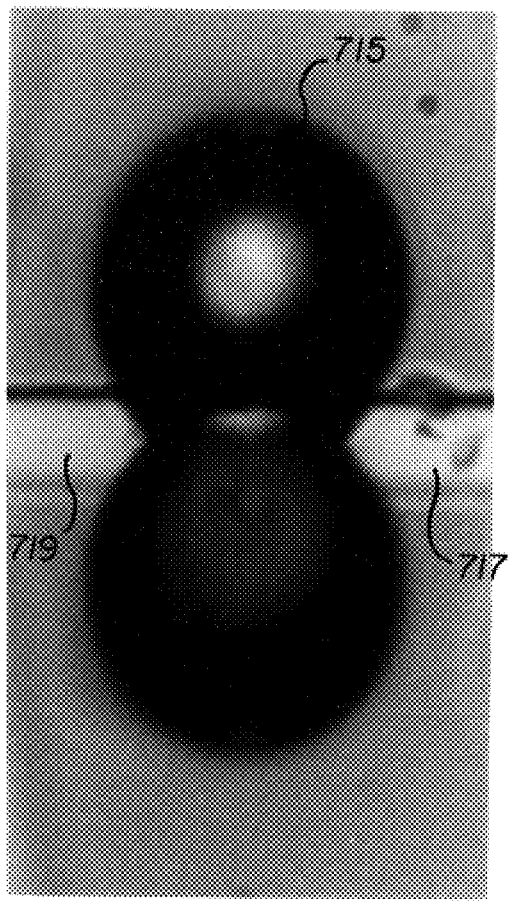
FIG. 25C shows an image of the ink fluid meniscus after application of heat pulse sufficient to release the drop according to the process of this invention.

With sufficient heat energy input, which depends on the initial poising pressure, the decrease in surface tension is large enough to expand the meniscus past the critical point resulting in a launched drop. In FIG. 25C a meniscus which was initially poised a few percent below critical pressure had a heat pulse applied. The Fig. shows an image taken 132 usec after the start of the heater pulse. In this case the meniscus has expanded past critical due to the reduction in surface tension resulting in a launched drop 715. This launched drop 715 will continue to expand until separated using proximity or electrostatic means as described above. The above observation constitutes reduction to practice of this invention.

The foregoing describes one embodiment of the present invention. Modifications, obvious to those skilled in the art, can be made thereto without departing from the scope of the invention.

We claim:

1. An aqueous ink composition comprising a dispersion in water of a coloring agent, and solid surfactant particles wherein said solid particles comprise a mixture of at least two surfactants with very low water solubility and with melting points between 40° C. and 90° C., wherein said surfactant particles are comprised of a mixture of metal salts of at least two carboxylic acids.

2. The ink composition of claim 1 wherein said surfactant particles comprising a mixture of at least two carboxylic acids, the surface of which is the anion of at least one of the said carboxylic acids.

3. The ink composition of claim 1 wherein said surfactant particles comprise at least two carboxylic acids with the general formula $CH_3(CH)_n COOH$, where n is between 12 and 28.

4. The ink composition of claim 3 wherein at least the two component molecules at the surface of said surfactant particles have the formula $CH_3(CH_2)_n COO^- M^+ (H_2O)_m$ where n is betweem 12 and 28, and M is a metal cation selected from the group consisting of cations of sodium, potassium or lithium.

5. The ink composition of claim 4 wherein said surfactant particles are particles of at least two carboxylic acids of the formula $CH_3(CH_2)_n COOH$, where n is between 14 and 20.

6. The ink composition of claim 5 wherein said surfactant particles comprise at least one member of the group consisting of stearic acid, arachidic acid, and behenic acid.

7. The ink composition of claim 6 wherein said surfactant particles comprise at least one surfactant selected from the group consisting of sodium stearate, sodium arachidate, and sodium behenate.

8. The ink composition of claim 5 wherein said surfactant particles have an average radius between 100 Å and 5,000 Å.

9. The ink composition of claim 5 wherein said surfactant particles have an average radius between 500 Å and 2000 Å.

10. The ink composition of claim 4 wherein said surfactants differ by between 1 and 4 carbon atoms.

11. A method of preparing an aqueous ink composition comprising a dispersion in water of a coloring agent in water, and dispersed solid surfactant particles comprising a mixture of at least two surfactants with very low water solubility and with melting points between 40° C. and 90° C. comprising the following steps:
   a. heating an aqueous liquid and a mixture of the carboxylic acids to an elevated temperature below the boiling point of the aqueous liquid,
   b. homogenizing the said mixture in a single or multiple steps at the said elevated temperature, to form a small particle dispersion of the mixed carboxylic acids in the aqueous liquid,
   c. quickly cooling the formed dispersion to room temperature, wherein said surfactant particles are comprised of a mixture of metal salts of at least two carboxylic acids.

12. The method of claim 11 wherein said surfactant particles comprising a mixture of at least two carboxylic acids, the surface of which is the anion of at lease one of the said carboxylic acids.

13. The method of claim 11 wherein said surfactant particles comprise at least two carboxylic acids with the general formula $CH_3(CH)_n COOH$, where n is between 12 and 28.

14. The method of claim 11 wherein at least the two component molecules at the surface of said surfactant particles have the formula $CH_3(CH_2)_n COO^- M^+ (H_2O)_m$ where n is betweeh 12 and 28, and M is a metal cation selected from the group consisting of cations of sodium, potassium or lithium.

15. The method of claim 14 wherein said surfactant particles are particles of at least two carboxylic acids of the formula $CH_3(CH_2)_n COOH$, where n is between 14 and 20.

16. The method of claim 11 wherein said particles comprise at least one surfactant selected from the group consisting of stearic acid, arachidic acid, and behenic acid.

17. The method of claim 16 wherein said surfactant particles comprise at least one surfactant selected from the group consisting of sodium stearate, sodium arachidate, or sodium behenate.

18. The method of claim 14 wherein the mixed surfactant particles have an average radius between 100 Å and 5,000 Å.

19. The method of claim 14 wherein the mixed surfactant particles have an average radius between 500 Å and 2000 Å.

20. The method of claim 15 wherein said surfactants differ by 1 to 4 carbon atoms.

* * * * *